(12) United States Patent
Murakami et al.

(10) Patent No.: US 6,665,235 B2
(45) Date of Patent: Dec. 16, 2003

(54) MAGNETO-OPTICAL RECORDING MEDIUM AND RECORDING AND REPRODUCING METHOD AND OPTICAL HEAD DESIGNED FOR THE MAGNETO-OPTICAL RECORDING MEDIUM

(75) Inventors: Yoshiteru Murakami, Nishinomiya (JP); Junji Hirokane, Nara (JP); Junichiro Nakayama, Shiki-gun (JP); Junsaku Nakajima, Yamatotakada (JP); Akira Takahashi, Nara (JP); Kenji Ohta, Kitakatsuragi-gun (JP); Naoyasu Iketani, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/214,881

(22) Filed: Aug. 8, 2002

(65) Prior Publication Data

US 2003/0081510 A1 May 1, 2003

Related U.S. Application Data

(62) Division of application No. 09/685,829, filed on Oct. 10, 2000, now Pat. No. 6,483,785, which is a division of application No. 08/147,373, filed on Nov. 3, 1993, now Pat. No. 6,261,707.

(30) Foreign Application Priority Data

Nov. 6, 1992 (JP) .............................................. 4-297423
Jan. 7, 1993 (JP) ................................................ 5-1372
Jan. 22, 1993 (JP) ................................................ 5-9459

(51) Int. Cl.[7] .............................................. G11B 11/00

(52) U.S. Cl. .................................. 369/13.06; 369/13.41

(58) Field of Search ........................... 369/13.06, 13.41, 369/13.42, 13.43, 13.44, 13.45, 13.46, 13.48, 13.49, 13.51, 13.05; 428/694 MM, 694 ML

(56) References Cited

U.S. PATENT DOCUMENTS

| 4,814,238 A | 3/1989 | Tanaka |
| 4,849,304 A | 7/1989 | Uchiyama et al. |

(List continued on next page.)

FOREIGN PATENT DOCUMENTS

| EP | A 0314518 A3 | 5/1989 |
| EP | A 0343727 A1 | 11/1989 |

(List continued on next page.)

OTHER PUBLICATIONS

M. Ohta et al., "Read Out Mechanism of Magnetically Induced Super Resolution" Proceedings of Magneto–Optical Recording International Symposium '91, J. Magn. Soc. Jpn., vol. 15, Supplemental No. S1 (1991), pp. 319–322.
"Direct Overwrite Without Initialization in a Bilayer Magneto–Optical Disk"; Applied Physics Letters, vol. 56, No. 22, May 28, 1990, pp. 2249–2251.

*Primary Examiner*—Tan Dinh
(74) *Attorney, Agent, or Firm*—David G. Conlin; William J. Daley, Jr.; Edwards & Angell, LLP

(57) ABSTRACT

Featured is a recording and reproducing method of a magneto-optical recording medium including a recording layer for recording thereon information magneto-optically and a readout layer which has in-plane magnetization at room temperature and where a transition occurs from in-plane magnetization to perpendicular magnetization as temperature raises. The method includes projecting a light beam onto such a magneto-optical recording medium so as to form a perpendicularly magnetized area in the readout layer by duplication of the magnetization of said recording layer to the area. In further embodiments, the recording medium further includes an intermediate layer made of non-magnetic film formed between the readout and recording layers and the readout and recording layers are composed of rare-earth transition metal alloys such as TbFeCo (recoding layer) readout layer, made of GdFeCo (readout layer).

6 Claims, 40 Drawing Sheets

U.S. PATENT DOCUMENTS

| | | | |
|---|---|---|---|
| 5,132,945 A | 7/1992 | Osato et al. | |
| 5,199,022 A | 3/1993 | Suzuki et al. | 369/275.1 |
| 5,278,810 A | 1/1994 | Takahashi | |
| 5,452,272 A | 9/1995 | Murakami et al. | 369/13 |
| 5,452,273 A | 9/1995 | Onagi | 369/13 |
| 5,615,180 A * | 3/1997 | Mieda et al. | 369/13 |
| 5,631,096 A * | 5/1997 | Nakajima et al. | 369/13 |
| 5,633,838 A | 5/1997 | Hirokane et al. | 369/13 |
| 5,662,988 A | 9/1997 | Nakayama et al. | 428/212 |
| 5,838,646 A | 11/1998 | Watanabe et al. | 369/13 |

FOREIGN PATENT DOCUMENTS

| | | |
|---|---|---|
| EP | A 0352548 A2 | 1/1990 |
| EP | A 0361970 A3 | 4/1990 |
| EP | 0376 680 A2 | 7/1990 |
| EP | A 0452155 | 10/1991 |
| EP | A 0473492 | 3/1992 |
| EP | A 0496556 A3 | 7/1992 |
| EP | 0509 836 A2 | 10/1992 |
| EP | O 509 836 A2 | 10/1992 |
| EP | 0586 175 A1 | 3/1994 |
| EP | 0592 199 A2 | 4/1994 |
| JP | A 60101744 | 6/1985 |
| JP | A 60191449 | 9/1985 |
| JP | 158496 | 2/1986 |
| JP | A 62204455 | 9/1987 |
| JP | A 62222454 | 9/1987 |
| JP | A 62285254 | 12/1987 |
| JP | A 63018546 | 1/1988 |
| JP | A 63070939 | 3/1988 |
| JP | A 63091848 | 4/1988 |
| JP | A 63285738 | 11/1988 |
| JP | A 01021733 | 1/1989 |
| JP | A 01064150 | 3/1989 |
| JP | A 01064151 | 3/1989 |
| JP | 1189 039 | 7/1989 |
| JP | A 01319143 | 12/1989 |
| JP | A 02033741 | 2/1990 |
| JP | 2056 748 | 2/1990 |
| JP | A 02078041 | 3/1990 |
| JP | A 03263637 | 11/1991 |
| JP | 4013 253 | 1/1992 |
| JP | A 04014645 | 1/1992 |
| JP | A 04090154 | 3/1992 |
| JP | 5205 336 | 8/1993 |
| JP | 5342 670 | 12/1993 |
| JP | 6076 405 | 3/1994 |
| JP | 6124 500 | 5/1994 |
| JP | 2839 783 | 10/1998 |

* cited by examiner

F I G. 33
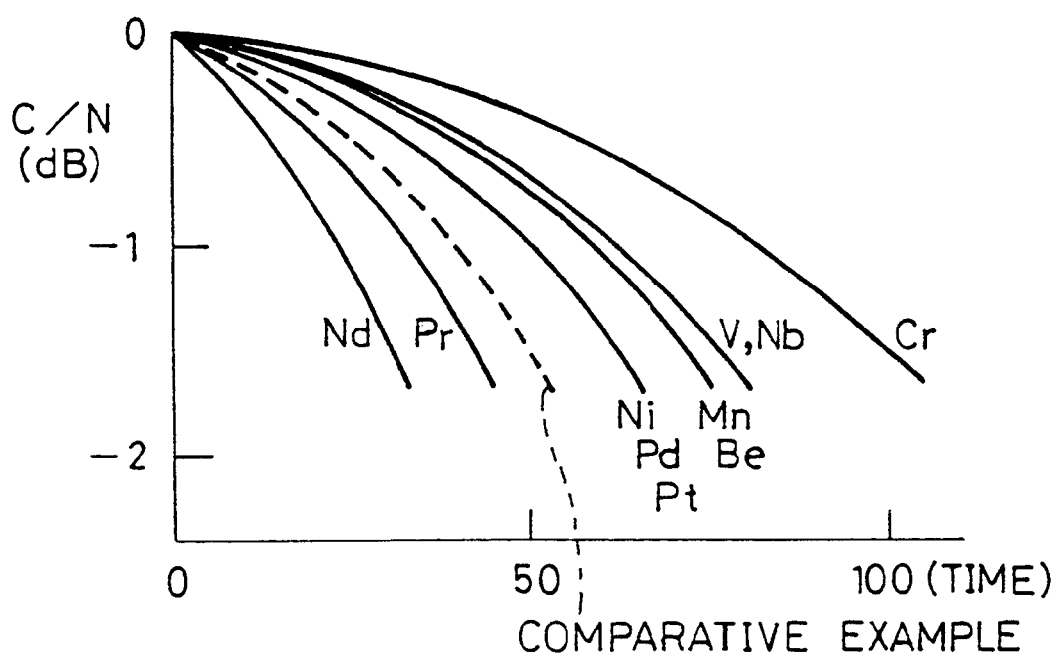

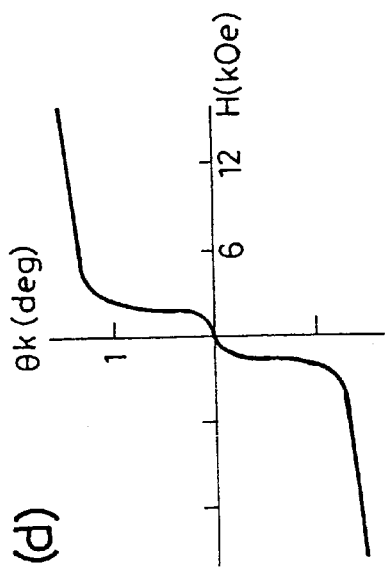
FIG.34(b)
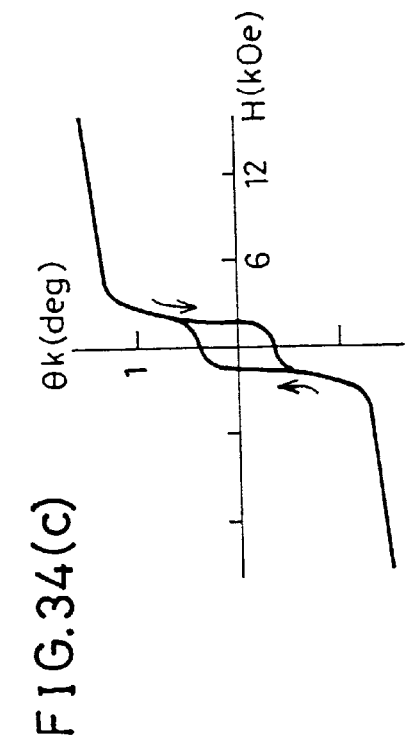
FIG.34(d)
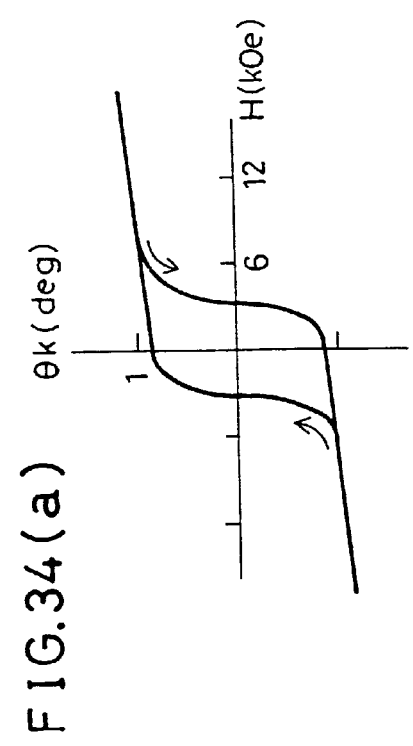
FIG.34(a)
FIG.34(c)

MAGNETO-OPTICAL RECORDING MEDIUM AND RECORDING AND REPRODUCING METHOD AND OPTICAL HEAD DESIGNED FOR THE MAGNETO-OPTICAL RECORDING MEDIUM

This application is a divisional of U.S. application Ser. No. 09/685,829, filed Oct. 10, 2000, now U.S. Pat. No. 6,483,785, which application is a divisional of U.S. application Ser. No. 08/147,373, filed Nov. 3, 1993 now U.S. Pat. No. 6,261,707, the teachings of which are incorporated herein by reference in their entirety.

FIELD OF THE INVENTION

The present invention relates to a magneto-optical recording medium such as a magneto-optical disk, a magneto-optical tape, a magneto-optical card, and also relates to a recording and reproducing method and an optical head designed for the magneto-optical recording medium.

BACKGROUND OF THE INVENTION

Research and development on magneto-optical disks have been made as being rewritable optical disks, and some of the magneto-optical disks have been already practically used as external memory designed for computers.

In the magneto-optical disk, a magnetic thin film with perpendicular magnetization is used as a recording medium, and a light is used in recording and reproducing. Thus, compared with a floppy disk or a hard disk wherein a magnetic thin film with in-plane magnetization is used, the magneto-optical disk has larger recording capacity.

However, since recording density of the magneto-optical recording medium is determined by a size of the light beam used in recording and reproducing on the recording medium, there is a limit in increasing memory capacity.

More specifically, when the size of the recording bit and the interval between the recording bits are smaller than the light beam spot diameter, a plurality of recording bits exist including the adjoining recording bits in the light beam spot, which increases noise, thereby presenting the problem that the recording bits cannot be reproduced separately.

In order to increase the recording density, the diameter of the light beam spot can be made smaller by making shorter the wavelength of the laser (light source), or by making larger the number of aperture (NA) of the objective lens so as to have greater angle of conversion.

In order to produce a laser with a shorter wavelength, a semiconductor laser designed for producing a short wavelength laser has been researched and developed. However, the semiconductor laser of this type presents the problem that an output light intensity is too low to be used as a light source for recording and reproducing on and from the magneto-optical disk.

On the other hand, when adapting a method of making larger the NA, it is necessary to maintain the optical axis of the light beam to be converged onto the disk in a perpendicular direction to the surface of the magneto-optical disk. Otherwise, the light beam spot diameter on the recording medium becomes larger on the contrary. Namely, when the NA is made larger, the precision in assembling optical system of the magneto-optical disk device or the restitution of the magneto-optical disk must be more strictly controlled than the conventional model, in order to prevent the problem that the light beam spot diameter becomes larger.

Therefore, at present, a wavelength of the semiconductor laser used in the magneto-optical disk is set in a range of 780–830 nm, and the NA of the objective lens is set in a range of 0.45–0.55. Accordingly, a light beam spot diameter on the recording medium is set in a range of 1.7–2.0 $\mu$m.

In accordance with the light beam spot diameter, a truck pitch of the magneto-optical disk, i.e., an interval between the recording bits in a radial direction of the magneto-optical disk is set in a range of 1.4–1.6 $\mu$m.

If the light beam spot diameter is made smaller than the above, it is necessary to prevent the crosstalk which disturbs information recorded on the adjoining trucks. In order to prevent the crosstalk, a compensating circuit for carrying out a special waveform processing is required to be separately provided, thereby presenting the problem that the magneto-optical disk device becomes complicated.

In the case of carrying out an overwriting operation by the magnetic field modulation onto the magneto-optical disk, in order to obtain a sufficient size of the magnetic field, the magnetic field generation mechanism is required to be set close to the magneto-optical disk. Moreover, the magnetic field cannot be modulated at high speed.

In order to counteract the above problems, as disclosed in the Japanese Laid Open Patent Publication No. 62-175948 (Tokukaisho 175948/1987), an overwriting method by the light intensity modulation in which using a magneto-optical recording medium of a double layer structure of a recording layer composed of a magnetic thin film with perpendicular magnetization and a recording subsidiary layer, an overwriting operation is carried out by modulating only the laser power has been proposed.

In the above overwriting method by the light intensity modulation, when carrying out an overwriting operation, the magnetization direction of the recording subsidiary layer also changes. Thus, whenever an overwriting operation is to be carried out, it is necessary to arrange the magnetization direction of the recording subsidiary layer. When adapting the above method, not only the recording magnetic field generating mechanism, an initialization-use magnetic field generating mechanism is also required, thereby presenting the problems that the magneto-optical disk device becomes larger in size and that the manufacturing costs thereof increases.

SUMMARY OF THE INVENTION

An object of the present invention is to provide a magneto-optical recording medium whereon a high density recording is permitted and to provide a method of recording and reproducing information on and from the recording medium and also to provide an optical head used in recording and reproducing information on and from the magneto-optical medium.

In order to achieve the above object, the magneto-optical recording medium of the present invention is characterized by comprising:

a base having a property that a light can be transmitted therethrough;

a readout layer formed on said base, which has in-plane magnetization at room temperature, whereas, a transition occurs from in-plane magnetization to perpendicular magnetization as temperature rises; and a recording layer formed on the readout layer, for recording thereon information magneto-optically.

According to the above arrangement, in reproducing, when a light beam is projected onto the readout layer, the temperature distribution of the light projected portion shows a Gaussian distribution, and thus only the temperature of the central portion which is smaller than the light beam diameter is raised.

As the temperature rises, a transition occurs in the light projected portion form in-plane magnetization to perpendicular magnetization. Here, by the exchange coupling force exerted between the readout layer and the recording layer, the magnetization direction of the readout layer is arranged in the magnetization direction of the recording layer.

When a transition occurs from in-plane magnetization to perpendicular magnetization in the portion having a temperature rise, polar Kerr effect is shown only in the portion, thereby reproducing information based on the light reflected therefrom.

When a light beam is shifted so as to reproduce the next recording bit, the temperature of the previously reproduced potion is cooled off, and thus a transition occurs from perpendicular magnetization to in-plane magnetization in the portion and the polar Kerr effect is no longer shown in the portion. This means that the magnetization recorded on the recording layer is not readout by being masked by the in-plane magnetization of the readout layer. Therefore, information is no longer reproduced from the spot having the temperature drop and thus interference by signals from the adjoining bits, which is the case of generating noise is eliminated.

As described, in the above arrangement, only the portion having a temperature rise above predetermined temperature is subjected to reproduction. Therefore, the reproduction of a smaller recording bit is enabled compared with the conventional model, thereby permitting an improvement in the recording density.

Furthermore, by adapting, for example, GdFeCo of rare-earth transition metal alloy for the readout layer, the readout layer in which a transition occurs quickly from in-plane magnetization to perpendicular magnetization can be achieved. As a result, noise generated in reproducing can be reduced, thereby providing a magneto-optical recording medium which permits high density recording.

Furthermore, in order to achieve the above object, a recording and reproducing method of the present invention for recording and reproducing information on and from a recording medium comprising a base having a property that a light can be transmitted therethrough, a readout layer formed on the base, which has in-plane magnetization at room temperature, and a transition occurs from in-plane magnetization to perpendicular magnetization as temperature rises, and a recording layer formed on the readout layer, for recording thereon information magneto-optically, wherein the readout layer made of rare-earth transition metal alloy is set so as to have its compensation temperature outside the range of room temperature—Curie temperature, and the content of the rare-earth metal is greater than the maximum amount at compensating composition, is characterized in that the magnetization direction of the recording layer is reversed by projecting a laser beam whose intensity is changed between a relatively high power of the first power and a relatively low power of the second power while a constant magnetic field for magnetizing the readout layer is being applied, so as to record information, and in that the magnetization in an area smaller than the laser spot diameter of the readout layer is changed to perpendicular magnetization by projecting a laser beam having a lower power lower than the first laser beam, and the sub-lattice magnetization in the area having a perpendicular magnetization of the readout layer is arranged in a stable direction with respect to the sub-lattice magnetization of the recording layer, thereby reproducing information from the area having perpendicular magnetization of the readout layer.

In the above arrangement, a high density recording and reproducing is permitted on and from the magneto-optical disk having the above configuration.

In order to achieve the above object, the optical head of the present invention comprises a semiconductor laser, a collimator lens for converging a laser beam generated from the semiconductor laser into a parallel beam, and an objective lens for converging a light beam onto the readout layer, wherein the aperture of the objective lens is set smaller than the diameter of the light beam.

In the above arrangement, the light beam spot diameter by the main robe can be set smaller, the information recorded at high density can be reproduced. Moreover, when the magneto-optical recording medium is adapted, the effect from the crosstalk due to the side robe can be avoided.

For a fuller understanding of the nature and advantages of the invention, reference should be made to the ensuing detailed description taken in conjunction with the accompanying drawings.

BRIEF DESCRIPTION OF THE DRAWINGS

FIG. 1 through FIG. 38 and FIG. 47 through FIG. 53 show the first embodiment of the present invention.

FIG. 1 which shows a schematic configuration of a magneto-optical disk is an explanatory view showing a reproducing operation.

FIG. 2 is an explanatory view which shows a magnetic phase of a readout layer of the magneto-optical disk of FIG. 1.

FIG. 3 is an explanatory view showing a relationship between an external magnetic field to be applied onto the readout layer and a polar Kerr rotation angle in a range of room temperature—$T_1$ of FIG. 2.

FIG. 4 is an explanatory view showing a relationship between an external magnetic field to be applied onto the readout layer and a polar Kerr rotation angle in a range of $T_1$–$T_2$ of FIG. 2.

FIG. 5 is an explanatory view showing a relationship between an external magnetic field to be applied onto the readout layer and a polar Kerr rotation angle in a range of $T_2$–$T_3$ of FIG. 2.

FIG. 6 is an explanatory view showing a relationship between an external magnetic field to be applied onto the readout layer and a polar Kerr rotation angle in a range of $T_3$—Curie temperature $T_C$ of FIG. 2.

FIG. 7 is a graph which shows results of measurements of external magnetic field dependency at room temperature of the polar Kerr rotation angle of the readout layer of the magneto-optical disk of FIG. 1.

FIG. 8 is a graph which shows results of measurements of external magnetic field dependency at 120° C. of the polar Kerr rotation angle of the readout layer of the magneto-optical disk of FIG. 1.

FIG. 9 is a graph showing an amplitude of a reproducing signal from the magneto-optical disk of FIG. 1 with respect a reproducing laser power.

FIG. 10 is a graph showing a reproducing signal quality (C/N) of the magneto-optical disk of FIG. 1 with respect to a recording bit length.

FIG. 11 is a graph which shows the relationship between the crosstalk of the magneto-optical disk of FIG. 1 and the intensity of a reproducing light beam.

FIG. 12 is an explanatory view which shows effects of the magneto-optical disk of FIG. 1.

FIG. 13 is a graph which shows composition dependencies of Curie temperature ($T_C$) and compensation temperature ($T_{comp}$) of $Gd_X(Fe_{0.82}Co_{0.18})_{1-X}$.

FIG. 14 is a graph which shows composition dependencies of Curie temperature ($T_C$) and compensation temperature ($T_{comp}$) of $Gd_XFe_{1-X}$.

FIG. 15 is a graph which shows composition dependencies of Curie temperature ($T_C$) and compensation temperature ($T_{comp}$) of $Gd_XCo_{1-X}$.

FIG. 16 is an explanatory view showing an example of the respective shapes of a land and a groove formed on a substrate of the magneto-optical disk of FIG. 1.

FIG. 17 is an explanatory view showing another example of the respective shapes of a land and a groove formed on a substrate of the magneto-optical disk of FIG. 1.

FIG. 18 is an explanatory view showing an example of an arrangement of wobble pit formed on the substrate of the magneto-optical disk of FIG. 1.

FIG. 19 is an explanatory view showing another example of an arrangement of wobble pit formed on the substrate of the magneto-optical disk of FIG. 1.

FIG. 20 is an explanatory view showing an example of the wobble groove formed on the substrate of the magneto-optical disk of FIG. 1.

FIG. 21 is an explanatory view showing a recording and reproducing method using a plurality of light beams on and from the magneto-optical disk of FIG. 1.

FIG. 22 is an explanatory view showing an overwrite recording method by the magnetic field modulation on the magneto-optical disk of FIG. 1.

FIG. 23 is an explanatory view which shows a recording method by the light intensity modulation on the magneto-optical disk of FIG. 1, and shows a method for magnetization the readout layer and the recording layer.

FIG. 24 is an explanatory view which shows an overwrite recording method by the light intensity modulation on the magneto-optical disk of FIG. 1, and shows a temperature dependency of respective coercive forces of the readout layer and the recording layer.

FIG. 25 is an explanatory view showing an example of the light beam intensity to be projected onto the magneto-optical disk of FIG. 1 when overwriting by the light intensity modulation and reproducing.

FIG. 26 is an explanatory view showing another example of the light beam intensity to be projected onto the magneto-optical disk of FIG. 1 when overwriting by the light intensity modulation and when reproducing.

FIG. 27 is an explanatory view showing still another example of the light beam intensity to be projected onto the magneto-optical disk of FIG. 1 when overwriting by the light intensity modulation and when reproducing.

FIG. 28 is an explanatory view showing the magneto-optical disk of a single-sided type of FIG. 1.

FIG. 29 is an explanatory view showing the magneto-optical disk of double-sided type of FIG. 1.

FIG. 30 is an explanatory view showing a schematic configuration of a sample used in measuring Kerr rotation angle enhancing effect when an element is added onto the readout layer of the magneto-optical disk of FIG. 1.

FIG. 31 is a graph showing a wavelength dependency of Kerr rotation angle of the sample of FIG. 30.

FIG. 32 is an explanatory view showing a schematic configuration of a sample used in measuring an improvement in the humidity resistance when an element is added to the readout layer of the magneto-optical disk of FIG. 1.

FIG. 33 is a graph which shows a change as time passes of C/N of the sample of FIG. 32.

FIGS. 34(a)–(d) are graphs respectively showing Kerr hysteresis loops measured at different film thickness of the readout layer of the magneto-optical disk of FIG. 1:

FIG. 34(a) is a graph which shows Kerr hysteresis loop of the magneto-optical disk having a readout layer with a thickness of 20 nm;

FIG. 34(b) is a graph which shows Kerr hysteresis loop of the magneto-optical disk having a readout layer with a thickness of 30 nm;

FIG. 34(c) is a graph which shows Kerr hysteresis loop of the magneto-optical disk having a readout layer with a thickness of 40 nm; and FIG. 34(d) is a graph which shows Kerr hysteresis loop of the magneto-optical disk having a readout layer with a thickness of 50 nm.

FIG. 35 is a graph which shows a squareness ratio of the readout layer of the magneto-optical disk of FIG. 1 with respect to a film thickness at every compensation temperature.

FIG. 36 is an explanatory view showing a method for calculating the squareness ratio from FIGS. 34(a)–34(b).

FIG. 37 is a graph which shows a squareness ratio of the readout layer of the magneto-optical disk of FIG. 1 with respect to the film thickness at every Curie temperature.

FIG. 38(a) is a graph which shows a Kerr loop of the magneto-optical disk having a recording layer made of TbFeCo; and FIG. 38(b) is a graph which shows a Kerr loop of the magneto-optical disk having a recording layer made of DyFeCo.

FIG. 47 is an explanatory view which shows a cross-sectional view of the magneto-optical disk of FIG. 1.

FIG. 48 is an explanatory view which shows a cross-sectional view of the magneto-optical disk used as a comparative example.

FIG. 49(a) is an explanatory view showing an expanded recording bit of the magneto-optical disk of FIG. 47; and FIG. 49(b) is an explanatory view showing an expanded recording bit used in the magneto-optical disk of FIG. 48.

FIG. 50 is a block diagram showing a configuration of an optical head for recording and reproducing information on and from the magneto-optical disk of FIG. 1.

FIG. 51 is an explanatory view showing a relationship between the main robe and the side robe of the light beam.

FIG. 52 is an explanatory view which shows the relationship between the main robe and the side robe of the light beam and which shows respective light beam intensities of the robes.

FIG. 53 is an explanatory view which shows a light beam intensity distribution when a/w is changed.

DESCRIPTION OF THE EMBODIMENTS

The following description will discuss the first embodiment of the present invention in reference to FIGS. 1–38 and FIGS. 47–53.

Figure 1:
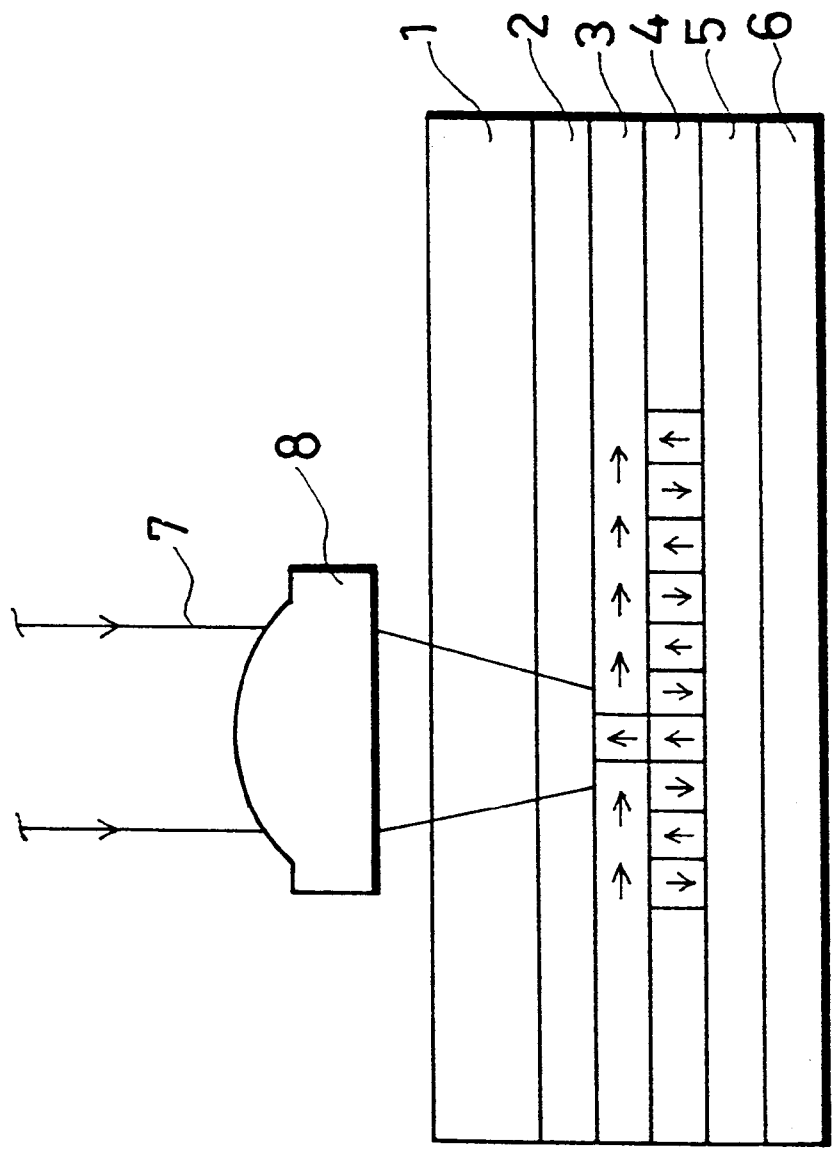

As shown in FIG. 1, a magneto-optical disk (magneto-optical recording medium) of the present embodiment is composed of a substrate 1 (base) whereon a transparent dielectric film 2, a readout layer 3, a recording layer 4, a protective film 5 and an overcoat film 6 are laminated in this order.

Figure 2:
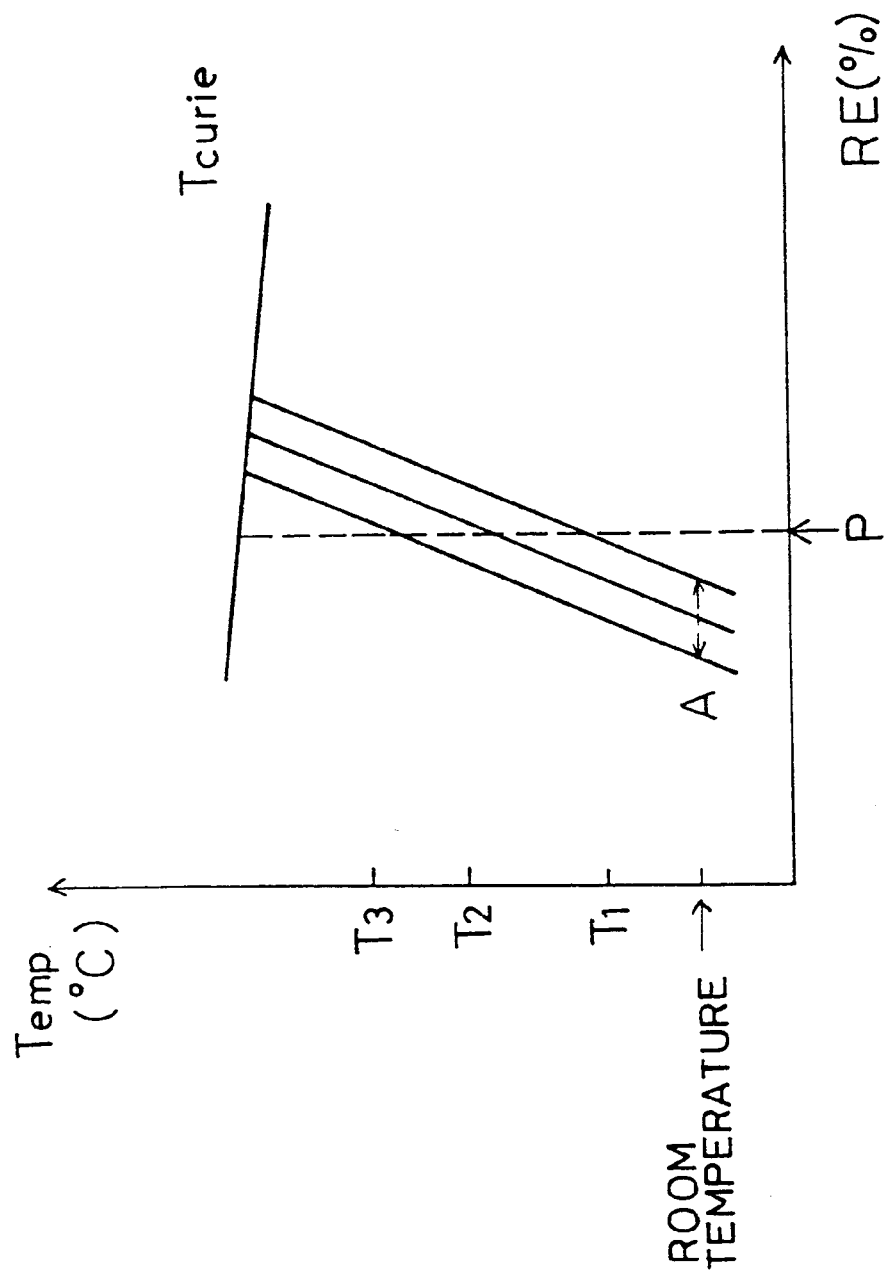

As shown in the magnetic phase diagram of FIG. 2, a composition range where the rare-earth transition metal alloy used in the readout layer 3 has perpendicular magnetization (shown by A in the figure) is extremely narrow. This is because the perpendicular magnetization appears only in the vicinity of a compensating composition where the magnetic moment of the rare-earth metal and the magnetic moment of the transition metal balance with one another. In FIG. 2, x-axis indicates the content of rare-earth metal, and y-axis indicates temperature.

The respective magnetic moments of the rear-earth metal and the transition metal have mutually different temperature dependencies. Specifically, the magnetic moment of the transition metal is greater than that of the rare-earth metal at high temperature. Thus, the composition of alloy is set such that the content of the rare-earth metal is greater than that in the compensating composition at room temperature so that the alloy does not have perpendicular magnetization at room temperature but has in-plane magnetization. When a light beam is projected, as the temperature of the portion irradiated with the light beam is raised, the magnetic moment of the transition metal becomes greater until it balances with that of the rare-earth metal, thereby having perpendicular magnetization.

FIG. 3 through FIG. 6 show one example of the hysteresis characteristic of the readout layer 3. In the figures, x-axis indicates an external magnetic field (Hex) to be applied perpendicularly onto the surface of the readout layer 3, and y-axis indicates polar Kerr rotation angle (θk) when a light beam is incident perpendicularly on the surface of the readout layer 3.

Figure 3:
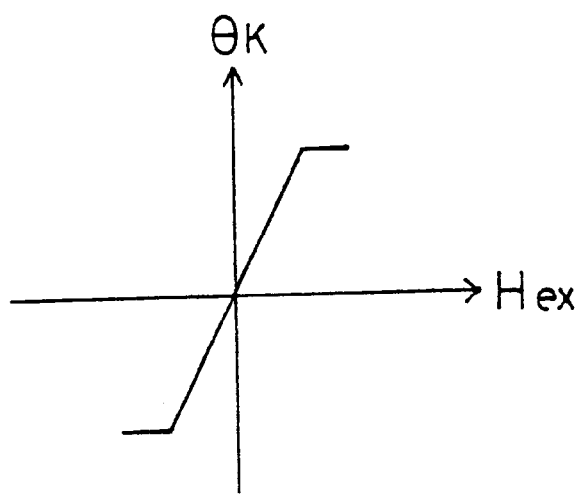
Figure 4:
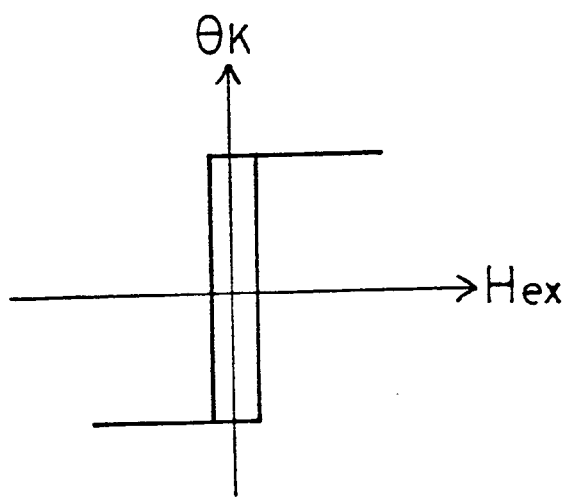
Figure 5:
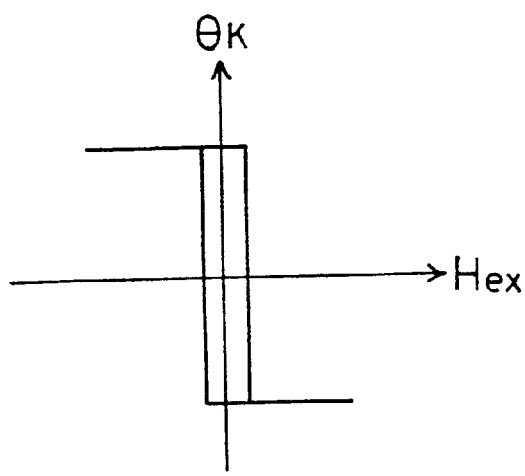
Figure 6:
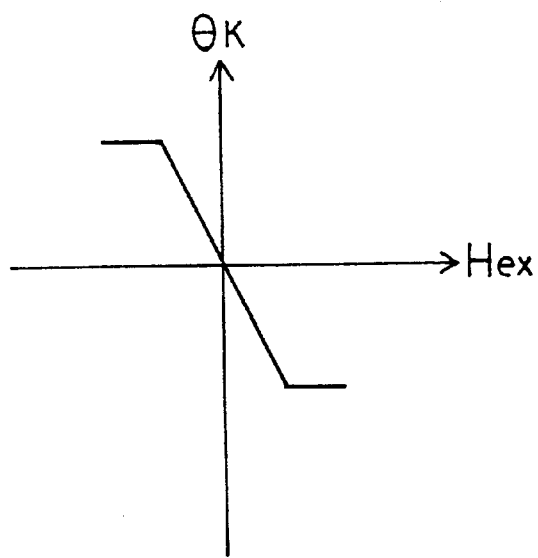

FIG. 3 shows hysteresis characteristic of the readout layer 3 in a temperature range of room temperature —$T_1$, the readout layer 3 having the composition shown by P in the magnetic phase diagram of FIG. 2. FIGS. 4 through 6 respectively show hysteresis characteristics in temperature ranges of $T_1$–$T_2$; $T_2$–$T_3$; and $T_3$ —Curie temperature $T_C$.

In the temperature range of $T_1$–$T_3$, the readout layer 3 shows such a hysteresis characteristic that an abruptly rising of Kerr rotation angle appears with respect to the external magnetic field. In other temperature ranges, however, the polar Kerr rotation angle is substantially zero.

With the use of the rare-earth transition metal having the above properties in the readout layer 3, a high density recording on the magneto-optical disk can be achieved. Namely, the reproduction of a recording bit with a size smaller than the size of a light beam is enabled as explained below.

In reproducing, the reproduction-use light beam 7 is projected onto the readout layer 3 through the converging lens 8 from the side of the substrate 1 (see FIG. 1). In the area irradiated with the light beam 7, the central portion has the greatest temperature rise, and thus the temperature of the central portion becomes higher than the temperature of the peripheral portion. More specifically, since the reproduction-use light beam 7 is converged to a diffraction limit by the converging lens 8, the light intensity distribution shows a Gaussian distribution, and thus the temperature distribution of the portion subjected to reproduction of the magneto-optical disk also shows a virtual Gaussian distribution.

In the case where the reproduction-use light beam 7 is set such that the temperature of the central portion of the irradiated area is raised above $T_1$ and the temperature of the peripheral portion is not raised above $T_1$, only the portion having a temperature rise above $T_1$ is subjected to reproduction. Thus, the reproduction of a recording bit with a size smaller than the diameter of the reproduction-use light beam 7 is permitted, thereby achieving a significant improvement in the recording density.

A transition occurs in the portion having a temperature above $T_1$ from in-plane magnetization to perpendicular magnetization. The hysteresis characteristic of the polar Kerr rotation angle changes from the hysteresis characteristic shown in FIG. 3 to the hysteresis characteristic shown in FIG. 4 or FIG. 5. Here, by the exchange coupling force exerted between the readout layer 3 and the recording layer 4, the magnetization of the recording layer 4 is copied to the readout layer 3. On the other hand, since the temperature of the peripheral portion, i.e., outside the area corresponding to the vicinity of the center of the reproduction-use light beam 7 is not raised above $T_1$, the in-plane magnetization is maintained in the peripheral portion (see FIG. 3). As a result, the polar Kerr effect is not shown with respect to the reproduction-use light beam 7 projected perpendicularly onto the film surface.

As described, when a transition occurs from in-plane magnetization to perpendicular magnetization in the area having a temperature rise, the polar Kerr effect is shown only in the area corresponding to the vicinity of the central portion of the reproduction-use light beam 7, and information recorded on the recording layer 4 is reproduced based on the reflected light from the irradiated area.

When the reproduction-use light beam 7 is shifted (in practice, the magneto-optical disk is rotated) so as to reproduce the next recording bit, the temperature of the previous bit drops below $T_1$ and the transition occurs from perpendicular magnetization to in-plane magnetization. Accordingly, the polar Kerr effect is no longer shown in the spot having the temperature drop. Therefore, information is no longer reproduced from the spot having the temperature drop and thus interference by signals from the adjoining bits, which causes noise, is eliminated.

As described, the magneto-optical disk of the present invention permits a reproduction of a recording bit with a size smaller than the diameter of the reproduction-use light beam 7 without being affected by the adjoining recording bits, thereby achieving a significant improvement in the recording density.

Next, an optical head designed for a magneto-optical recording and reproducing device for recording and reproducing information on and from the magneto-optical disk having the above arrangement will be explained below.

Figure 50:
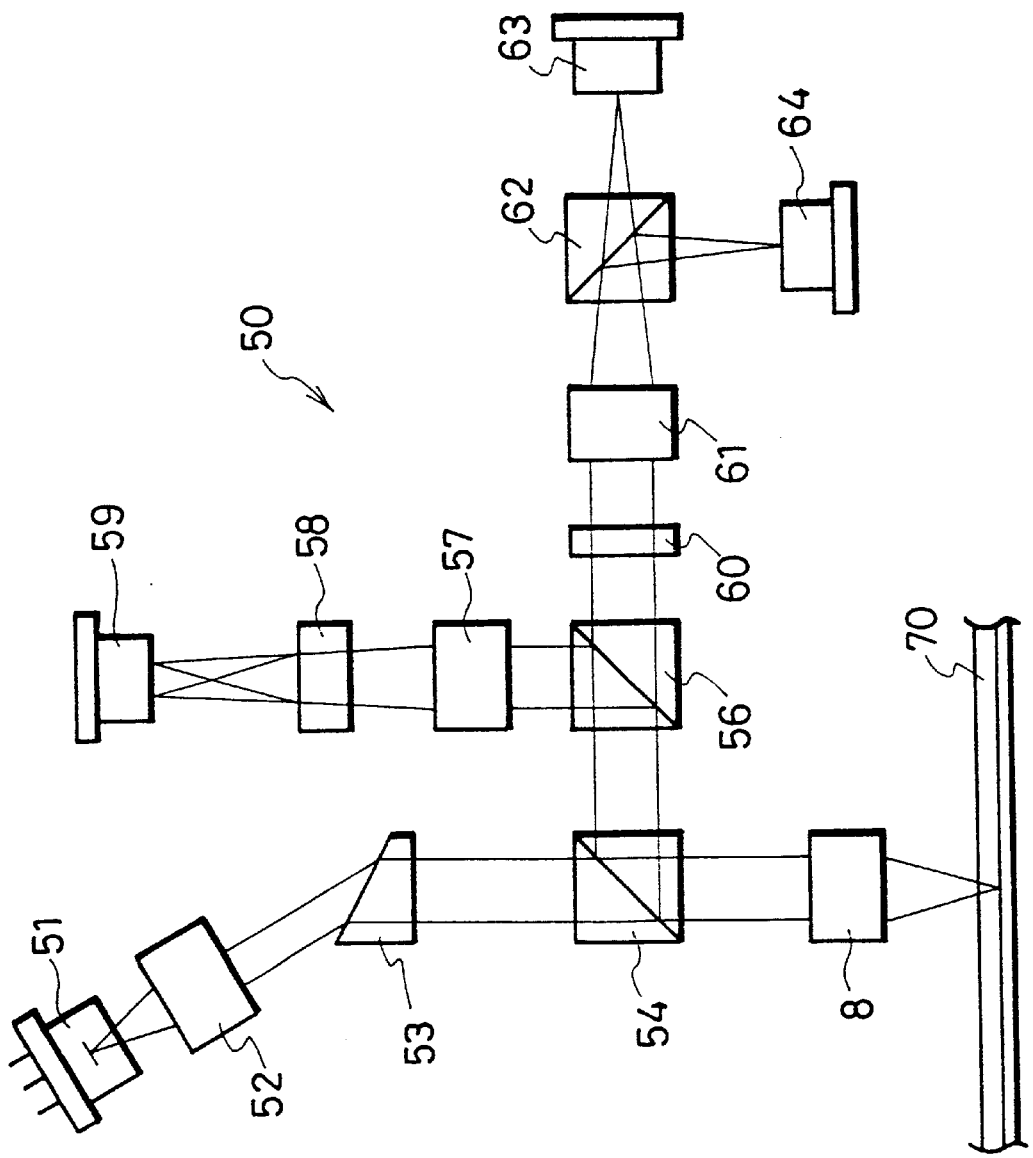

As shown in FIG. 50, an optical head 50 is composed of a semiconductor laser 51 (light source), a collimating lens 52, a shaping prism 53, beam splitters 54 and 56, an objective lens (converging lens) 8, lens 57 and 61, a cylindrical lens 58, photodetectors 59, 63 and 64, a plate with ½ wavelength 60 and a polarizing beam splitter 62.

A light beam emitted from the semiconductor laser 51 is converged by the collimating lens 52 into a parallel light beam with a diameter w larger than the diameter a of the aperture of the objective lens 8. The light beam transmitted through the collimating lens 52 is formed into a circular shape by the shaping prism 53. Thereafter, it is converged onto a predetermined position of a magneto-optical disk 70 through the beam splitter 54 and the objective lens 8. A light reflected from the magneto-optical disk 70 is reflected from the beam splitter 54 after being transmitted through the objective lens 8, and is finally incident on the beam splitter 56 where the reflected light is divided into two. One of the reflected light is directed to the photodetector 59 through the lens 57 and the cylindrical lens 58. In the photodetector 59, a signal is detected for carrying out focus servo and radial servo. On the other hand, the other reflected light is incident on the polarizing beam splitter 62 through the plate with ½ wavelength 60 and the lens 61. Then, after being further divided into two, they are respectively directed to the photodetectors 63 and 64, thereby detecting a magneto-optical signal, i.e., information recorded on the magneto-optical disk 70. It should be noted here that the configuration of the optical head is not limited to the above configuration of the optical head 50. Other configurations are available as long as the radius of the main robe can be made smaller by making a/w smaller as will be described later.

Next, the relationship between the diameter w of the light beam and the diameter a of the aperture of the objective lens 8 will be explained below.

Figure 51:
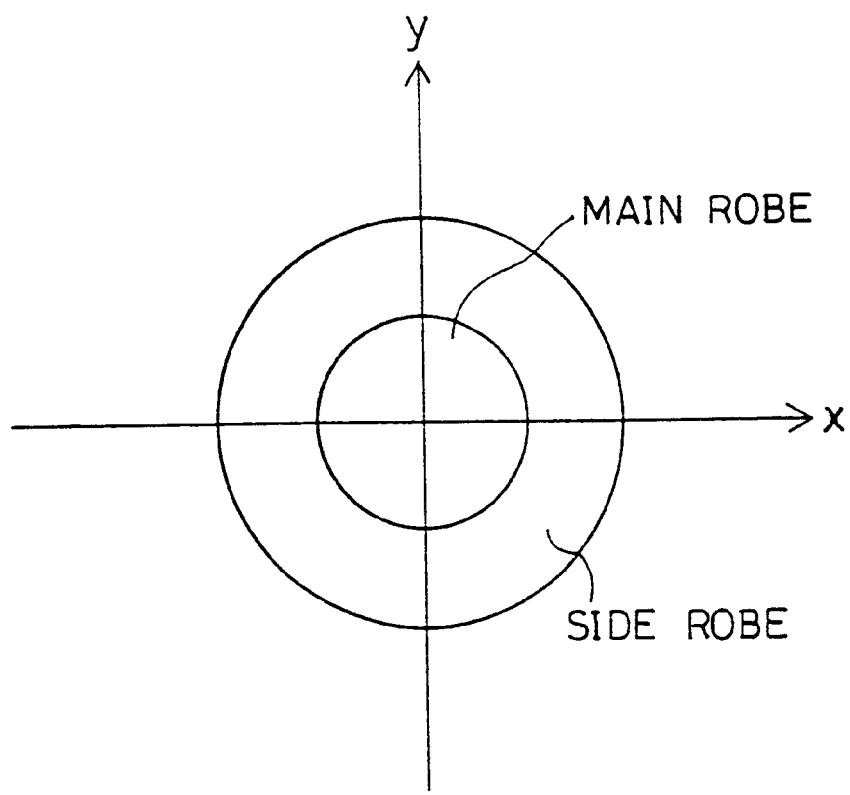
Figure 52:
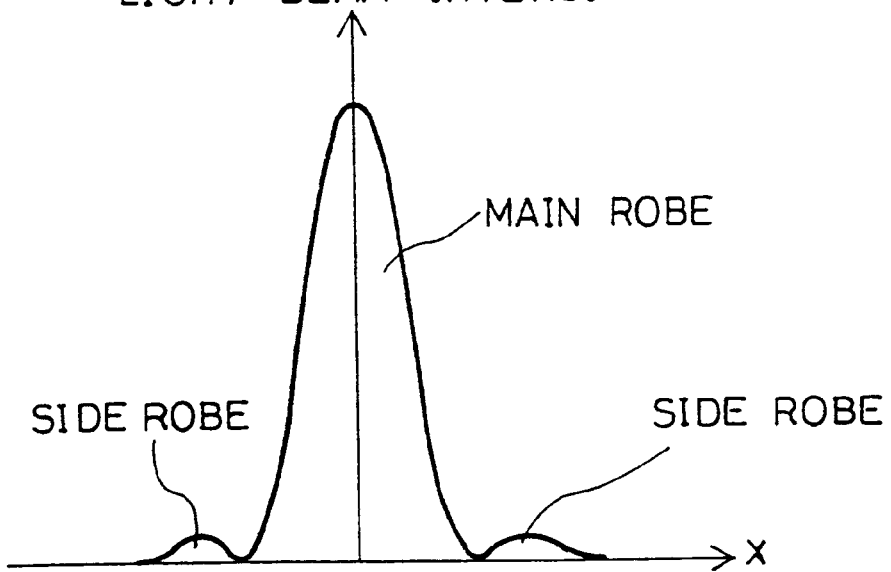
Figure 53:
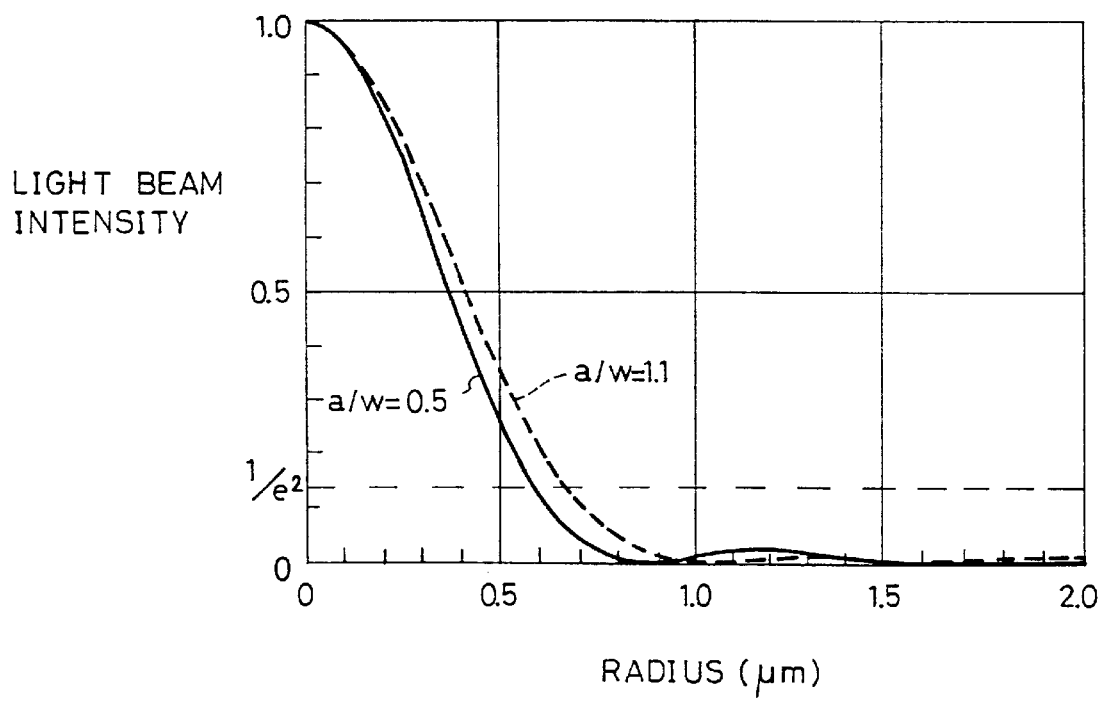

As shown in FIG. 51 and FIG. 52, when a light beam is converged, a light spot composed of a circular main robe having a light beam intensity of Gaussian distribution and a side robe of a concentric circle appeared surrounding the main robe is formed. Here, the larger the diameter w of the light beam relative to the diameter a of the aperture, i.e., the smaller the a/w, the radius of the main robe can be made smaller; on the contrary, the side robe becomes greater and thus the light beam intensity becomes greater. For example, as shown in FIG. 53, when a/w=1.1, the side robe hardly appears. On the other hand, when a/w=0.5, the side robe clearly appears. Here, the radius of the main robe when a/w=0.5 (the distance from the center of the light spot to the position at which the light beam intensity becomes $1/e^2$) is substantially 87% of the radius of the main robe when a/w=1.1.

The recording density of the magneto-optical disk 70 is determined by the size of the spot of the light beam used in recording and reproducing. As described, when the radius of the main robe is made smaller, the radius of the side robe becomes larger. However, in the above magneto-optical disk, even when an optical head with a/w below 1 is used, the recording bit will not be reproduced from the side robe for the following reason: Even if the temperature of the irradiated area in the side robe of the readout layer 3 is slightly raised, the in-plane magnetization is maintained in the irradiated area of the readout layer 3, and thus the magnetic Kerr effect is not shown in the irradiated area in the side robe, thereby eliminating the problem that the signal from the recording bit on the irradiated area of the side robe interferes the signal from the recording bit reproduced from the main robe. Therefore, even if a/w is made smaller, i.e., the diameter w of the light beam is made larger than the diameter a of the aperture of the objective lens 8 and the radius of the main robe, is made smaller, desirable recording and reproducing operations can be ensured, thereby achieving a high density recording on the magneto-optical disk.

An example of the magneto-optical disk of the present embodiment is shown below.

The substrate 1 is made of a disk-shaped glass with a diameter of 86 mm, an inner diameter of 15 mm and a thickness of 1.2 mm. Although it is not shown, a guide truck for guiding a light beam is formed in a concave-convex shape with a pitch of 1.6 μm, a groove width of 0.8 μm and a land width of 0.8 μm. Namely, the substrate 1 is formed so that the width of the groove width the land width is 1:1.

On the surface of the substrate 1 whereon the guide truck is formed, AlN with a thickness of 80 nm is formed as a transparent dielectric film 2.

For the readout layer 3, a rare-earth transition metal alloy thin film made of GdFeCo with a thickness of 50 nm is formed on the transparent dielectric film 2. The composition of GdFeCo is $Gd_{0.26}(Fe_{0.82}Co_{0.18})_{0.74}$, and the Curie temperature thereof is at around 300° C.

For the recording layer 4, rare-earth transition metal alloy thin film made of GdFeCo with a thickness of 50 nm is formed on the readout layer 3. The composition of GdFeCo is $Gd_{0.23}(Fe_{0.78}Co_{0.22})_{0.77}$, and Curie temperature thereof is at around 200° C.

With the combination of the readout layer 3 and the recording layer 4, the magnetization direction of the readout layer 3 has in-plane magnetization at room temperature (i.e., in the direction of the readout layer 3), and a transition occurs from in-plane magnetization to perpendicular magnetization in a temperature range of 100° C.–125° C.

For the protective film 5, AlN with a thickness of 20 nm is formed on the recording layer 4.

For the overcoat film 6, ultraviolet hardening resin from polyurethane acrylate series with a thickness of 5 μm is formed on the protective film 5.

The manufacturing process of the magneto-optical disk will be explained below.

The guide truck on the surface of the glass substrate 1 is formed by reactive ion etching method.

The transparent dielectric film 2, the readout layer 3, the recording layer 4 and the protective film 5 are respectively formed by the sputtering method under vacuum in a common sputtering device. AlN for use in the transparent dielectric film 2 and the protective film 5 was formed in $N_2$ gas atmosphere by the reactive sputtering method in which the sputtering of Al target was carried out. The readout layer 3 and the recording layer 4 were formed by sputtering a composite target whereon Gd tip or Dy tip was arranged on a FeCo alloy target, or ternary alloy target of GdFeCo and DyFeCo using Ar gas.

The overcoat film 6 was formed by applying an ultraviolet hardening resin from polyurethane acrylate series by a spin coating machine, and thereafter, applying ultraviolet ray by an ultraviolet ray application unit so as to harden it.

Next, the results of performance tests conducted using the above magneto-optical disk will be explained.

With the combination of the readout layer 3 and the recording layer 4, the readout layer 3 has in-plane magnetization at room temperature, and a transition occurs from in-plane magnetization to perpendicular magnetization in a temperature range of 100–125° C.

Figure 7:
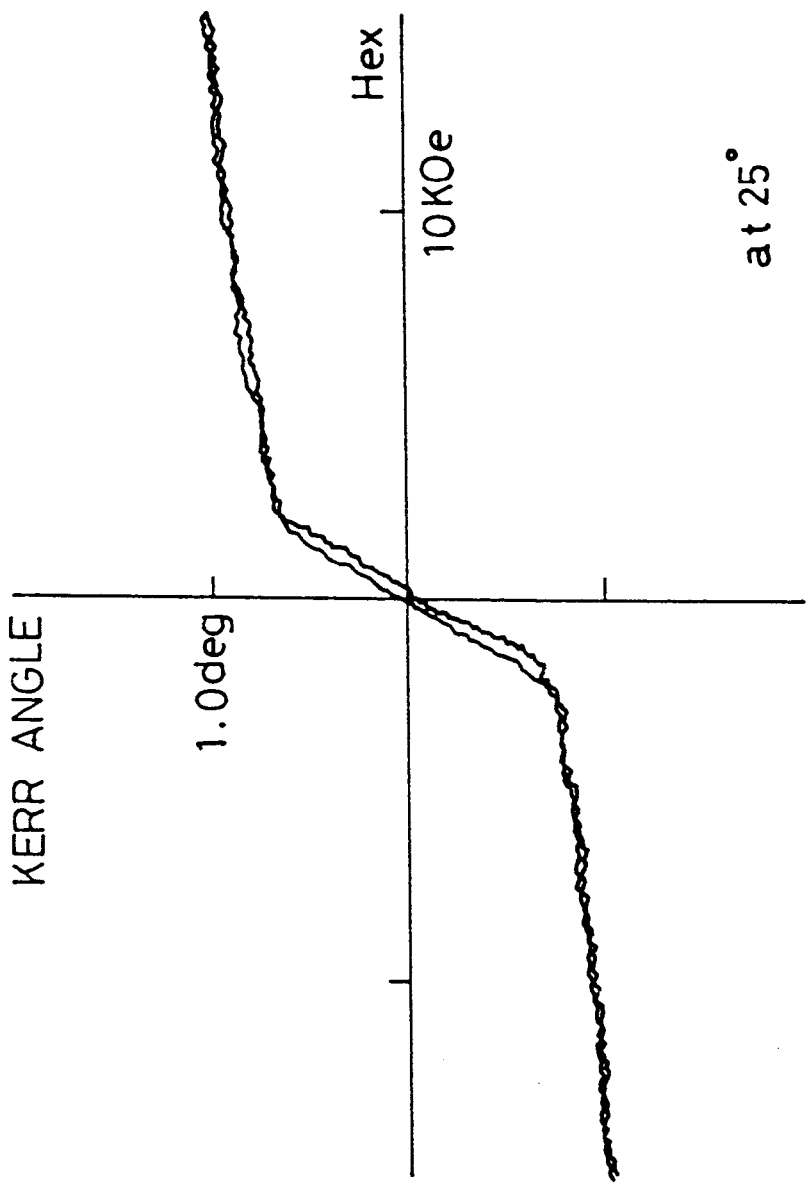
Figure 8:
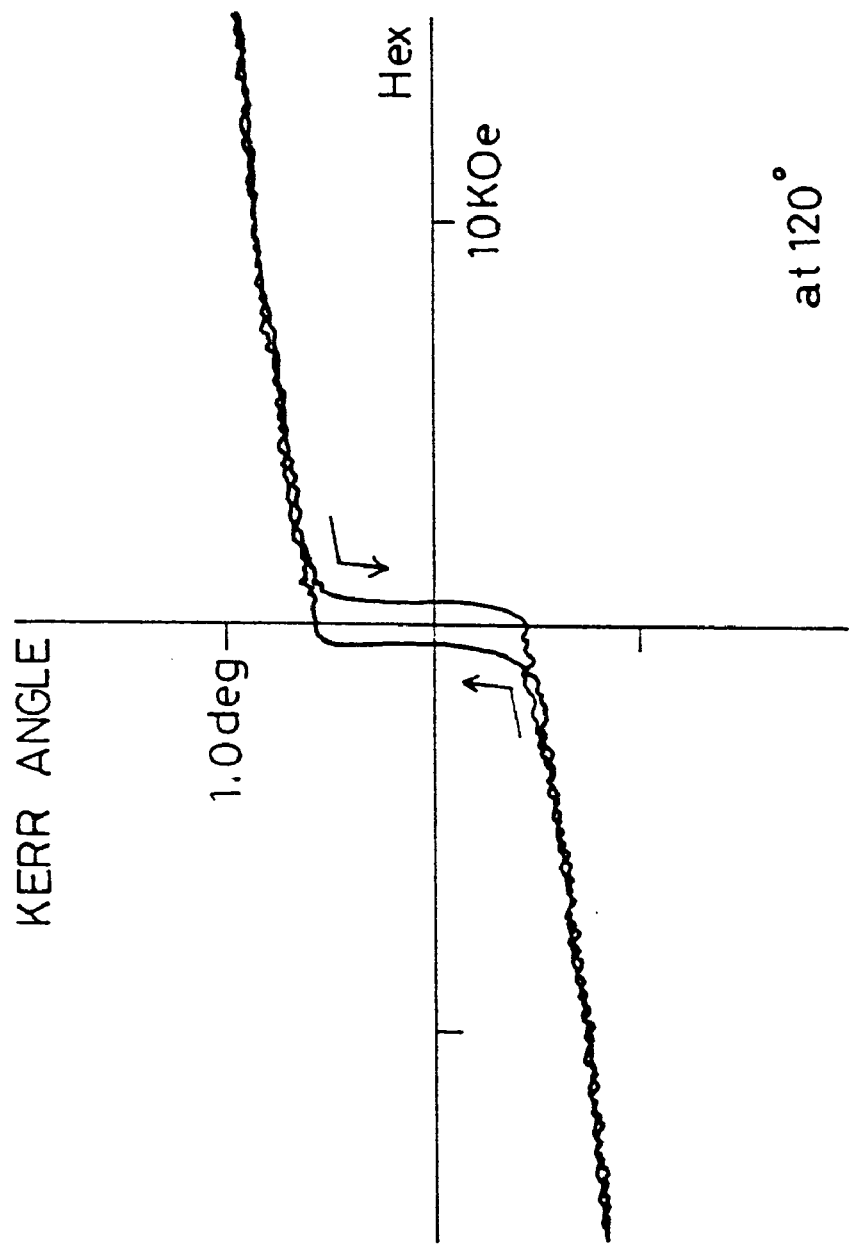

FIG. 7 and FIG. 8 show respective hysteresis characteristics of polar Kerr rotation angles actually measured at different temperatures. FIG. 7 shows hysteresis characteristic at room temperature (25° C.), and the polar Kerr rotation angle when the external magnetic field (Hex) was not applied was substantially zero. This is because the magnetization perpendicular to the film surface is hardly shown, the magnetization is arranged in a in-plane direction. FIG. 8 shows hysteresis characteristic at 120° C. As can be seen from the graph, the polar Kerr rotation angle of 0.5 deg is shown, and thus it can be seen that a transition occurs from in-plane magnetization to perpendicular magnetization even when the external magnetization is zero.

The above performance tests were carried out to check the static properties. Next, the experimental results of measuring the dynamic properties using the optical pickup will be explained. The optical pickup used in the experiment has a semiconductor with a laser wavelength of 780 nm and an objective lens with a numerical aperture (N.A) of 0.55 and s/w=1.1.

A recording bit of a uniform frequency with a length of 0.765 $\mu$m was recorded on the land at a 26.5 mm radial position of the magneto-optical disk rotating at 1800 rpm (linear velocity of 5 m/sec). In recording, first, the magnetization direction of the recording layer 4 was arranged in one direction (erased state). Thereafter, the direction of the recording use external magnetic field was fixed in one direction opposite to the direction of the erased state. Then, a laser beam was modulated at a recording frequency (substantially 3.3 MHz) corresponding to a length of 0.765 $\mu$m. The recording laser power was set around 8 mW.

Figure 9:
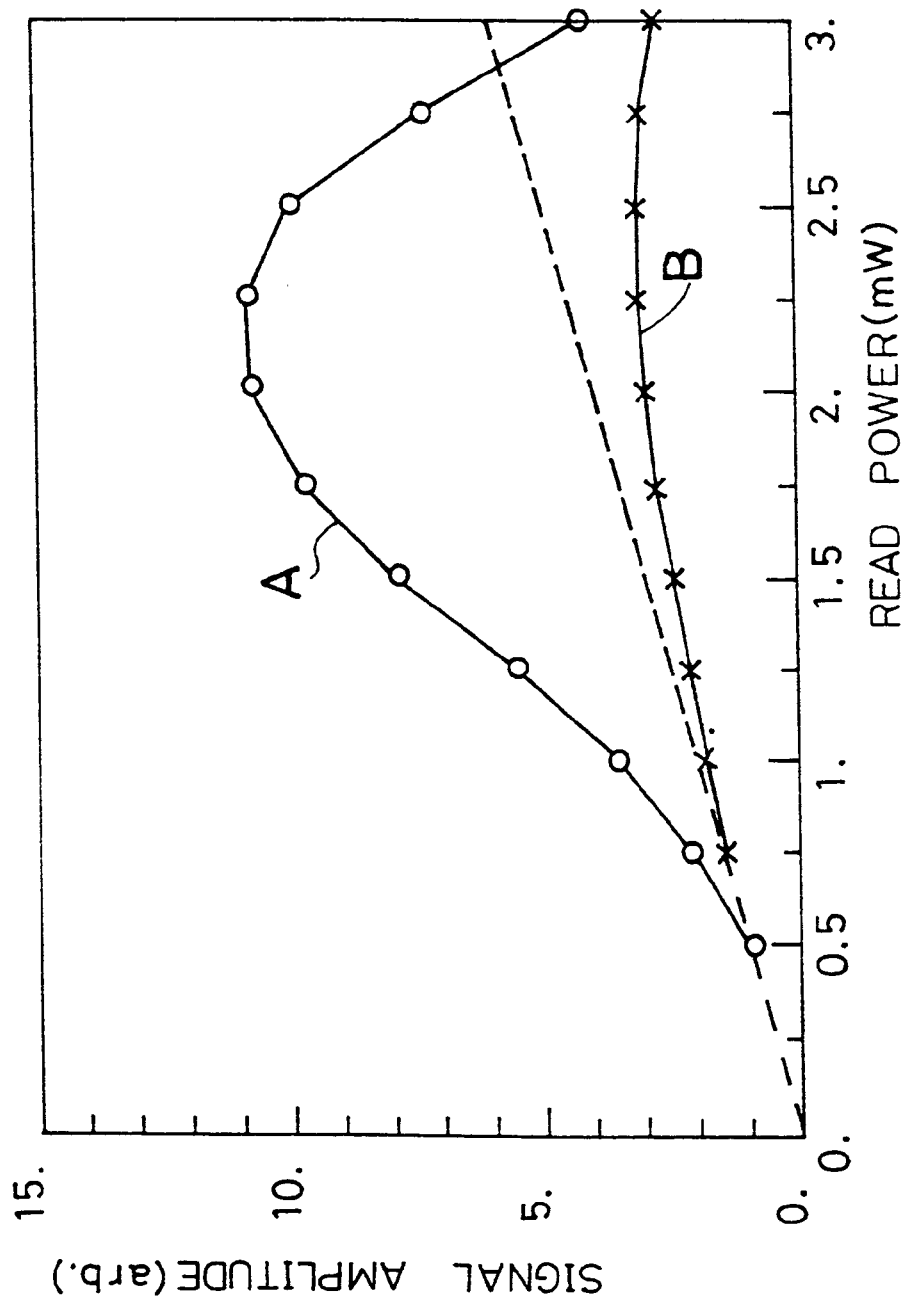

The recorded bit strings were reproduced by applying reproduction-use laser beams with different reproducing laser power. The measured amplitudes of the reproducing signal waveform is shown in FIG. 9. In the figure, x-axis indicates the reproducing laser power, and the measured reproducing laser power was in a range of 0.5–3 mW. Y-axis indicates the amplitude of the reproducing signal, and the measured amplitudes were normalized at the reproducing laser power of 0.5 mW.

In the figure, the curved line A shows the results of measurement using the magneto-optical disk of the present invention, and the curved line B shows the results of measurement using the conventional magneto-optical disk as a comparative example.

The conventional magneto-optical disk is composed of the glass substrate 1, which is the same as the above-mentioned substrate 1, whereon AlN with a thickness of 80 nm, DyFeCo with a thickness of 20 nm, AlN with a thickness of 25 nm and AlNi with a thickness of 30 nm are laminated in this order. Further, the overcoat film which is the same as the above-mentioned overcoat film is formed on AlNi.

In this arrangement of the conventional magneto-optical disk, only a single magnetic layer made of DyFeCo which is rare-earth transition metal alloy is provided so as to be sandwiched between two transparent dielectric films made of AlN. Then, a reflective film made of AlNi is formed on the top. This configuration is called "reflective film structure", and has been already on the market as represented by 3.5 inch size single plate magneto-optical disk. As well known, the recording layer made of DyFeCo of the conventional magneto-optical disk has perpendicular magnetization at above from room temperature.

In FIG. 9, the dotted line connects 0 point (origin) and the amplitude value normalized at a laser power of 0.5 mW, which shows relationship between the amplitude of the reproducing signal of the magneto-optical signal and the reproducing laser power.

reproducing signal amplitude∝recording medium reflective light amount×polar Kerr rotation angle In the above formula, the recording medium reflective light amount increases in proportion to the reproducing laser power and thus it can be replaced with the reproducing laser power.

The curve B which shows the measured values using the conventional magneto-optical disk is located at lower position than the above linear line for the following reasons: as the reproducing laser power increases, reflective light amount from the recording medium increases; on the other hand, the temperature of the recording medium is raised. The magnetization of the magnetic substance in general has such a characteristic that it reduces as the temperature rises, and the magnetization disappears at Curie temperature. Therefore, in the conventional magneto-optical disk, since the polar Kerr rotation angle becomes smaller as the temperature rises, the curve is not on the linear line but below the linear line in the graph.

On the other hand, the curve A which shows the results of measurements of the magneto-optical disk of the present invention shows an abrupt increase in the signal amplitude as the reproducing laser power increases, and it is maximized at around 2–2.25 mW. Other than at a laser power of 3 mW, the curve B is located above the linear line. As can be seen, the amplitude increases in a higher proportion than the reproducing laser power. The result shows that at low temperature, the polar Kerr rotation angle hardly appears, and as temperature raises, a transition suddenly occurs from in-plane magnetization to perpendicular magnetization, which is reflected by the property of the readout layer 3 and gives substance of the performance of the readout layer 3.

The described measurements were carried out from the land. However, when the same measurements were carried out from the groove, the same results were obtained.

Next, the results of measurement of the reproducing signal quality with respect to the smaller recording bit will be explained. As the reproduction of a recording bit with a size smaller than the recording bit, the recording density can be improved.

Figure 10:
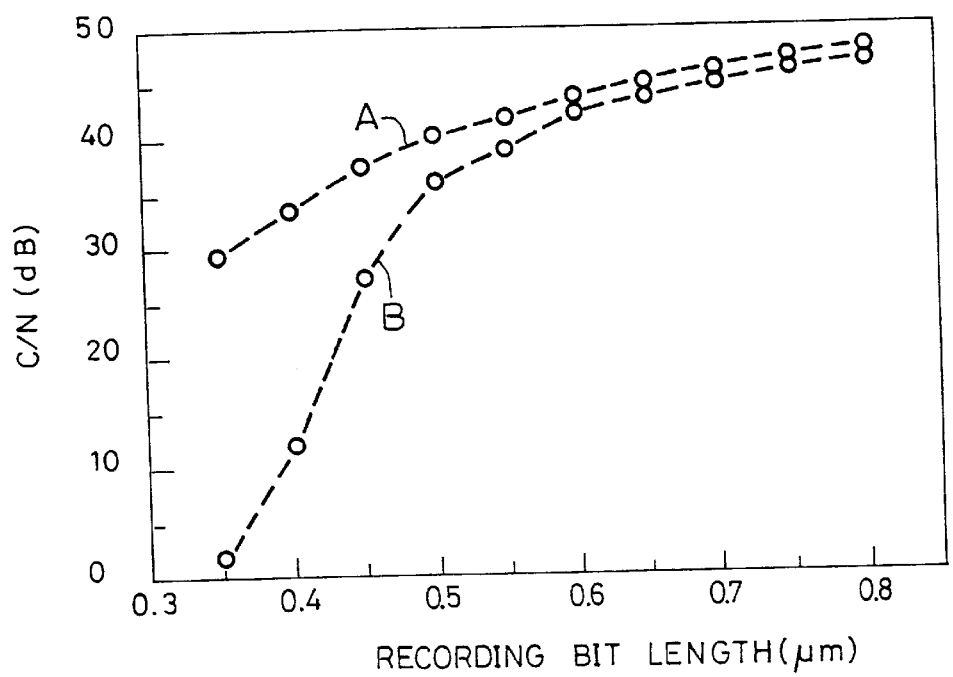

FIG. 10 shows the results of measurements of the reproducing signal quality (C/N) with respect to the recording bit length. In this measurement, the linear velocity of the magneto-optical disk was set at 5 m/sec as in the previous experiment. Under the above condition, a recording was carried out at different frequencies, and respective values for the C/N were measured. In this experiment, the same optical pickup and the recording method as the previous experiment were used.

In the figure, the curve A shows the results of measurements using the magneto-optical disk of the present invention, and a reproducing laser power was set at 2.25 mW. The curve B shows the results of measurements using the conventional magneto-optical disk with a reproducing laser power of 1 mW as in the case of the previous experiment.

As to the long recording bit with a length of not less than 0.6 $\mu$m, the differences in C/N between the two disks were not significant. However, as to the recording bit with a length not more than 0.6 $\mu$m, a sudden decrease in C/N was observed from the conventional magneto-optical disk. This is because as the recording bit becomes shorter, the number of recording bits (area) increases within the irradiated area of the light beam, and finally, the recording bits cannot be identified one from another.

A cut-off space frequency is one of the index representative of the optical resolving power of the optical pickup. The cut-off space frequency is determined by the wavelength of the laser (light source) and the N.A. of the objective lens. Using the optical pickup of the present embodiment, with the wavelength of the laser (780 nm) and the N.A. of the objective lens (0.55), the cut-off frequency was calculated, and was converted into the recording bit length by the following equation:

$$780 \text{ nm}/(2*0.55)/2 = 0.355 \text{ }\mu\text{m}$$

Namely, the limit of the optical resolving power-of the optical pickup used in this experiment is the recording bit length of 0.355 $\mu$m. Reflecting the above property, the obtained C/N from the conventional magneto-optical disk was substantially zero in the case of a recording bit with a length of 0.35 $\mu$m.

On the other hand, in the magneto-optical disk of the present invention, as the recording bit becomes shorter, C/N decreases. However, even with optical resolving power below 0.355 $\mu$m, C/N of nearly 30 dB was obtained.

The above measurements were carried out with respect to both the land and the groove, and the same results were obtained for both C/N value and tendencies.

From the above experimental results, it is proved that with the use of the magneto-optical disk of the present invention, the reproduction of a recording bit with a size smaller than the optical analyzing limit is enabled, thereby achieving a significant improvement in a recording bit density compared with the conventional magneto-optical disk.

Further, the signal quality C/N was measured using the optical head with a/w=0.8 in the same manner as the above experiment. When the magneto-optical disk of the present embodiment was used, the radius of the main robe becomes smaller than the radius of the main robe using the optical head with a/w=1.1. As a result, even with the use of a recording bit with a length of 0.355 $\mu$m, a signal quality C/N is improved by more than 5 bB. Additionally, even with the use of a/w=0.5, the same experimental results were obtained.

In addition to the above effects of the present invention confirmed by the above experiments, the following description will discuss crosstalk as another important index.

In magneto-optical disks, generally, in the case where recording and reproducing are carried out on and from the lands, the guide truck is formed such that the land width is made as wide as possible, and the groove is made narrower so as to record and reproduce only on and from the land. In this type of the magneto-optical disk, crosstalk means interference from the recording bits recorded on the adjoining lands when reproducing from the lands. On the other hand, in the magneto-optical disks wherein recording and reproducing operations were carried out from the grooves, crosstalk means interference from the recording bits recorded on the adjoining grooves formed on the magneto-optical disk.

For example, according to the IS10089 standard (set with regard to ISO 5.25 rewritable optical disk), in the guide track with a pitch of 1.6 $\mu$m, the crosstalk with respect to the shortest recording bit (0.765 $\mu$m) must not exceed −26 dB.

In the present embodiment, by the crosstalk measuring method set in the normalization of IS10089, the crosstalk was measured with respect to a recording bit with a length of 0.765 $\mu$m. In order to confirm the effect of the magneto-optical disk of the present invention composed of the described glass substrate 1 with a track pitch of 1.6 $\mu$m, a land width of 0.8 $\mu$m and a groove width of 0.8 $\mu$m, the crosstalk from adjoining grooves when reproducing from a land and the crosstalk from adjoining lands when reproducing from the groove were measured.

Figure 11:
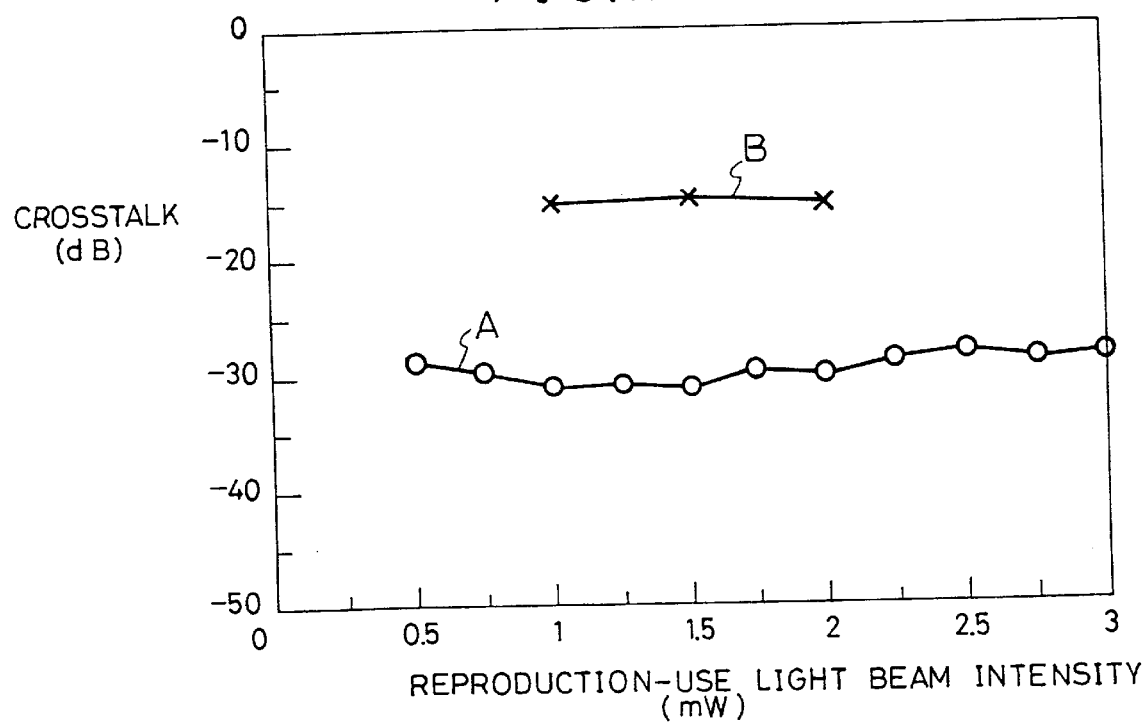

FIG. 11 shows the results of measurements when reproducing from the land. In the figure, x-axis indicates the reproducing laser power, and y-axis indicates crosstalk. In the figure, the curve A shows the results of measurements using the magneto-optical disk of the present invention, and the curve B shows the result of measurements using the conventional magneto-optical disk.

The conventional magneto-optical disk (B) shows a large crosstalk of −15 dB. On the other hand, the magneto-optical disk (A) of the present invention shows the crosstalk of −30 dB which is below −26 dB which satisfies the ISO standard.

Figure 12:
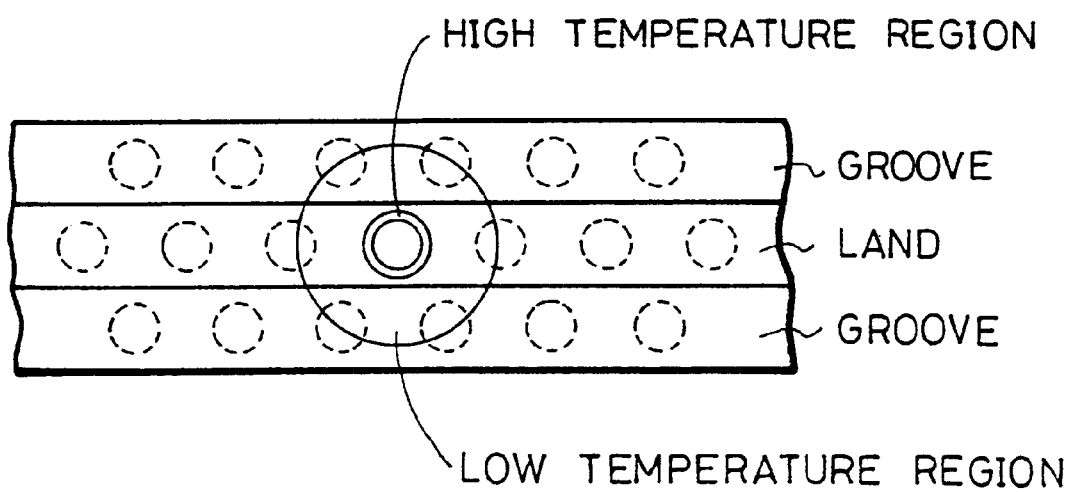

The technical reasons why such results were obtained will explained in reference to FIG. 12.

FIG. 12 is a schematic plan view from above the magneto-optical disk. On the magneto-optical disk, recording bits are recorded on the land (at the center) and the adjoining grooves (as shown by dotted circles). The large solid circle in the figure indicates a light spot formed as the reproduction-use light beam 7 is converged on the disk. Here, the servo was set so that the light spot follows the land. In the figure, both the land width and the groove width are set at 0.8 $\mu$m, and the diameter of the light spot (light beam diameter) is set at 1.73 $\mu$m (=Airy disk diameter=0.22*780 nm/0.55). For convenience, the recording bit diameter is shown by the size of 0.335 $\mu$m.

In the figure, seven recording bits are included in the reproduction-use light beam 7. In the conventional magneto-optical disk, each recording bit has perpendicular magnetization (for example, the magnetization direction of the recording bit is upward in a perpendicular direction, and the magnetization direction in other areas (erased areas) is downward in a perpendicular direction) and respectively show the polar Kerr effect, the signals in the light beam cannot be separated from one another. For this reason, in the case of the conventional magneto-optical disk, the C/N was small (0.35 $\mu$m), and the crosstalk from the adjoining tracks was large in the above-mentioned experiment.

On the other hand, in the magneto-optical disk of the present invention, the readout layer 3 has perpendicular magnetization in the vicinity of the center of the reproduction-use light beam 7, as the temperature thereof being higher than the peripheral portion, and in other areas, in-plane magnetization remains. Therefore, among seven recorded bits in the light spot of the reproduction-use light beam 7, only the recorded bit at the center is subjected to reproduction. Thus, C/N of substantially 30 dB can be obtained even when reproducing a small recording bit with a size of 0.335 $\mu$m. Moreover, the crosstalk from the adjoining tracks can be made significantly smaller.

As described, the experiments were conducted using the magneto-optical disk composed of the substrate 1 with a pitch of 1.6 $\mu$m having formed thereon lands and grooves in a ratio of 1:1, whereon the readout layer 3 and the recording layer 4 were laminated. From the experimental results, it is proved that the constant C/N could be obtained both from the lands and from the grooves, and recording and reproducing operations can be performed on and from both lands and grooves. Furthermore, even when information was recorded on the lands and the grooves of the recording layer 4, the obtained crosstalk was significantly small.

In the above arrangement, higher recording density in the lengthwise direction of the track and higher track density can be achieved. Moreover, since recording and reproducing operations can be carried out on and from both the lands and the grooves, a significant increase in the recording density can be achieved compared with the conventional magneto-optical recording density.

Moreover, using the optical head with a/w=0.8, experiments were conducted with respect to both the magneto-optical disk of the present invention and the magneto-optical disk of the comparative example as in the aforementioned manner. When the magneto-optical disk of the present invention was used, the obtained crosstalk was −30 dB, and thus almost no crosstalk was generated. On the other hand, when the conventional magneto-optical disk was used, the obtained crosstalk was in the range of −10 dB—−12 dB. When using the optical head with a smaller a/w, the adjoining recording bits were reproduced from the side robe, and the interference of the unnecessary signals was still increased. In addition, when the optical head with a/w=0.5 was used, the same results were obtained. Thus, especially when a/w<1 where the side robe appears significantly, the differences in the effects between the magneto-optical disk of the present invention and the conventional magneto-optical disk were significant.

From the above experimental results, with the use of the optical head wherein a/w is made smaller, i.e., the radius of the main robe is made smaller, a transition occurs from in-plane magnetization to perpendicular magnetization only in the vicinity of the central portion of the main robe of the readout layer 3, which has high temperature as being irradiated. As a result, information recorded on the recording layer 4 is reproduced, and the interference of an unnecessary signal from the side robe can be eliminated, thereby achieving a high density recording.

Next, using a magneto-optical disk with a groove depth of 70 nm and a magneto-optical disk with a groove depth of 200 nm, crosstalk from the adjoining grooves when reproducing from the land was respectively measured by the above method of measuring crosstalk.

From the experimental results, the crosstalk from the magneto-optical disk with a groove depth of 200 nm was less than that from the magneto-optical disk with a groove depth of 70 nm by more than 3 dB.

The reason why the crosstalk could be reduced by making the groove depth deeper from 70 nm to 200 nm will be explained in reference to FIG. 47 through FIG. 49.

Figure 47:
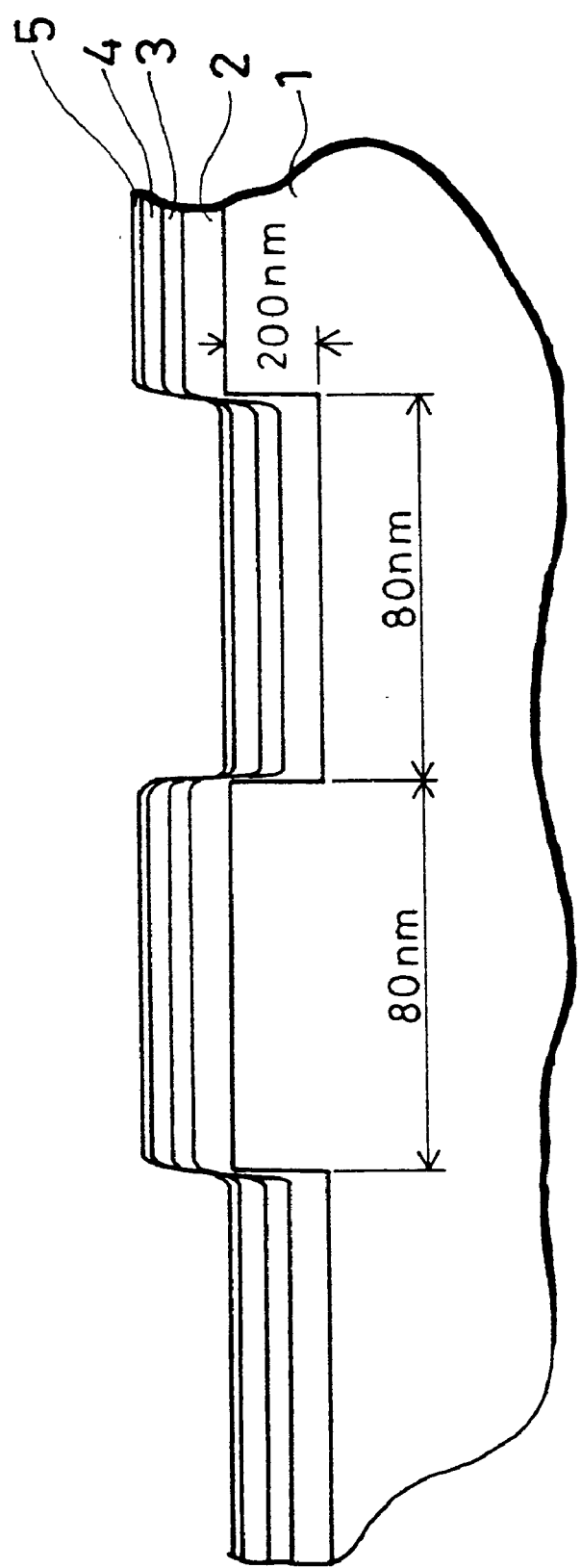

As shown in FIG. 47, in the magneto-optical disk with a groove depth of 200 nm, the readout layer 3 and the recording layer 4 on the groove vertically part from the readout layer 3 and the recording layer 4 on the land between the grooves. For this reason, heat is not likely to be transferred by conduction between the readout layer 3 and the recording layer 4 on the groove and the readout layer 3 and the recording layer 4 on the land. Namely, heat transfer by conduction to the adjoining tracks is not likely to occur.

Figure 49A:
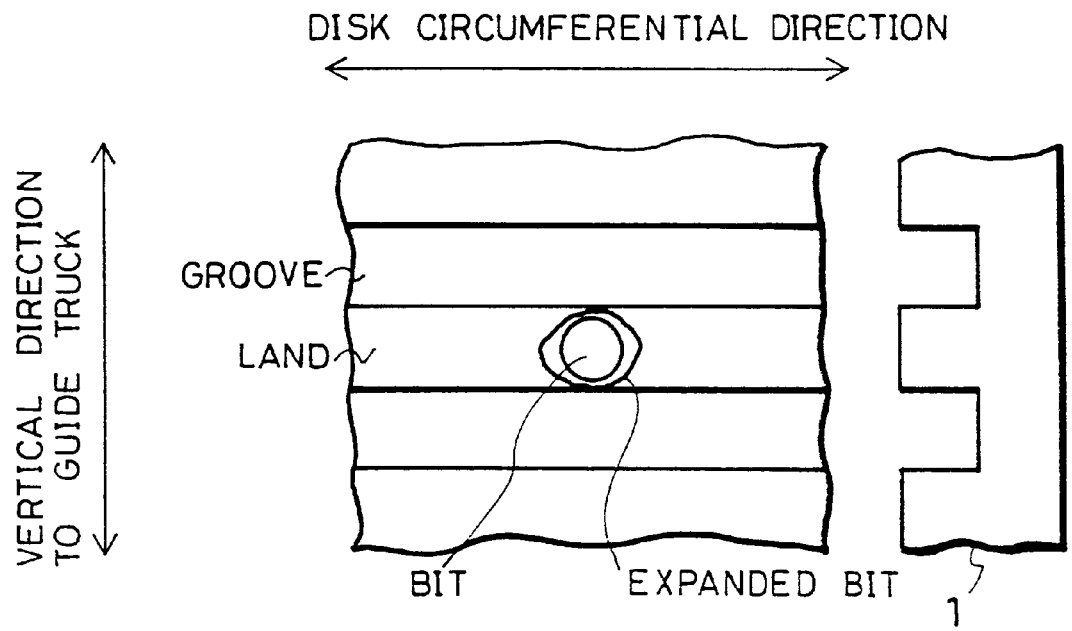
FIG. 49(a) and FIG. 49(b) are explanatory views showing expanded recording bits.

Therefore, as shown in FIG. 49(a), the recording bit which is expanded along the land does not reach the adjoining grooves.

Figure 48:
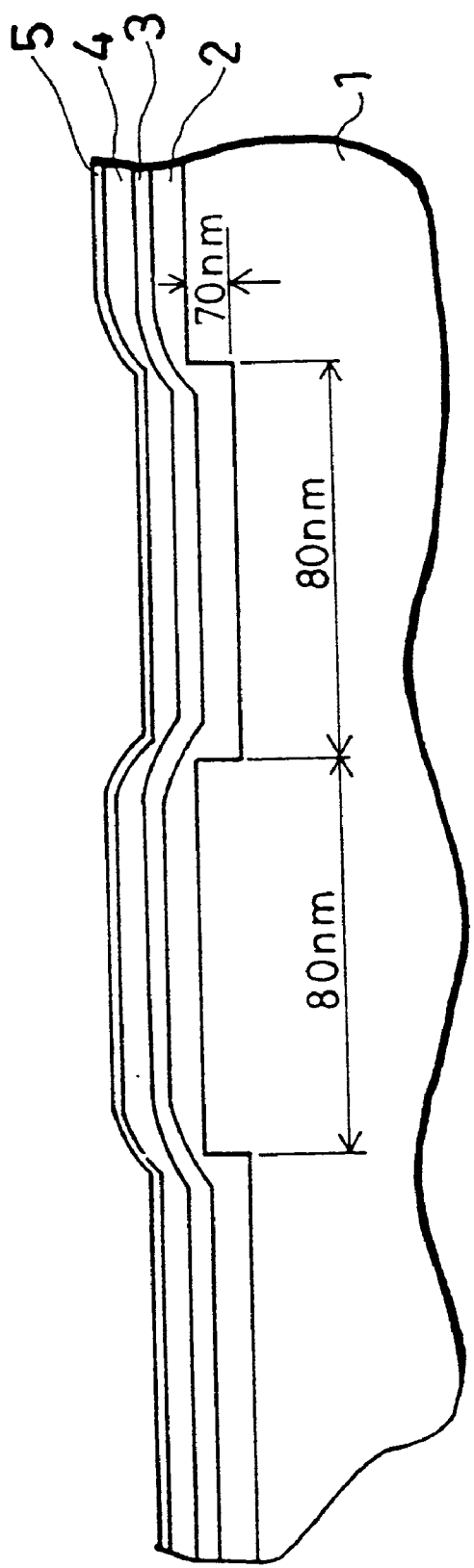
Figure 49B:
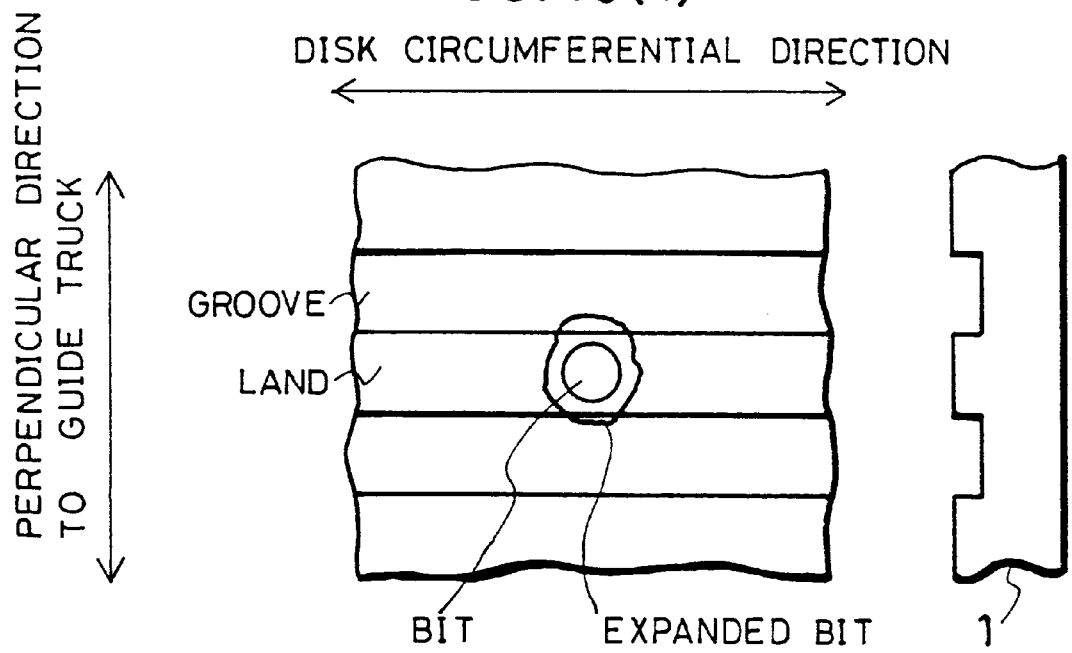

On the other hand, in the magneto-optical disk with a groove width of 70 nm, the readout layer 3 and the recording layer 4 on the groove do not vertically part from the readout layer 3 and the recording layer 4 on the land between the grooves as shown in FIG. 48. Thus, heat is likely to be transferred by conduction between the readout layer 3 and the recording layer 4 on the groove and the readout layer 3 and the recording layer 4 on the land. Namely, heat transfer by conduction to the adjoining tracks is likely to occur. Therefore, as shown in FIG. 49(b), the recording bit which is expanded along the land reaches the adjoining grooves.

For the reason explained above, the magneto-optical disk with a groove depth of 200 nm shows smaller crosstalk than the magneto-optical disk with a groove depth of 70 nm.

The intensity of a tracking error signal is maximized when the groove depth satisfy the following equation:

$$d=\lambda(2k-1)/(8n).$$

wherein d, $\lambda$ and n respectively represent a groove depth, a wavelength of a light beam and a refractive index of the transparent substrate, and k is a natural number (1, 2, 3, . . . ).

In the present embodiment, when k=2, d=190 nm where the intensity of the tracking error signal is maximized, thereby enabling a stable tracking.

When $\lambda$ is in a range of 670–830 nm and n is in a range of 1.44–1.55, d satisfies the inequality: 160 nm≦d≦215 nm. Here, the intensity of the tracking error signal is maximized, thereby enabling a stable tracking.

In conclusion, in order to achieve a stable tracking, the groove depth is set so as to satisfy the following conditions:
  a) the readout layer 3 and the recording layer 4 on the groove vertically part from the readout layer 3 and the recording layer 4 on the land between the grooves; and
  b) the intensity of the tracking error signal is large.

In considering the above, the groove depth is preferably set so as to satisfy the inequality: 130 nm≦d≦280 nm.

Additionally, respective film thicknesses of the transparent dielectric film 2, the readout layer 3 and the recording layer 4 also determine the degree of parting. Thus, they should be considered in setting the groove depth.

The composition of GdFeCo of the readout layer 3 is not limited to $Gd_{0.26}(Fe_{0.82}Co_{0.18})_{0.74}$ as long as the readout layer 3 has in-plane magnetization at room temperature and a transition occurs therein from in-plane magnetization to perpendicular magnetization at above room temperature. As to the rare-earth transition metal alloy, by varying the ratio of the rare-earth to the transition metal, the compensation temperature at which the magnetic moment of the rare-earth and the magnetic moment of the transition metal balance with one another can be adjusted. Since GdFeCo is a material series which has perpendicular magnetization in the vicinity of a compensation temperature, temperature at which a transition occurs from in-plane magnetization to perpendicular magnetization can be adjusted by changing the compensation temperature by adjusting the ratio of Gd to FeCo.

Figure 13:
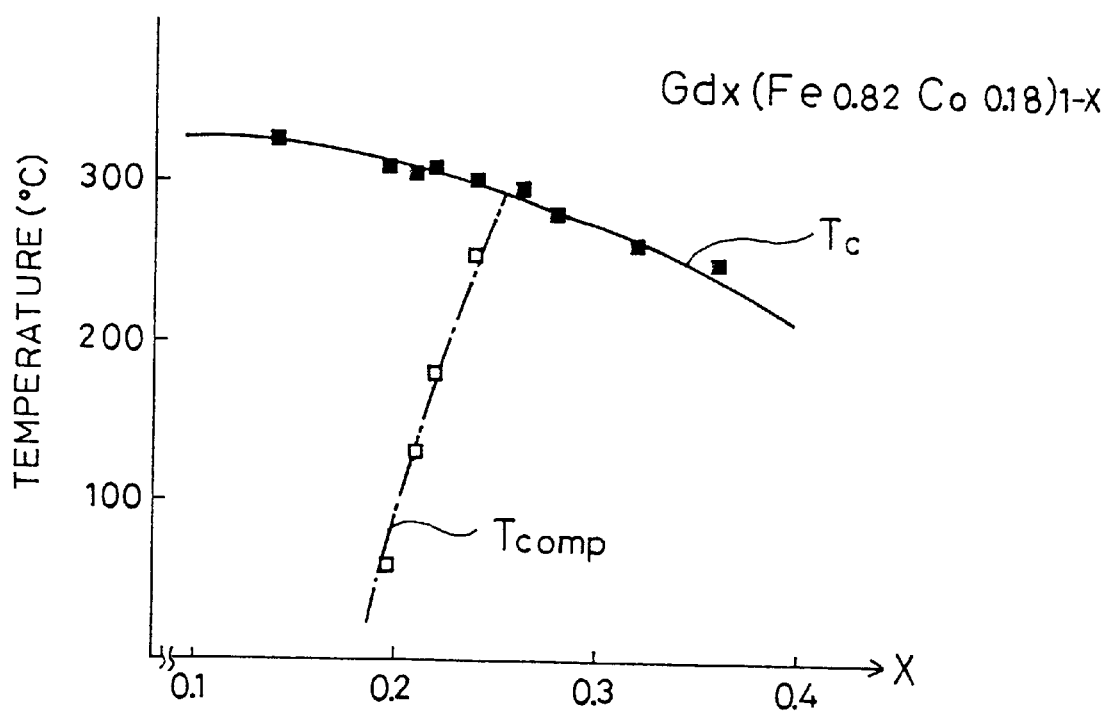

FIG. 13 shows experimental results of compensation temperature and Curie temperature with a variable X in $Gd_X(Fe_{0.82}Co_{0.18})_{1-X}$, i.e., when the composition of Gd was varied.

As is clear from the figure, in the compensating composition range where the compensation temperature is above room temperature (25° C.), X is set equal to or above 0.18, and it is preferably set so as to satisfy the inequality: 0.19<X<0.29. This is because when X is set in this range, in the configuration where the readout layer 3 and the recording layer 4 are laminated, temperature at which a transition occurs from in-plane magnetization to perpendicular magnetization can be set in a range of room temperature—200° C. If the above temperature becomes too high, there arises the possibility that the reproduction-use laser power becomes as high as the recording-use laser power, and thus the information recorded on the recording layer 4 may be disturbed.

The following will explain a change in the properties (compensation temperature and Curie temperature) in the case where the ratio of Fe to Co is varied in the GdFeCo series, i.e., Y is varied in $Gd_X(Fe_{1-Y}Co_Y)_{1-X}$.

Figure 14:
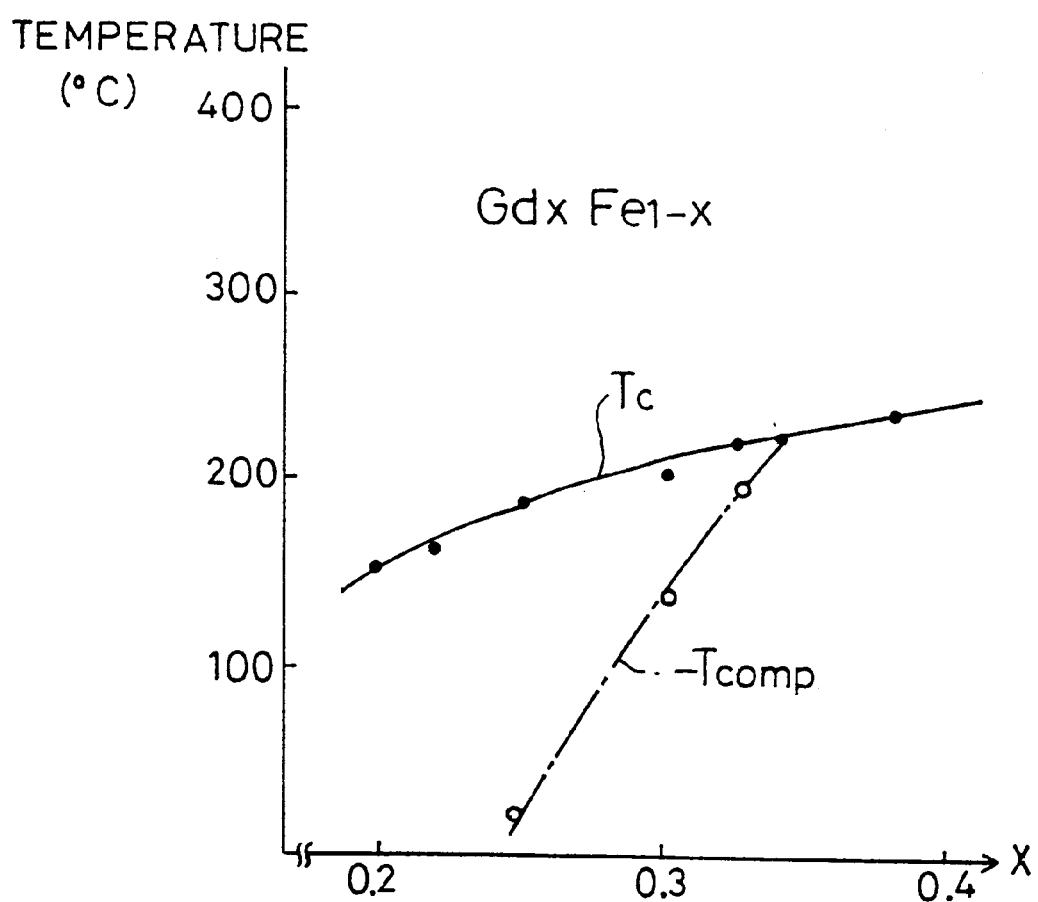

FIG. 14 shows the property of $Gd_X(Fe_{1-Y}Co_Y)_{1-X}$ when Y=0, i.e., the property of $Gd_XFe_{1-X}$. For example, when X=0.3 in the composition of Gd, the compensation temperature is substantially at around 120° C. and the Curie temperature is at around 200° C.

Figure 15:
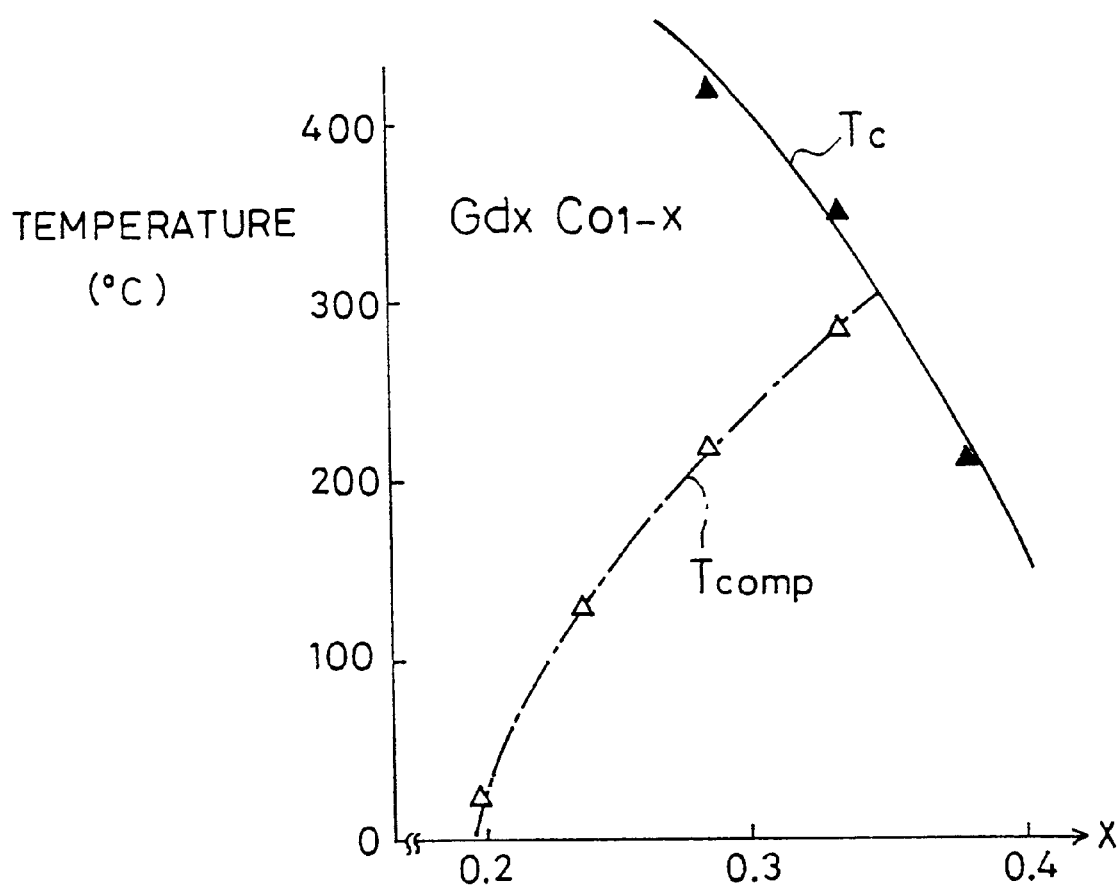

FIG. 15 shows the property of $Gdx(Fe_{1-Y}Co_Y)_{1-X}$ when Y=1, i.e., the property of $Gd_xCo_{1-X}$. For example, when X=0.3 in the composition of Gd, the compensation temperature is at around 220° C. and the Curie temperature is at around 400° C.

As can be seen, with the same composition of Gd, as the content of Co increases, the compensation temperature and Curie temperature go up.

The polar Kerr rotation angle in reproducing should be set as high as possible in order to obtain the higher C/N. Thus, the Curie temperature of the readout layer 3 is preferably set as high as possible. However, it should be noted here that if too much Co is contained, temperature at which transition occurs from in-plane magnetization to perpendicular magnetization also becomes higher.

In considering the above, Y in $Gd_X(Fe_{1-Y}Co_Y)_{1-X}$ is preferably set so as to satisfy the following inequality:

$$0.1 < X < 0.5.$$

Needless to say, the properties of the readout layer 3, such as temperature at which a transition occurs from in-plane magnetization to perpendicular magnetization are affected by the composition of the material used in the recording layer 4 and the film thickness of the recording layer 4. This is because exchange coupling force is exerted magnetically between the readout layer 3 and the recording layer 4.

Therefore, appropriate composition of the material used in the readout layer and the film thickness of the readout layer 3 differ depending on the material used in the recording layer 4 and the composition of the material and the film thickness of the recording layer 4.

As a material for the readout layer 3 of the magneto-optical disk of the present invention, GdFeCo wherein abrupt transition occurs from in-plane magnetization to perpendicular magnetization. However, even when other rare-earth transition metal alloys (to be described later) were used, the same effect could be obtained.

The $Gd_XFe_{1-X}$ has properties shown in FIG. 14, and when X satisfies the inequality: 0.24<X<0.35, it has a compensation temperature above room temperature.

The $Gd_XCo_{1-X}$ has properties shown in FIG. 15, and when X satisfies the inequality: 0.20<X<0.35; it has a compensation temperature above room temperature.

When FeCo alloy is used as a transition metal, $Tb_X(Fe_YCo_{1-Y})_{1-X}$ has its compensation temperature above room temperature when X satisfies the inequality: 0.20<X<0.30 (Y is selected at random). $Dy_X(Fe_YCo_{1-Y})_{1-X}$ has its compensation temperature above room temperature when X satisfies the inequality: 0.24<X<0.33 (Y is selected at random). $Ho_X(Fe_YCo_{1-Y})_{1-X}$ has its compensation temperature above room temperature when X satisfies 0.25<X<0.45 (Y is selected at random).

Alternatively, a material which has the following properties is suitable as well for the readout layer 3: when the wavelength of the semiconductor laser as a light source of the optical pickup becomes less than 780 nm described, the polar Kerr rotation angle at the wavelength is large.

As explained earlier, in the optical disk such as the magneto-optical disk, the recording density is limited by the size of the light beam, which is determined by the laser wavelength and the aperture of the objective lens. Therefore, only by making the wavelength of the semiconductor laser shorter, the recording density on the magneto-optical disk can be improved. At present, the semiconductor laser with a wavelength of 670 nm–680 nm is in practical use, and SHG laser with a wavelength equal to or below 400 nm has been earnestly studied.

The Kerr rotation angle of the rare-earth transition metal alloy has a wavelength dependency. Generally, as the wavelength becomes shorter, the Kerr rotation angle becomes smaller. However, with the use of the film which has large Kerr rotation angle with short wavelength, the intensity of the signal increases, thereby obtaining a high quality reproducing signal.

In the above material for the readout layer 3, by slightly adding at least one element selected from the group consisting of Nd, Pt, Pr and Pd, the greater Kerr rotation angle can be achieved with the properties required for the readout layer 3 substantially remains the same. As a result, the magneto-optical disk which permits a high quality reproducing signal even when the semiconductor laser with a short wavelength can be achieved.

As a material for the readout layer in which at least one of the above elements is added, for example, the following materials may be used:

$Nd_{0.05}[Gd_{0.26}(Fe_{0.82}Co_{0.18})_{0.74}]_{0.95}$,
$Pt_{0.05}[Gd_{0.26}(Fe_{0.82}Co_{0.18})_{0.74}]_{0.95}$,
$Pr_{0.05}[Gd_{0.26}(Fe_{0.82}Co_{0.18})_{0.74}]_{0.95}$, and
$Pd_{0.05}[Gd_{0.26}(Fe_{0.82}Co_{0.18})_{0.74}]_{0.95}$.

Next, the material for the readout layer 3 of the magneto-optical disk was changed from $Gd_{0.26}(Fe_{0.82}Co_{0.18})_{0.74}$ to $Nd_{0.05}[Gd_{0.26}(Fe_{0.82}Co_{0.18})_{0.74}]_{0.95}$, and the same performance tests were conducted in the same manner as the above, and the same results were obtained.

Furthermore, by adding a small amount of at least one element selected from the group consisting of Cr, V, Nb, Mn, Be and Ni, the resistance to environment of the readout layer 3 can be improved. Namely, the readout layer 3 can be prevented the deterioration of the property due to the oxidation of the material by the moisture and oxygen being entered, thereby ensuring a reliable performance of the magneto-optical disk for a long period of time.

As a material for the readout layer 3 in which one of the above element is added, for example, the following materials may be used:

$Cr_{0.05}[Gd_{0.26}(Fe_{0.82}Co_{0.18})_{0.74}]_{0.95}$,
$V_{0.05}[Gd_{0.26}(Fe_{0.82}Co_{0.18})_{0.74}]_{0.95}$,
$Nb_{0.05}[Gd_{0.26}(Fe_{0.82}Co_{0.18})_{0.74}]_{0.95}$,
$Mn_{0.05}[Gd_{0.26}(Fe_{0.82}Co_{0.18})_{0.74}]_{0.95}$,
$Be_{0.05}[Gd_{0.26}(Fe_{0.82}Co_{0.18})_{0.74}]_{0.95}$ and
$Ni_{0.05}[Gd_{0.26}(Fe_{0.82}Co_{0.18})_{0.74}]_{0.95}$.

Next, the experiment was conducted to see the effect of increasing the Kerr rotation angle when adding the above element to the material used in the readout layer 3 as explained below.

Figure 30:
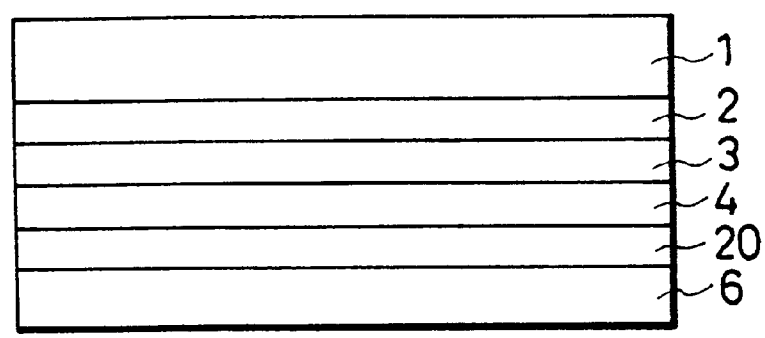

FIG. 30 shows the configuration of the sample used in the experiment.

The sample is composed of a glass substrate 1 whereon AlN with a thickness of 80 nm (transparent dielectric film 2), $X_{0.1}[Gd_{0.28}(Fe_{0.8}Co_{0.2})_{0.72}]_{0.9}$ with a thickness of 50 nm (readout layer 3) and $Dy_{0.23}(Fe_{0.82}Co_{0.18})_{0.77}$ with a thickness of 50 nm (recording layer 4) are laminated in this order. Further, the surface was entirely coated with AlN with a thickness of 20 nm (protective film 5). Here, X represents an element to be added which is one element selected from the group consisting of Nd, Pr, Pt and Pd.

Figure 31:
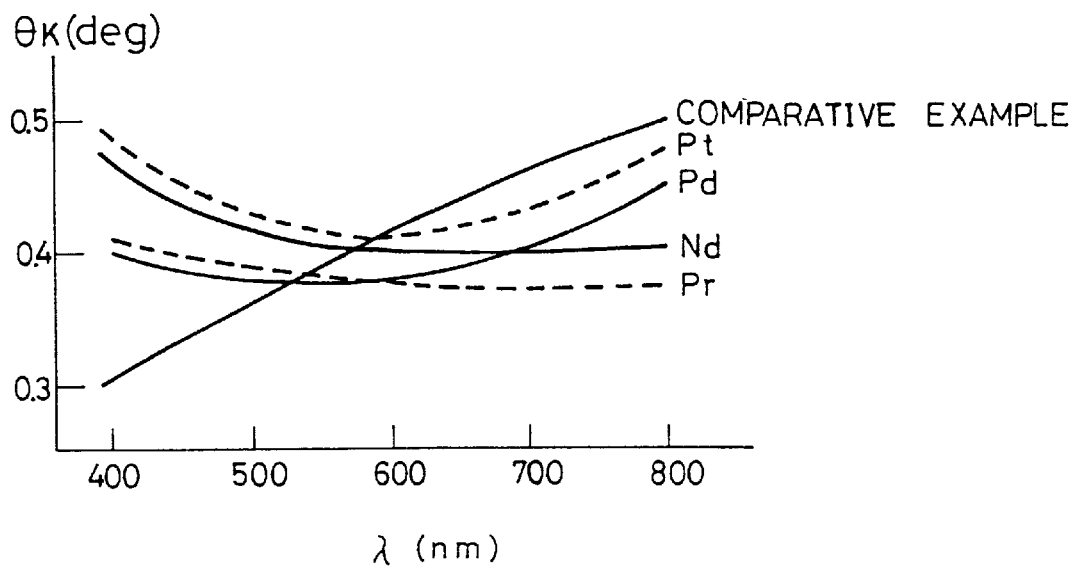

FIG. 31 shows wavelength dependency of θK (Kerr rotation angle) measured from the side of the glass substrate 1. As a comparative example, the experimental results obtained using the sample which does not include the above additive are also shown in FIG. 31.

In the sample which does not include the above additive, $\theta_k$ is large in a range of long wavelength, and it is small in a range of short wavelength. On the other hand, $\theta_k$ in a range of short wavelength was large in the sample including the above additive.

Generally, when reproducing from the magneto-optical disk using the laser with a short wavelength, a laser light can be converged to a greater extent compared with the case where the reproducing operation is carried out from the magneto-optical disk using the laser with a long wavelength. Thus, a reproduction of a recording bit recorded at high density is enabled. Furthermore, by selecting a material having a large $\theta_k$ in a range of a short wavelength for the readout layer 3, the intensity of the reproducing signal can be increased, thereby obtaining a high quality reproducing signal.

From the above experimental results, when recording and reproducing using the laser with a short wavelength, addition of the above additive works effectively. It is apparent that an increase in the amount of additive increases $\theta_k$ in a range of a short wavelength.

In the composition of $X_{0.1}[Gd_{0.28}(Fe_{0.8}Co_{0.2})_{0.72}]_{0.9}$ the size of θK with a wavelength equal to or below 600 nm has the following relationship:

$\theta_K$(having Pt added)=$\theta_K$(having Nd added)

>$\theta_K$(having Pd added)=$\theta_K$(having Pr added) (see FIG. 31). Therefore, by adding a small amount of Pt or Nd, $\theta_K$ can be made larger. Additionally, the addition of Pt improves the moisture resistance of the readout layer 3. Namely, the addition of Pt not only increase θK in a range of a short wavelength but also improves the moisture resistance of the readout layer 3.

FIG. 1 shows the amount of additive by which a material having the composition of $Xa[Gd_{0.28}(Fe_{0.8}Co_{0.2})_{0.72}]_{1-a}$ changes from non-crystal to crystal.

TABLE 1

| X | Nd | Pr | Pd | Pt |
|---|----|----|----|----|
| a | 0.61 | 0.61 | 0.26 | 0.25 |

From the above Table 1, it can be seen that Nd can be added in a greater amount than Pt. Specifically, when a large amount of Pt is added, the material changes from non-crystal to crystal, thereby presenting the problem of increasing noise due to a grain boundary. On the other hand, even when a large amount of Nd is added, the material remains non-crystal, and the composition remains uniform. Thus, Nd can be added in a large amount.

Addition of Pd improves the moisture resistance of the readout layer 3. Moreover, Pd has an advantage of low cost because of its large reserve. Even if a large amount of Pr is added, the material remains non-crystal as in the case of Nd. Thus, Pr can be added in a large amount. Moreover, by adding Pd, the moisture resistance of the readout layer 3 can be improved more than when Nd is added.

Figure 32:
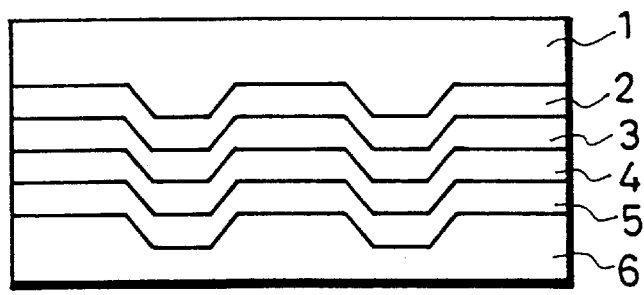

The following description will discuss the experiment conducted to see the improvement in the FIG. 32 shows the configuration of the sample used in the experiment.

The sample magneto-optical disk is composed of a glass substrate 1 with a diameter of 3.5 inch having formed thereon a groove, whereon AlN with a thickness of 80 nm (transparent dielectric film 2), $X_{0.1}[Gd_{0.28}(Fe_{0.8}Co_{0.2})_{0.72}]_{0.9}$ with a thickness of 50 nm (readout layer 3) and $Dy_{0.23}(Fe_{0.82}Co_{0.18})_{0.77}$ with a thickness of 50 nm (recording layer 4) are laminated in this order. Further, the surface is entirely coated with AlN with a thickness of 20 nm (protective film 5) and with an overcoat film 6 with a thickness of 5 μm. Here, X represents an element to be added which is one element selected from the group consisting of Pt, Pd, Nd, Pr, Ni, Mn, Be, V, Nb and Cr.

The sample of the magneto-optical disk was left in a constant temperature bath under the temperature of 120° C. and 2 normal atmosphere (humidity 100%), and a change in C/N of the reproducing signal as time passes was measured. A change in C/N as time passes when recording and reproducing a recording bit with a length of 0.76 μm (wavelength of 780 nm) is shown in FIG. 33. The C/N ratio was plotted by setting the initial value at 0 dB. As a comparative example, the experimental results using the sample magneto-optical disk which does not include the above additive are also shown in the figure.

As can be seen from the figure, when Cr, V, Nb, Mn, Be Ni, Pt or Pd is added, the moisture was improved. Especially, the addition of Cr was the most effective in improving the moisture resistance.

Table 2 shows the Kerr rotation angle (°) of the sample magneto-optical disk measured using a light with a wavelength of 780 nm. For comparison, the Kerr rotation angle of the sample magneto-optical disk which does not include the above additive in the readout layer 3 is also shown in the Table.

TABLE 2

| X | Cr | V | Nb | Mn | Be | Ni | comparative example |
|---|----|---|----|----|----|----|----|
| θκ | 1.40 | 1.30 | 1.35 | 1.38 | 1.40 | 1.53 | 1.44 |

As is clear from the Table, with the addition of Ni, the moisture resistance is not improved much but the Kerr rotation angle cam be made greater.

Table 3 shows an amount of additive a to be added to the material having the composition $X_a[Gd_{0.23}(Fe_{0.8}Co_{0.2})_{0.72}]_{1-a}$ in order to change it from non-crystal to crystal.

TABLE 3

| X | Cr | Nb | Mn | Be | Ni | V |
|---|----|----|----|----|----|---|
| a | 0.15 | 0.30 | 0.32 | 0.16 | 0.23 | 0.42 |

As is clear from the Table, even when a large amount of V is added, the material remains non-crystal. Thus, noise due to a grain boundary can be suppressed, and the moisture resistance thereof can be improved.

Table 4 shows crystallization temperature $T_{cryst}$ of the material having the composition of $X_{0.05}[Gd_{0.28}(Fe_{0.8}Co_{0.2})_{0.72}]_{0.95}$, at which the material changes from non-crystal to crystal.

TABLE 4

| X | Cr | Mn | Be | Ni | V | Nb | comparative example |
|---|----|----|----|----|---|----|----|
| Tcyst | 440 | 400 | 450 | 400 | 400 | 500 | 400 |

(unit: ° C.)

As is clear from the Table, the crystallization temperature can be raised by adding Nb. Therefore, the deterioration of the readout layer 3 can be suppressed even when the recording and reproducing operations are repetitively carried out. Moreover, the moisture resistance can be improved by adding Nb. The additive Nb has an advantage of low cost because of its large reserve.

Table 5 shows a noise level (unit: dB) of the sample magneto-optical disk. As a comparative example, the noise level of the sample magneto-optical disk which does not include additive in the readout layer 3 is also shown in the Table. Here, the noise level of the sample of the comparative example was set to 0 dB.

TABLE 5

| X | Cr | Mn | Ni | V | Nb | Be | comparative example |
|---|----|----|----|---|----|----|---------------------|
| Noise | 0 | 1 | −2 | 0 | 0 | −2 | 0 |

As can be seen from the Table, the noise level can be reduced by adding Be or Ni. The additive Be improves the moisture resistance more than the additive Ni.

Next, using the above sample magneto-optical disk, the deterioration of the signal quality by repetitively carrying out the recording and reproducing operations was measured.

Table 6 shows C/N (unit: dB) measured after repetitively carrying out the recording and reproducing operations (a hundred times at room temperature) using the above magneto-optical disk. As a comparative example, the C/N of the sample magneto-optical disk which does not include an additive in the readout layer 3 is also shown in the Table 6. Here, the C/N of the sample of the comparative example was set to 0 dB.

TABLE 6

| X | Cr | V | Nb | Mn | Be | Ni | Pt | Pd | Pr | Nd | comparative example |
|---|----|---|----|----|----|----|----|----|----|----|---------------------|
| C/N | −1 | −2 | −2 | −2.5 | −2.5 | −3 | −3 | −3 | −6 | −7 | −4 |

In the present embodiment, the thickness of the readout layer 3 is set at 50 nm. However, the thickness of the readout layer 3 is not limited to the above thickness. As shown in FIG. 1, the recording and reproducing of information are carried out from the side of the readout layer 3. If the readout layer 3 is too thin, the information recorded on the recording layer 4 may reach the readout layer 3. Namely, the mask effect by the in-plane magnetization of the readout layer 3 becomes weaker.

As explained earlier, since the magnetic property of the readout layer 3 is affected by the recording layer 4, a suitable thickness for the readout layer 3 changes depending on the material used in each layer and the composition thereof. However, for the readout layer 3, the thickness of at least 20 nm is required, and preferably, the thickness thereof is set above 50 nm. On the other hand, if the readout layer 3 becomes too thick, the information recorded on the recording layer 4 may not be copied the readout layer 3. Therefore, the film thickness of the readout layer 3 is preferably set below 100 nm.

Four magneto-optical disks were prepared respectively having readout layers 3 with thicknesses of 20 nm, 30 nm, 40 nm and 50 nm (see FIG. 1). The respective polar Kerr hysteresis loops measured from the side of the substrate 1 at room temperature are shown in FIG. 34(a) through FIG. 34(d).

Since the composition of the recording layer 4 is set close to the compensating composition at room temperature, the coercive force of the recording layer 4 is very large. However, by applying sufficiently large magnetic field, the magnetization direction of the recording layer 4 is reversed. Thus, the readout layer 3 is affected by the magnetization direction of the recording layer 4 by the exchange coupling force exerted therebetween, thereby showing the polar Kerr hysteresis loops as shown in the figures.

In either of the above magneto-optical disks, the exchange coupling force was exerted. However, in the cases of using the thin readout layers 3 (FIGS. 34(a) and (b)), when no external magnetic field was applied, the magnetization direction of the readout layer 3 was completely arranged in the magnetization direction of the recording layer 4 which means that the information recorded on the recording layer 4 was not masked by the readout layer 3. On the other hand, in the case of using the thick readout layer 3, the mask effect of the readout layer 3 gradually appeared (FIG. 34(c)), and in the case of using the readout layer 3 with a thickness of 50 nm (FIG. 34(d)), the information recorded on the recording layer 4 was completely masked by the readout layer 3.

Figure 35:
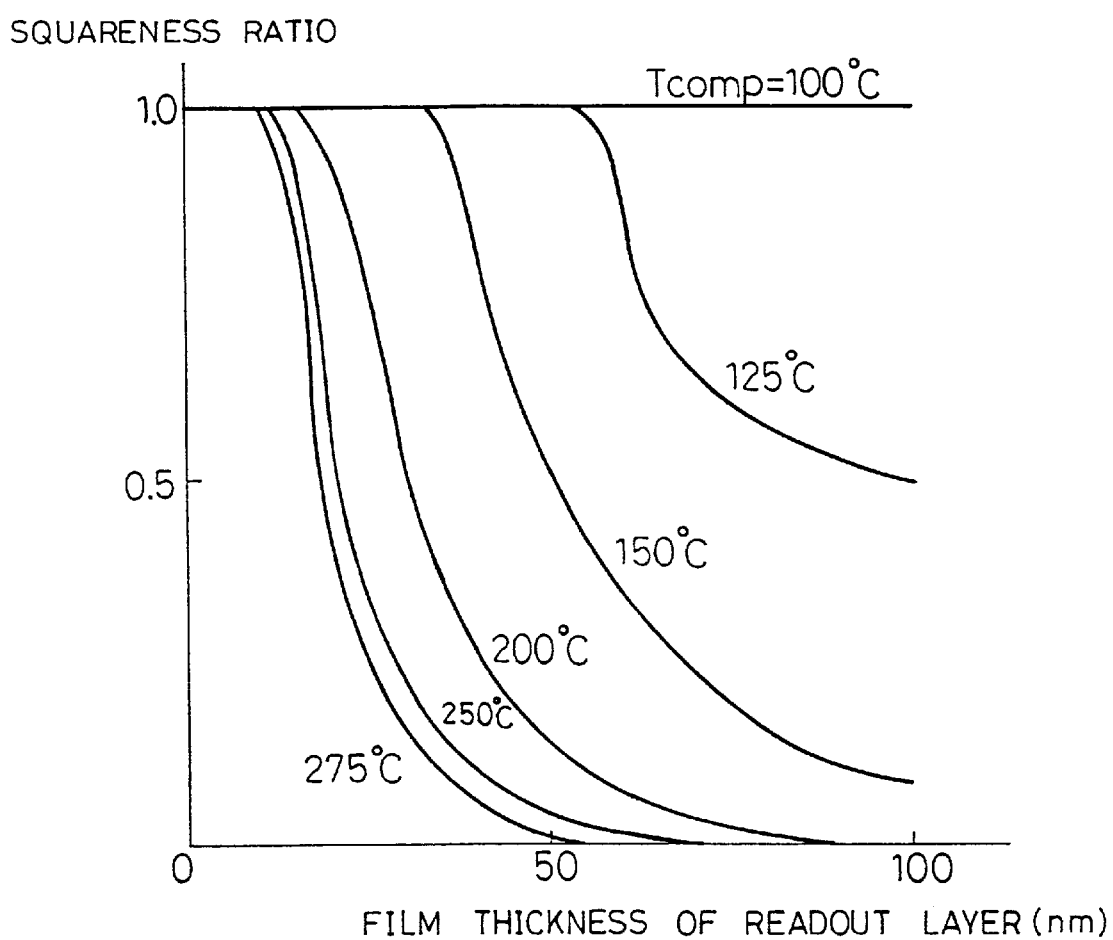

In order to obtain the differences in the mask effect when the compensation temperature and the thickness of the readout layer 3 are varied, the magneto-optical disk having the configuration of FIG. 1 was prepared. Here, the compensation temperature of the readout layer 3 is varied by changing the composition of GdFeCo used in the readout layer 3. The respective squareness ratios were calculated from the polar Kerr hysteresis loops measured from the side of the substrate 1 at room temperature. The experimental results are shown in FIG. 35 wherein temperature indicates compensation temperature.

Figure 36:
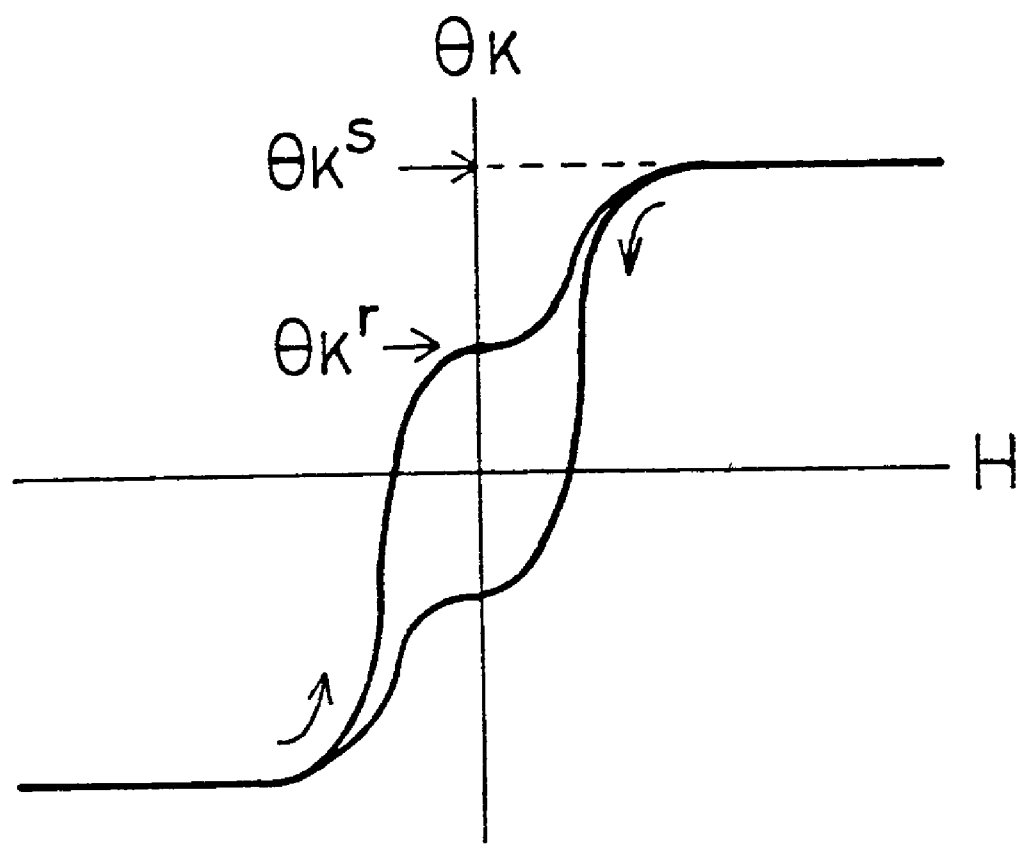

As shown in FIG. 36, the respective squareness ratios were calculated from the equation: squareness ratio=$\theta_k^r$ (Kerr rotation angle without the external magnetic field)/$\theta_k^s$ (Kerr rotation angle with the external magnetic field of 15 kOe). Here, squareness ratio=1 indicates that no mask effect is shown, on the other hand, the squareness ratio=0 indicates that the information is completely masked.

As can be seen from the figure, the greater mask effect can be obtained from the higher compensation temperature and the thicker readout layer 3. When the readout layer 3 with a thickness of not more than 100 nm is used, no mask effect can be obtained at temperature below 100° C. In order to obtain the mask effect, the compensation temperature is required to be set at 125° C. or above, preferably, above 150° C. Similarly, in order to obtain the mask effect, the thickness of the readout layer 3 is required to be set to 10 nm or above, preferably, above 20 nm.

Figure 37:
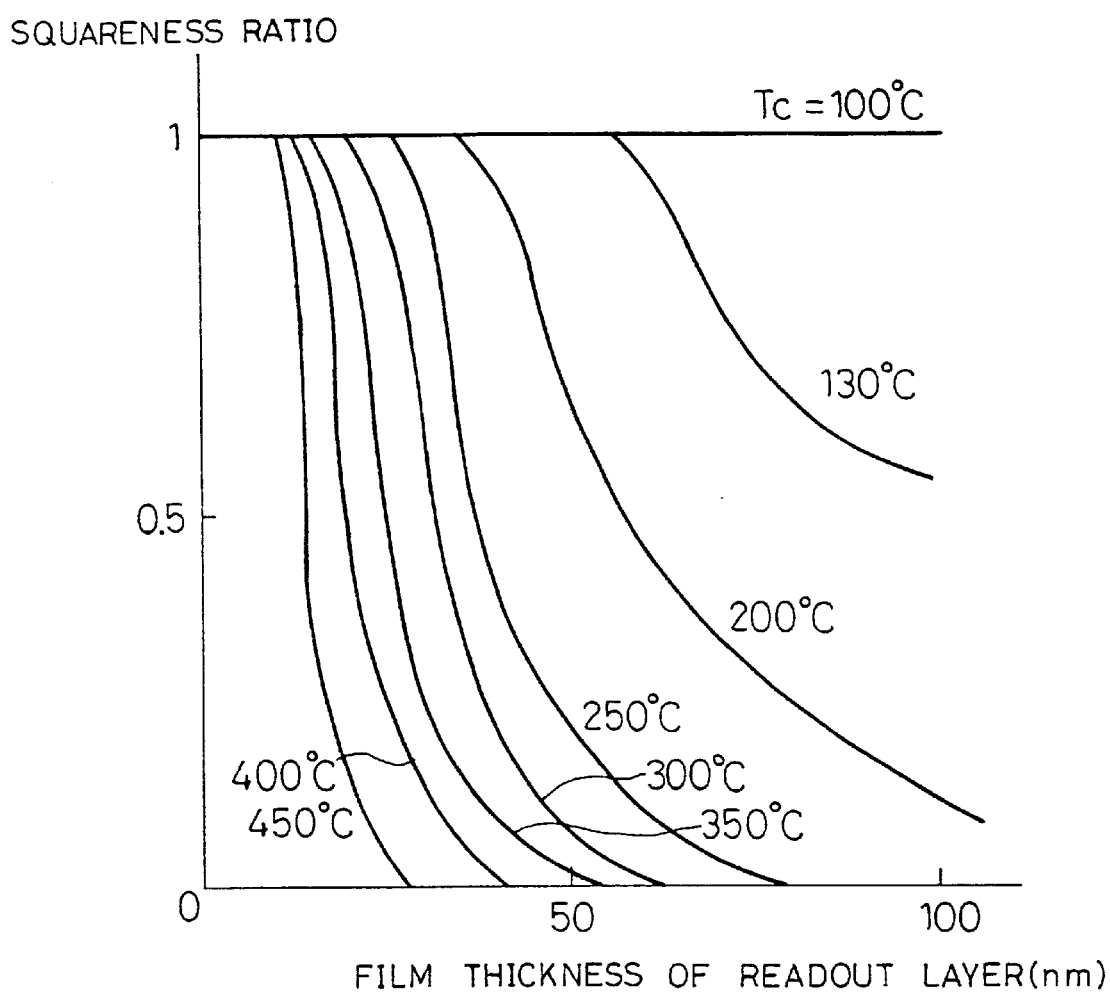

Next, the composition of GdFeCo used in the readout layer 3 was changed so as to set the magnetic property thereof was set such that the magnetization of the sub-lattice of the rear-earth metal became excessive in a temperature range of room temperature to Curie temperature; namely, it is set such that GdFeCo had no compensation temperature. Under the above conditions, in order to see the differences in the mask effect when the film thickness was varied, the squareness ratio was calculated. The experimental results are shown in FIG. 37. In the figure, temperature indicates Curie temperature.

As can be seen from the figure, the greater mask effect can be obtained from the higher Curie temperature and the thicker readout layer 3. When the readout layer 3 with a thickness of 100 nm or below was used, no mask effect was obtained at a Curie temperature of 100° C. or below. In order to obtain the mask effect, the Curie temperature is required to be set to or above 130° C., preferably, above 200° C. Similarly, in order to obtain the mask effect, the thickness of the readout layer 3 is required to be set to or above 10 nm, preferably, above 20 nm.

The above explanations were given through the case where the thickness of the readout layer 3 is below 100 nm. However, the desirable mask effect can be obtained even when the readout layer 3 with a thickness of 200 nm is used. However, in order to raise the respective temperatures of the readout layer 3 and the recording layer 4, extremely large laser power is required. Considering the performance of the semiconductor laser, the thickness of the readout layer 3 is preferably set to or below 200 nm, more preferably below 150 nm, and the compensation temperature and Curie temperature of the readout layer 3 are preferably set to or below 500° C., more preferably below 450° C.

As to the material for the recording layer 4, a material which has perpendicular magnetization in a temperature range of room temperature—Curie temperature and which has a Curie temperature suitable for recording (at around 150–250° C.) may be used.

In the present embodiment, DyFeCo is used for the recording layer 4. DyFeCo is a material having a small perpendicular magnetic anisotoropy, and thus by adapting DyFeCo, a recording operation can be carried out even with a small external magnetic field. This is an advantageous characteristic especially for the overwrite recording method by the magnetic field modulation (to be described later), and a compact size of the recording-use magnetic field generation device, and the reduction in the electric power consumption are enabled.

Other suitable materials for the recording layer 4 are TbFeCo, GdTbFe, NdDyFeCo, GdDyFeCo and GdTbFeCo. For example, when $Tb_X(Fe_YCo_{1-Y})_{1-X}$ is used, with respect to a given value Y, X is preferably set so as to satisfy the inequality: $0.10 \leq X \leq 0.30$. For example, $Tb_{0.18}(Fe_{0.88}Co_{0.12})_{0.82}$ may be used.

The material used in the recording layer 4 was changed from $Dy_{0.23}(Fe_{0.78}Co_{0.22})_{0.77}$ to $Tb_{0.18}(Fe_{0.88}Co_{0.12})_{0.82}$, and the same performance test was conducted, and the same results as the above performance test were obtained.

The TbFeCo has large perpendicular magnetic anisotoropy Ku of substantiality $3-4 \times 10^6$ erg/cc. The shape of the Kerr hysteresis loop squareness will not be destroyed at high temperature, thereby providing a magneto-optical recording medium which ensures a high quality of a reproduced signal.

Figure 38A:
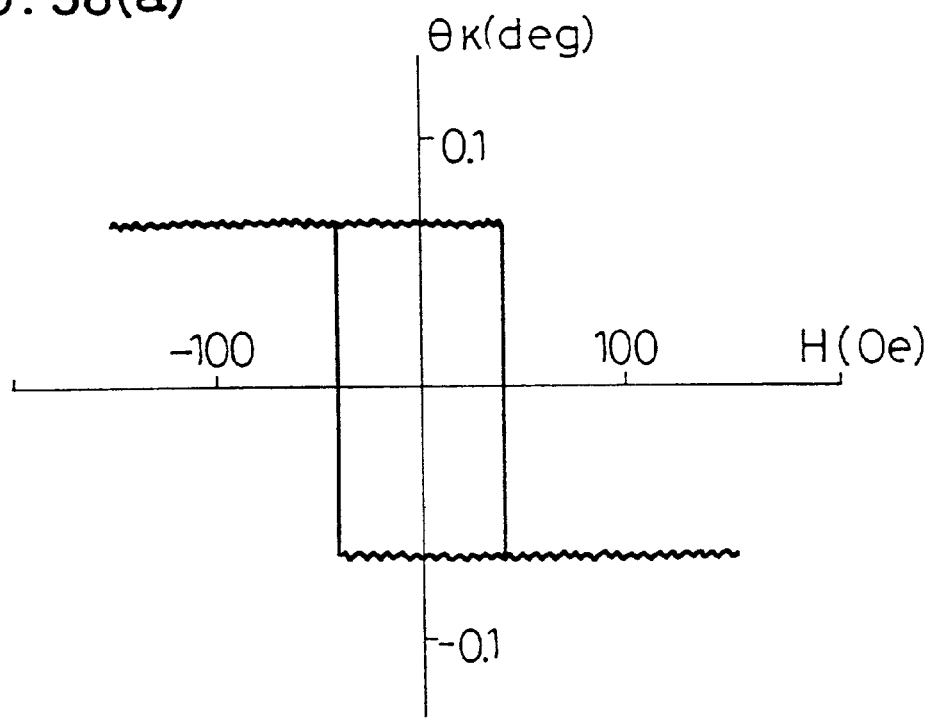
FIG. 38(a) and FIG. 38(b) are graphs respectively showing Kerr loops of the magneto-optical disk of FIG. 1.
Figure 38B:
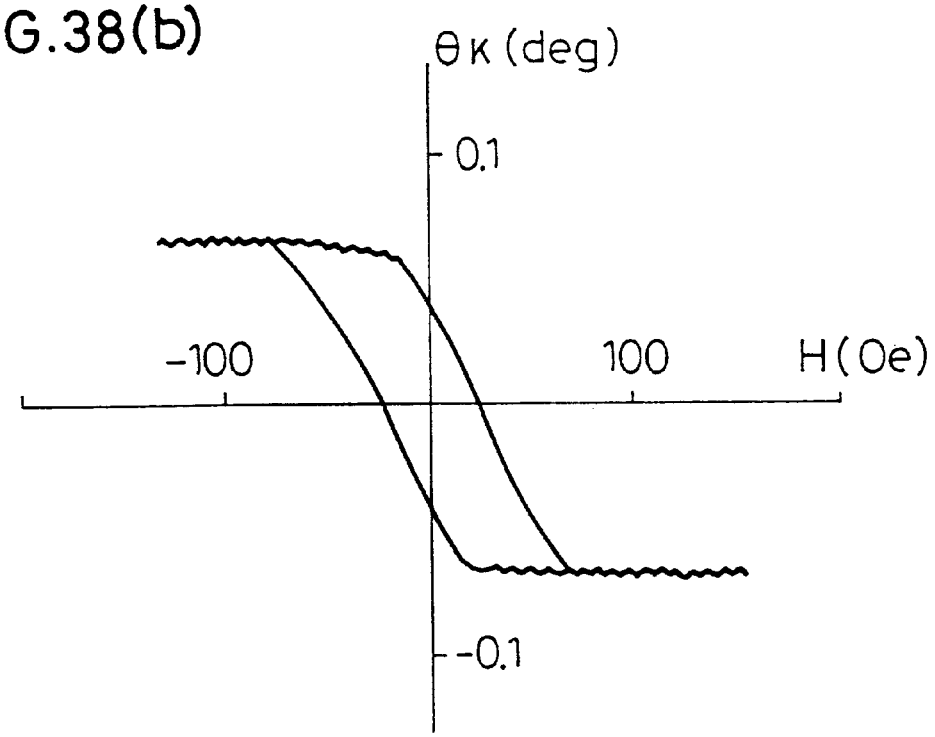

For reference, the Kerr hysteresis loop obtained from the magneto-optical disk having the recording layer 4 made of TbFeCo is shown in FIG. 38(a). The Kerr hysteresis loop obtained from the magneto-optical disk having the recording layer 4 made of DyFeCo whose perpendicular magnetic anisotoropy Ku is substantially $1 \times 10^6$ erg/cc is shown in FIG. 38(b). Here, the Kerr hysteresis loop was measured from the side of the recording layer 4 with respect to the substrate 1 of the magneto-optical disk at temperature of 180° C.

From the figures, the shape of the squareness of DyFeCo became worse; however, the shape of the squareness of TbFeCo had the large perpendicular magnetic anisotoropy Ku. Thus, the recording bit had a clean edge shape, thereby providing a magneto-optical recording medium which ensures the high quality reproduced signal.

Additionally, by adding at least one element selected from the group consisting of Cr, V, Nb, Mn, Be and Ni, to the material used in the recording layer 4, a reliable performance of the recording layer 4 can be ensured for a longer period of time. The suitable thickness of the recording layer 4 is determined by the material, the composition of the material used in the readout layer 3 and the composition thereof and the thickness of the readout layer 3, and it is preferably set in a range of 20 nm–100 nm.

The thickness of AlN (transparent dielectric film 2) is not limited to 80 nm.

The thickness of the transparent dielectric film 2 is determined in considering a so-called Kerr effect enhancement which increases a polar Kerr rotation angle from the readout layer 3 utilizing the interference effect of light in reproducing from the magneto-optical disk. In order to make the signal quality (C/N) in reproducing as high as possible, the Kerr rotation angle is set as large as possible.

The film thickness changes depending on the wavelength of the reproducing light and the refractive index of the transparent dielectric film 2. In the present embodiment, AlN is used as a material for the transparent dielectric film 2, which has the refractive index of 2.0 with respective to the reproducing light with a wavelength of 780 nm. Thus, with the use of AlN with a thickness of 30–120 nm for the transparent dielectric film 2, a large Kerr effect enhancement can be achieved. More preferably, AlN with a thickness of 70–100 nm is used for the transparent dielectric film 2 because the Kerr rotation angle is almost maximized in the above range of the film thickness.

The above explanation has been given through the case of a reproducing light with a wavelength of 780 nm. However, the wavelength of the reproducing light is not limited to this. For example, when a reproducing light with a wavelength of 400 nm which is substantially ½ of the above wavelength of 780 nm, the thickness of the transparent dielectric film 2 is preferably set ½ of the film thickness when the reproducing light with the wavelength of 780 nm is used.

Additionally, the refractive index of the transparent dielectric film 2 may be changed depending on a material used in the transparent dielectric film 2 or the method used in manufacturing the transparent dielectric film 2. In such a case, the thickness of the transparent dielectric film 2 is adjusted so as to set the refractive index×the film thickness (=optical path length) constant.

In the case of the present embodiment, 2 (the refractive index of AlN used in the transparent dielectric film 2)×80 nm (film thickness of the transparent dielectric film)=160 nm (optical path length). However, for example, when the refractive index of AlN is changed from 2 to 2.5, the film thickness is preferably set at 160 nm/2.5=64 nm.

As can be seen from the above explanation, by making the refractive index of the transparent dielectric film 2 greater, the film thickness of the transparent dielectric film 2 can be made thinner, and the greater enhance effect of the polar Kerr rotation angle can be achieved.

The refractive index of AlN can be changed by changing the ratio of Ar to $N_2$ (sputtering gas used in sputtering), the gas pressure, etc. In general, AlN has relatively large refractive index of approximately 1.8–2.1, and thus it is a suitable material for the transparent dielectric film 2.

Not only for the enhancement of the Kerr effect, the transparent dielectric film 2 also prevents the oxidization of the readout layer 3 and the recording layer 4 which are magnetic layers made of rare-earth transition metal alloy as the protective film 5 does.

The magnetic layer made of rare-earth transition metal is likely to be oxidized, and especially, rare-earth metal is very likely to be oxidized. Therefore, entering of oxygen and moisture from outside must be prevented in order to prevent the deterioration of the properties of the layers.

Therefore, in the present embodiment, the readout layer 3 and the recording layer 4 are sandwiched by the AlN films. Since the AlN film is a nitrogen film which does not include oxygen, its moisture resistance is high.

Furthermore, AlN which has a large refractive index (in the vicinity of 2) is transparent, and it does not include oxygen. Thus, with the use of AlN, a reliable performance of the magneto-optical disk can be ensured for a long period of time.

Additionally, using Al target, a reactive DC (direct current) sputtering may be carried out by introducing $N_2$ gas or mixed gas of Ar and $N_2$. In this sputtering method, a faster film forming speed can be achieved compared with the RF (high frequency) sputtering method.

Other than AlN, the following materials which have large refractive index are suitable for the transparent dielectric film 2: SiN, AlSiN, AlTaN, SiAlON, TiN, TiON, BN, ZnS, $TiO_2$, $BaTiO_3$ and $SrTiO_3$. Especially, since SiN, AlSiN, AlTiN, TiN, BN and ZnS do not include oxygen, the magneto-optical disk which has an excellent moisture resistance be provided.

SiN, AlSiN, AlTaN, SiAlON, TiN, TiON, BN, ZnS, $TiO_2$, $BaTiO_3$, $SrTiO_3$ are formed by sputtering. AlSiN, AlTaN, TiN, $TiO_2$ may be formed by reactive DC sputtering, which has an advantage of faster film forming speed. The refractive index of SiN, AlSiN, AlTaN, BN and SiAlON is in a range of 1.8–2.1. The refractive index of TiN is in a range of 2–2.4. The refractive index of ZnS and TiON is in a range of 2–2.5. The refractive index of $TiO_2$, $BaTiO_3$ and $SrTiO_3$ is in a range of 2.2–2.8. The above refractive indexes change depending on the sputtering conditions.

Since the thermal conductivity of SiN and AlSiN is relatively small, they are suitable for a high sensitivity recording magneto-optical disk. Since AlTaN and TiN respectively include Ta and Ti, with the use of these material, the magneto-optical disk which has an excellent corrosion resistance can be achieved. Since BN is extremely hard and has an excellent abrasion resistance, with the use of BN, the magneto-optical disk can be prevented from being scratched, thereby ensuring a reliable performance of the disk for a long period of time. The targets for $TiO_2$, $BaTiO_3$ and TiON can be obtained at reasonable price. Since $TiO_2$, $BaTiO_3$ and $SrTiO_3$ have relatively large refractive index, a magneto-optical disk which ensures a high quality reproduced signal can be achieved.

By changing the material used in the transparent dielectric film 2 of the above magneto-optical disk from AlN to SiN, the same performance test was conducted, and the same experimental results as the above experiment were obtained.

In the present embodiment, the AlN used in the protective film 5 is set at 20 nm thick. However, the film thickness of the protective film 5 is not limited to this, and it is preferably set in a range of 1–200 nm.

In the present embodiment, the film thickness of the readout layer 3 and the recording layer 4 being laminated is set at 100 nm thick. With this thickness, a light which is incident thereon from the optical pickup is hardly transmitted through the magnetic layer. Therefore, there is not limit for the film thickness of the protective film 5 as long as the oxidization of the film can be prevented for a long period of time. Therefore, when the material which has low oxidization resistance is used, the film thickness should be made thick; on the other hand, when the material which has high oxidization resistance is used, the film thickness should be made thin.

The thermal conductivity of the protective film 5 as well as the transparent dielectric film 2 affects the recording sensitivity of the magneto-optical disk. Specifically, the recording sensitivity represents the laser power required for recording or erasing. The light incident on the magneto-optical disk is mainly transmitted through the transparent dielectric film 2. Then, it is absorbed by the readout layer 3 and the recording layer 4 which are absorbing films, and changes into heat. Here, heat generated from the readout layer 3 and the recording layer 4 moves onto the transparent dielectric film 2 and the protective film 5 by the conduction of heat. Therefore, the respective thermal conductivities and the thermal capacities (specific heat) of the transparent dielectric film 2 and the protective film 5 affect the recording sensitivity.

This means that the recording sensitivity of the magneto-optical disk can be controlled to some extent. For example, by making the film thickness of the protective film 5 thinner, the recording sensitivity can be increased (a recording or erasing operation can be carried out with low laser power). Normally, in order to extend the life of the laser, it is preferable to have relatively high recording sensitivity, and thus the thinner protective film 5 is preferable.

In this sense also, AlN is a suitable material. Because of its excellent moisture resistance, by adapting it to the protective film 5, the magneto-optical disk which ensures a high recording sensitivity can be achieved.

In the present embodiment, AlN is used both in the protective film 5 and the transparent dielectric film 2. Therefore, the magneto-optical disk of the present invention has an excellent moisture resistance. Moreover, since the same material is used for the transparent dielectric film 2 and the protective film 5, the manufacturing efficiency of the magneto-optical disk can be improved. As described, AlN has an excellent moisture resistance, and thus the AlN film can be set relatively thin (20 nm). The thinner film is preferable in a term of productivity as well.

In considering the above objective and effect, other than AlN, the following materials which can be used also as materials for the transparent dielectric film are suitable for the protective film 5: SiN, AlSiN, AlTaN, SiAlON, TiN, TiON, BN, ZnS, $TiO_2$, $BaTiO_3$ and $SrTiO_3$.

Additionally, by the use of a common material for the protective film 5 and the transparent dielectric film 2, the manufacturing efficiency can be improved.

Especially, when SiN, AlSiN, AlTaN, TiN, BN or ZnS which does not include oxygen is used, a magneto-optical disk which has an excellent moisture resistance can be achieved.

Other than glass, chemically tempered glass may be used. Alternatively, 2P layered glass substrate in which ultraviolet ray hardening resin film is formed on the glass or chemically tempered glass substrate, polycarbonate (PC), polymethyl methacrylate (PMMA), amorphous polyolefin (APO), polystyrene (PS), polybiphenyl chloride (PVC), epoxy, etc., may be used for the substrate 1.

When chemically tempered glass is used as a material for the substrate 1, the following advantages can be obtained: excellent mechanical properties (in the case of a magneto-optical disk, vibration, eccentricity, warpage, tilt, etc.,) can be achieved; the hardness of the substrate 1 becomes large; by being chemically stable, it is not likely to be dissolved into various kind of solvent; sand or dust is not likely to adhere to the substrate because it is difficult to be charged compared with the plastic substrate; by being chemically tempered, the moisture resistance, oxidization resistance and thermal resistance can be improved, and thus a reliable performance of the magneto-optical recording medium can be ensured for a long period of time; and having an excellent optical property, a high quality signal can be ensured.

Additionally, when the glass or chemically tempered glass is used as a material for the substrate 1, as a method for forming a guide track for guiding a light beam and for forming a signal called prepit formed beforehand on the substrate for recording an address signal, etc, the reactive dry etching method to be carried out on the surface of the surface of the glass substrate is used. Alternatively, the guide truck or the prepit may be formed on the resin layer by projecting a light beam onto the 2P layered ultraviolet hardening resin and thereafter by removing the stamper.

When PC is used as a material for the substrate 1, the following advantages can be achieved: because an injection molding can be formed, a mass-production of the same substrate 1 is enabled, and thus the manufacturing cost can be reduced; having low humidity absorption compared with other plastics, a reliable performance of the magneto-optical disk can be ensured for a longer period of time, and excellent heat resistance and impact resistance can be achieved. Additionally, including PC, as to the material which permits injection molding, a guide truck, a prepit, etc., can be formed simultaneously on the surface of the substrate 1 when molding only by installing the stamper onto the metal molding mold when injection molding.

When PMMA is used as a material for the substrate 1, the following advantages can be achieved: because injection molding is permitted, a mass-production of the same substrate 1 is enabled, and thus the manufacturing cost can be reduced; and having low double refraction compared with other plastics, it has an excellent optical property, and thus a high quality signal can be ensured; and it has excellent heat resistance and impact resistance.

When APO is used as a material for the substrate 1, the following advantages can be achieved: because injection molding is permitted, a mass-production of the same substrate 1 is enabled, and thus the manufacturing cost can be reduced; having low absorptance compared with other plastics, a reliable performance of the magneto-optical disk can be ensured for a longer period of time, and having a small double refraction compared with other plastics, it has an excellent optical property, and thus a high quality signal can be ensured; and it has high heat resistance and impact resistance.

When PS is used as a material for the substrate 1, the following advantages can be achieved: because injection molding is permitted, a mass-production of the same substrate 1 is enabled, and thus the manufacturing cost can be reduced; and having a low absorptance compared with other plastics, a reliable performance of the magneto-optical disk can be ensured for a longer period of time.

When PVC is used as a material for the substrate 1, the following advantages can be achieved: because injection molding is permitted, a mass-production of the same substrate 1 is enabled, and thus the manufacturing cost can be reduced; having a low absorbance compared with other plastics, a reliable performance of the magneto-optical disk can be ensured for a longer period of time; and it is fire retardant.

When epoxy is used as a material for the substrate 1, the following advantages can be achieved: having a low absorptance compared with other plastics, a reliable performance of the magneto-optical disk can be ensured for a longer period of time; and as being a thermosetting resin, it has an excellent heat resistance.

As described, various materials may be used for the substrate 1; however when adapting the above materials for the substrate 1 of the magneto-optical disk, the following optical and mechanical properties are preferably satisfied:

refractive index: 1.44–1.62 double refraction: not more than 100 nm (double refraction measured by a parallel beam)

transmittance: not less than 90% deviation in thickness: ±0.1 mm tilt: not more than 10 mrad vibration acceleration: not more than 10 m/s$^2$ radial direction acceleration: not more than 3 M/s$^2$.

The optical pickup for conversing a laser beam onto the recording layer 4 is designed so as to adjust to the refractive index of the substrate 1. Therefore, if the refractive index of the substrate 1 greatly deviates, the laser beam may not be able to be converged sufficiently. Furthermore, if the laser beam is not converged constantly, the temperature distribution of the recording medium (readout layer 3 and the recording layer 4) is subjected to change, thereby adversely affecting the recording and reproducing operations. In the present invention, the temperature distribution of the recording medium when reproducing is especially important. Therefore, the refractive index of the substrate 1 is preferably set within a range of 1.44–1.62.

Since a laser beam is incident through the substrate 1, if double refraction occurs in the substrate 1, the polarization state changes when the laser beam is being transmitted through the substrate 1. In the arrangement of the present invention, a change in the magnetic state of the readout layer 3 is recognized as a change in the polarization state by utilizing the Kerr effect. Therefore, if the polarization state changes when the laser beam is transmitted through the substrate 1, a reproducing operation cannot be carried out. For this reason, double refraction of the substrate 1 measured by parallel light is preferably set below 100 nm.

As to the transmittance, if the transmittance of the substrate 1 becomes too low, for example, when a light beam is transmitted from the optical pickup through the substrate 1 in recording, a light amount reduces. Therefore, in order to retain a light amount sufficient in recording, a laser source designed for higher output is required. Especially, in the arrangement of the present invention, since the recording medium has a doublelayer structure composed of the recording layer 4 and the readout layer 3, compared with the conventional recording medium of single layer structure (the readout layer 3 is not provided), a greater amount of light is required for raising the temperature of the recording medium. For this reason, the transmittance of the substrate 1 is preferably set to or above 90%.

The optical pickup for converging a laser beam onto the recording layer 4 is designed so as to adjust to the thickness of the substrate 1. Therefore, if the thickness of the substrate 1 greatly deviates, the laser beam may not be able to be converged sufficiently. Furthermore, if the laser beam is not converged under the stable condition, the temperature distribution of the recording medium is subjected to change, thereby adversely affecting the recording and reproducing operations. In the present invention, the temperature distribution of the recording medium when reproducing is especially important. Therefore, the deviation in the thickness of the substrate 1 is preferably set within a range of ±0.1 mm.

If the substrate 1 is tilted, a laser beam from the optical pickup is converged onto the tilted recording medium surface. Thus, the converged state changes depending on the degree of tilt, thereby adversely affecting the recording and reproducing operation as is occurred when the thickness of the substrate 1 deviates. In the present invention, the tilt of the substrate 1 is set below 10 mrad, more preferably below 5 mrad.

When the substrate 1 moves up and down with respect to the optical pickup, the optical pickup is activated so as to compensate the movement, and a laser beam is converged onto the surface of the recording medium. However, if the substrate 1 greatly moves up and down, it may not be possible to activate the optical pickup so as to completely compensate the movement. Therefore, the laser beam may not be able to be converged onto the recording medium sufficiently, and thus, the temperature distribution of the recording medium changes, thereby adversely affecting recording and reproducing operations. In the present invention, since the temperature distribution of the recording medium in reproducing is especially important, as to the up and down movement of the substrate 1 in rotating, the vibration acceleration is preferably set to or below 10 m/s$^2$.

On the substrate 1, the guide truck for guiding a light beam is formed beforehand at 1.0–1.6 μm pitch. However, if an eccentricity exists in the guide truck, while the disk is being rotated, the guide truck moves in a radial direction with respect to the optical pickup. In this case, the optical pickup is activated so as to compensate the movement in a radial direction, and a laser beam is converged with a predetermined relationship with the guide track. However, if the guide track is greatly moved in a radial direction becomes, it may not be possible to activate the optical pickup so as to sufficiently compensate this movement. Thus, the optical pickup cannot control the light beam so as to be converged with a predetermined relationship from the guide truck. As described, in the present invention, the temperature distribution of the recording medium when reproducing is especially important, and thus, as to the movement in a radial direction of the substrate 1 while being rotated, its acceleration in a radial direction is preferably to or below 3 m/s$^2$.

There are two methods for directing a converged laser beam to a predetermined position on the magneto-optical disk: successive servo system utilizing a spiral or concentric guide truck; and a sample servo system utilizing a spiral or concentric pit string.

Figure 16:
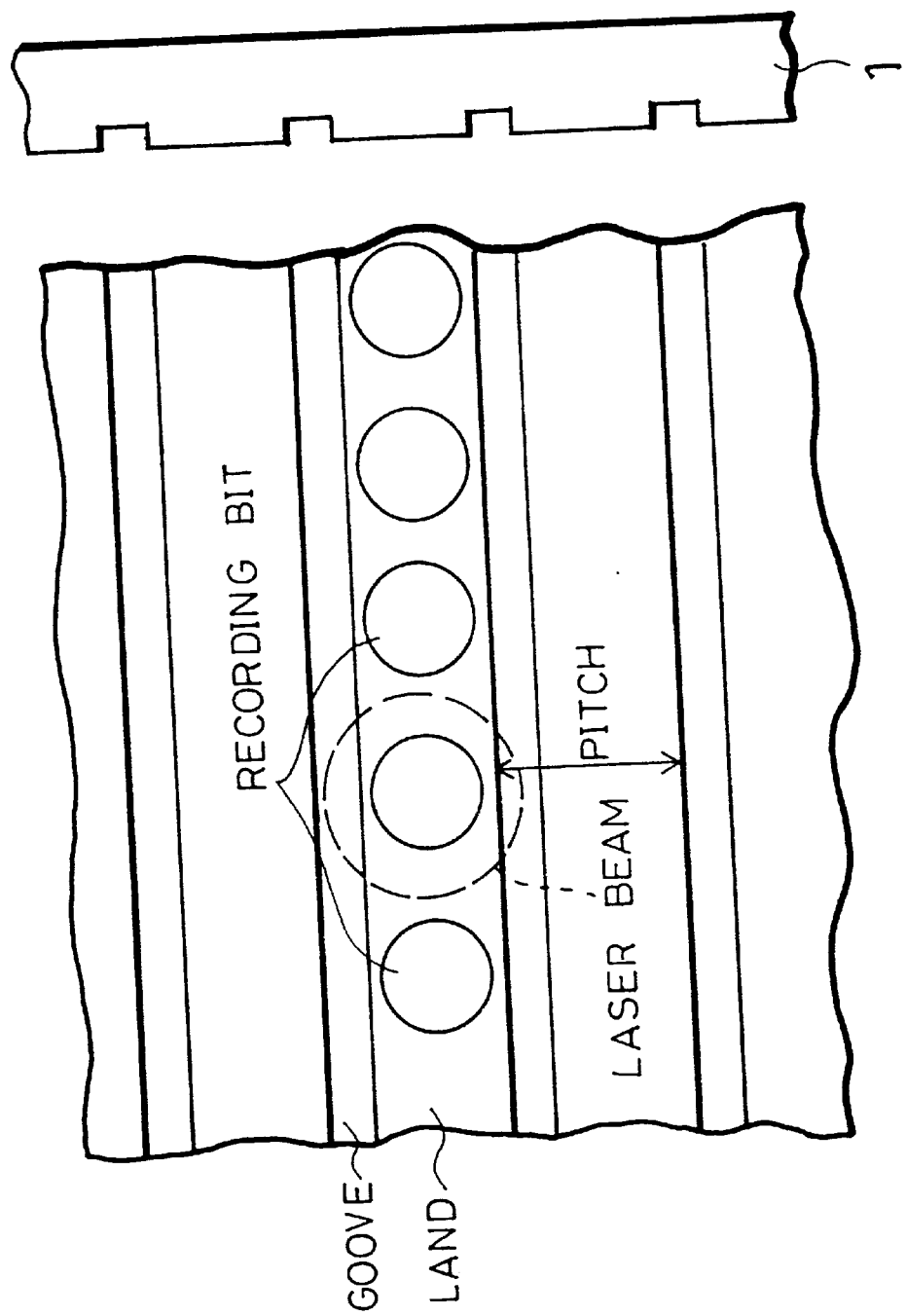

As shown in FIG. 16, in the case of a successive servo system, a groove with a width of 0.2–0.6 μm is formed with a depth of substantially $\lambda/(8n)$ at a pitch of 1.2–1.6 μm, and generally, recording and reproducing of information are carried out on and from the land which is called a land-use magneto-optical disk. Here, $\lambda$ indicates a wavelength of a laser beam, and n indicates the refractive index of the substrate.

It is very possible to adapt the above generally used method to the present invention. In the present invention, crosstalk from the recording bit on the adjacent tracks can be reduced to a great degree. Therefore, for example, in the case of a magneto-optical disk in which recording and reproducing are carried out on and from the land, even when a groove is formed with a width of 0.1–0.4 μm at a pitch of 0.5–1.2 μm, recording and reproducing operations can be carried out without having an adverse effect of the crosstalk from the adjoining recording bits, thereby significantly improving a recording density.

Figure 17:
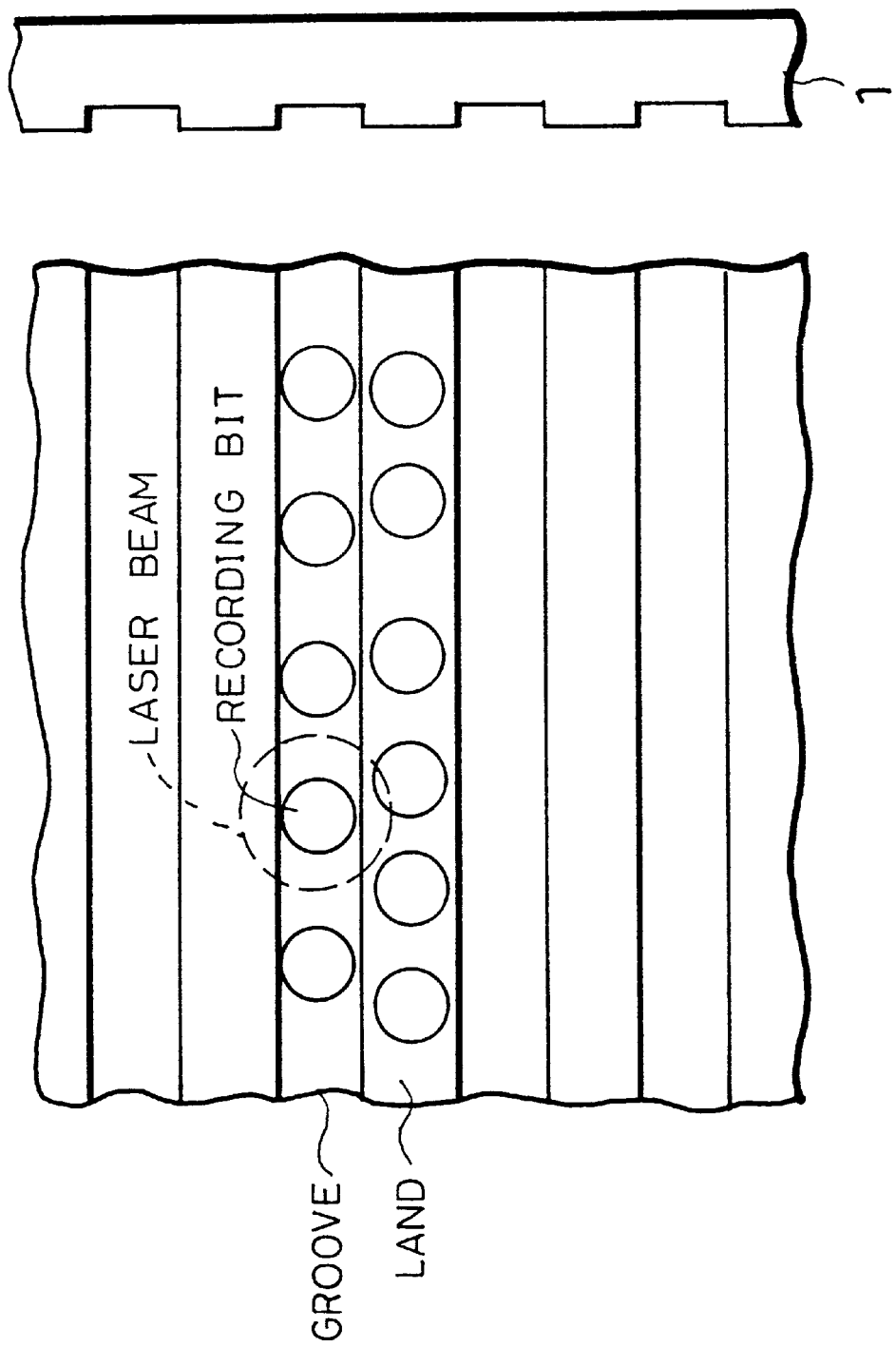

As shown in FIG. 17, when the groove and the land are formed with the same width at a pitch of 0.8–1.6 μm, and recording and reproducing operations are carried out on and from both the land and the groove, recording and reproducing operations can be carried out without having an adverse effect of the crosstalk from the adjoining recording bits, thereby significantly improving a recording density.

Figure 18:
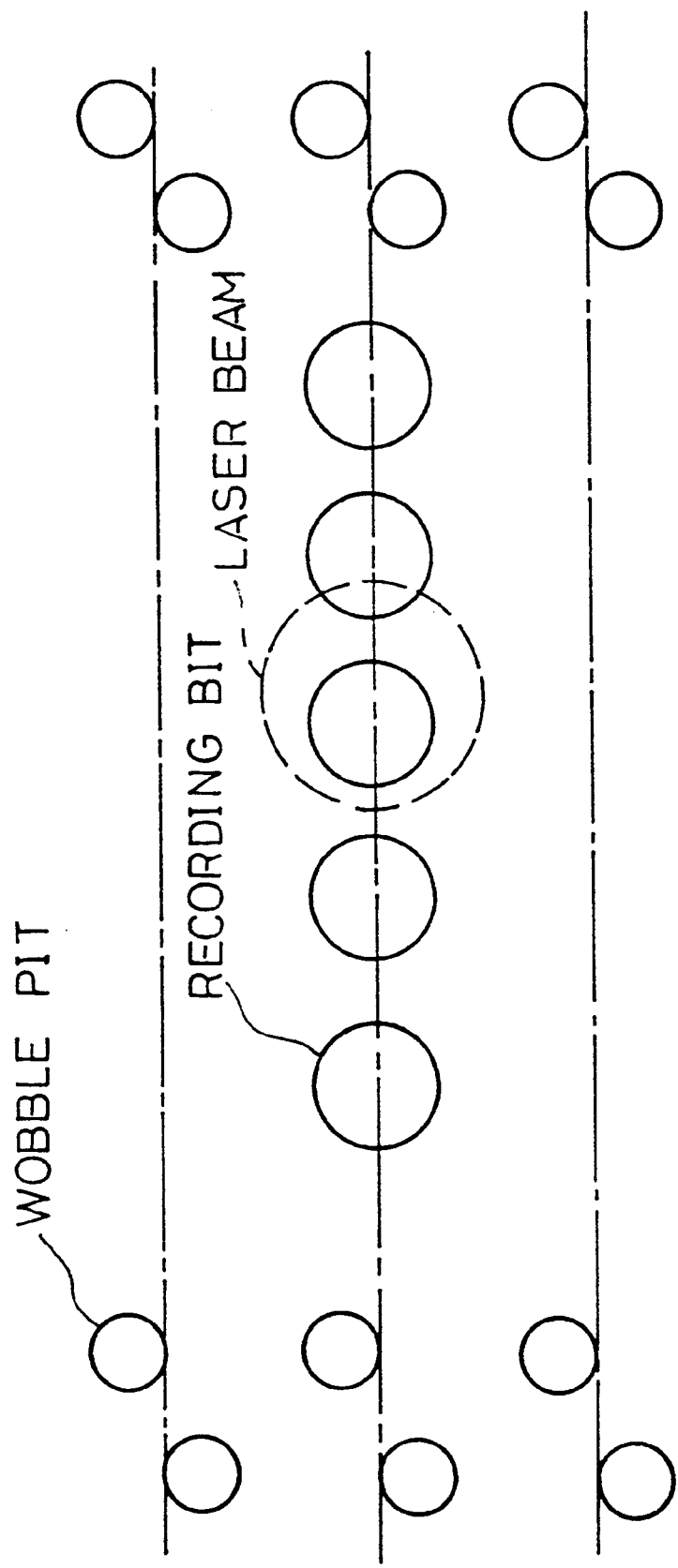

When a sample servo system is adapted, as shown in FIG. 18, a wobble pit is formed beforehand with a depth of substantially $(\lambda/(4n))$ at pitch of 1.2–1.6 μm. In general, recording and reproducing of information is carried out so as to scan the center of the wobble-pit.

It is very possible to adapt the above generally used method to the present invention. In the present invention, crosstalk from the recording bit on the adjacent tracks can be reduced to a great degree. Therefore, for example, in the case of a magneto-optical disk in which a wobble pit is formed at a pitch of 0.5–1.2 μm, recording and reproducing operations can be carried out without having an adverse effect of the crosstalk from the adjoining recording bits, thereby significantly improving a recording density.

Figure 19:
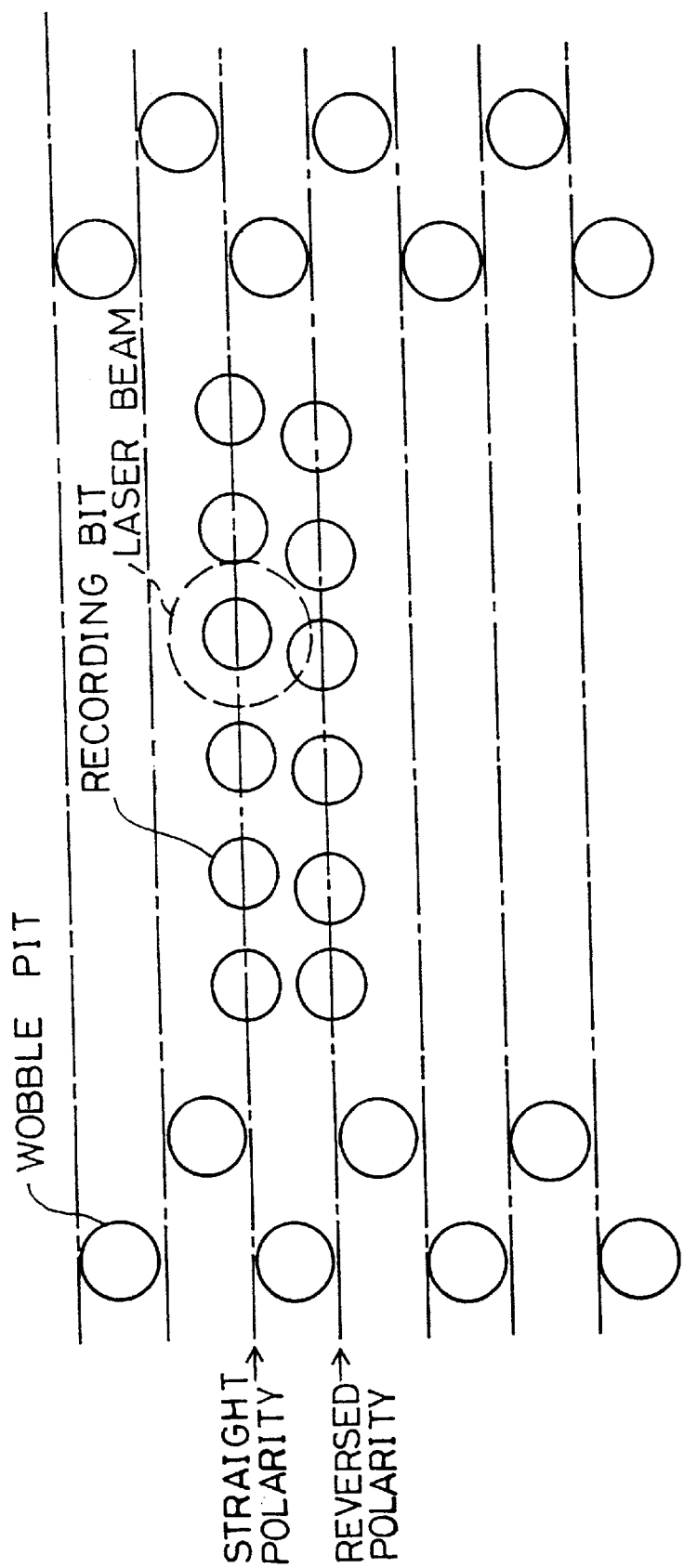

As shown in FIG. 19, a wobble pit is formed at a pitch of 0.8–1.6 μm, and recording and reproducing of information are carried out with respect to an area wherein the wobble pit exists in opposite polarity, recording and reproducing operations can be carried out without having an adverse effect of the crosstalk from the adjoining recording bits, thereby significantly improving a recording density.

Figure 20:
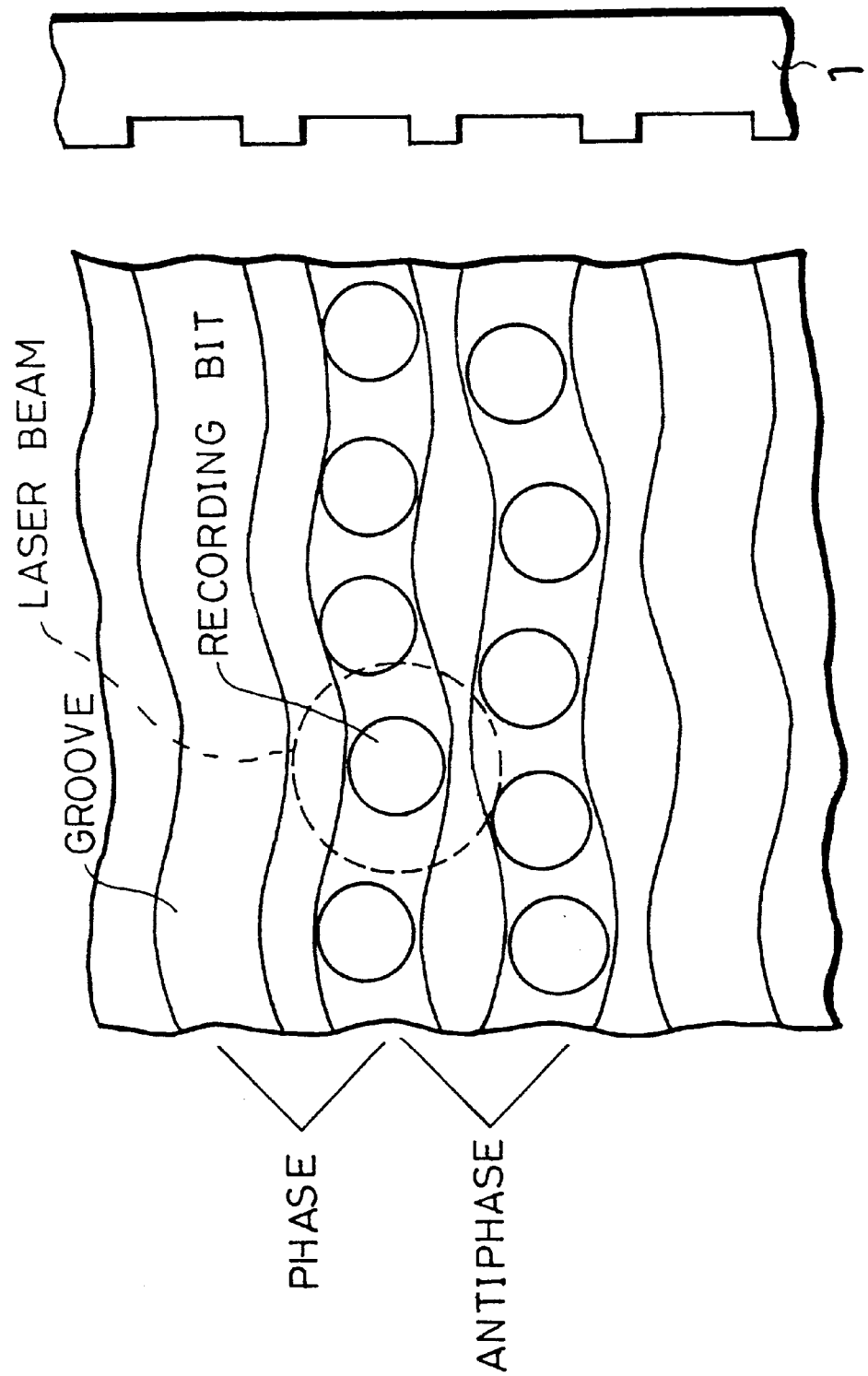
Figure 21:
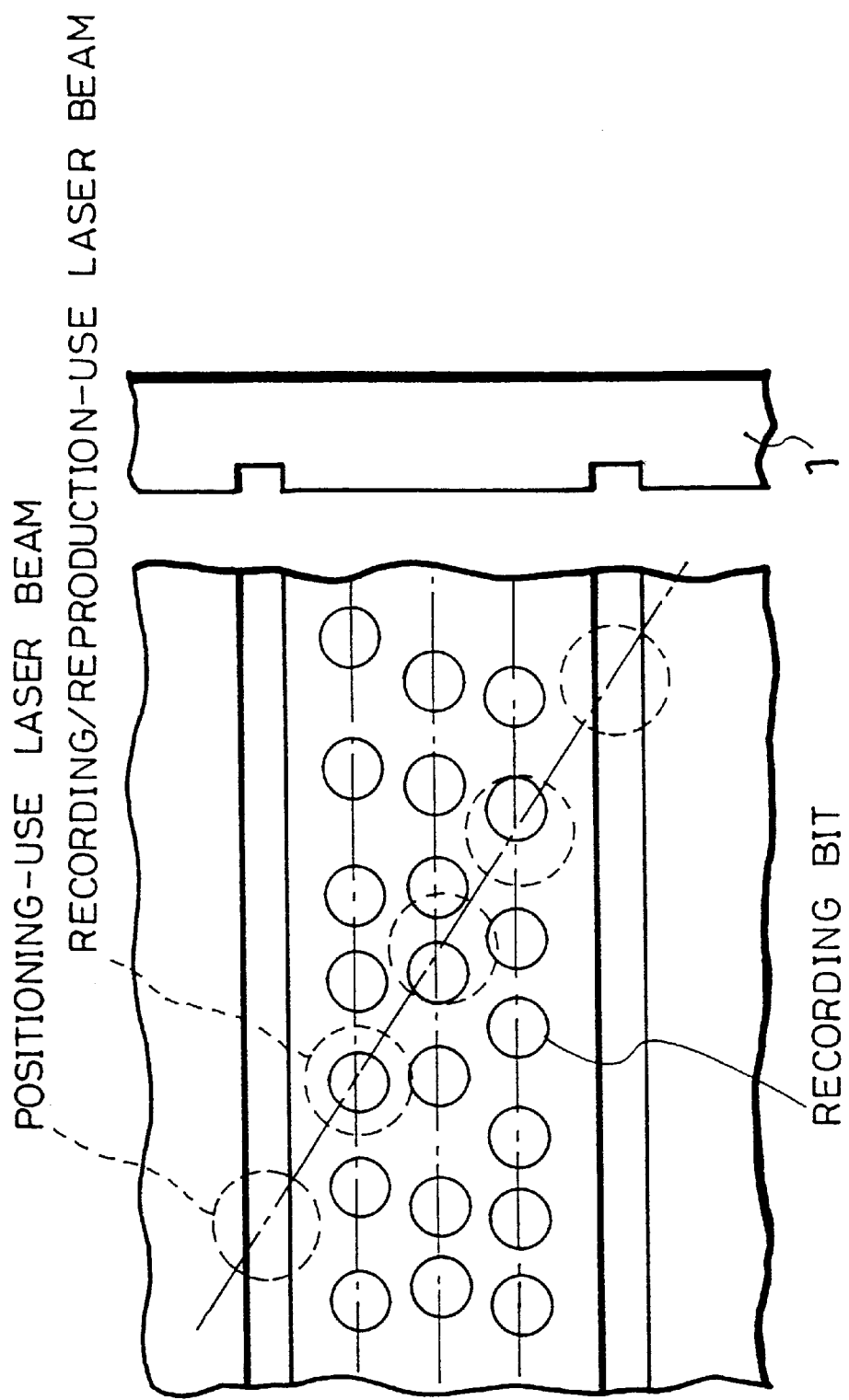

As shown in FIG. 20, in the above successive servo system, when information indicative of position on the magneto-optical disk is obtained by wobbling the groove, in the area where the wobbling state shows opposite phase, there arises a problem that the crosstalk from the recording bit on the adjoining groove becomes large. However, the present invention permits even in the area where the wobbling state shows opposite phase, crosstalk from the recording bit on the adjoining groove can be prevented, thereby achieving desirable recording and reproducing operations.

Moreover, the magneto-optical disk of the present embodiment is also applicable to a variety of the following optical pickups designed for recording and reproducing information.

In the case of an optical pickup of a multiple beam system, for example, when an optical pickup of a multiple beam system wherein a plurality of light beams are used, generally it is set such that among a plurality of light beams, the light beams on both ends scan on the guide track, and recording and reproducing operations are carried out using other light beams in between. However, with the use of the present invention, even when the width of the light beam is reduced, a reproducing operation can be carried out without having an adverse effect of the crosstalk from the adjoining recording bit, and thus the pitch of the guide truck can be made shorter. Alternatively, a greater number of laser beams can be used between a pair of guide trucks in recording and reproducing, thereby achieving a still higher density recording and reproducing operation.

In the above explanation, under the conditions that the number of aperture (N.A.) of the objective lens of the adapted optical pickup is set in a range of 0.4–0.6 which is a generally used value, and the wavelength of the laser beam is set in a range of 670–840 nm, guide truck pitch, etc., has been discussed. However, by making greater the N.A., i.e., in a range of 0.6–0.95, a laser beam can be converged to a smaller spot, and by adapting the magneto-optical disk of the present invention, the pitch and the width of the guide truck can be made still narrower, thereby permitting a still higher recording and reproducing density.

Additionally, with a use of an argon laser beam with a wavelength of 480 nm, or a laser beam with a wavelength of 335–600 nm utilizing a SHG element, the laser beam can be converged to a smaller spot, and further with the use of the present invention, the pitch and the width of the guide track can be made still narrower, thereby enabling a still higher density recording and reproducing operations.

As to a/w, that in a range of 0.3–1.0 may be used. Here, a represents optically effective diameter of the lens, and w represents a radius at which the intensity of the light beam is $1/e^2$ of the intensity of the center of the light beam when the intensity of the light beam shows Gaussian distribution.

Next, the following description deals with the disk format to be adapted in the magneto-optical disk of the present embodiment.

In general, in the magneto-optical disk, in order to maintain the compatibility between different brands and different magneto-optical disks, respective value and duty of the power required in recording and erasing at each radial position are recorded beforehand by a prepit string with a depth of substantially $(\lambda/(4n))$ in a part of an inner of outer circumference. Moreover, based on the read values of the above, a test area is provided in inner or outer circumference wherein recording and reproducing tests can be actually carried out (for example, see IS10089 standard).

As to the reproducing power, information which specifies a reproducing power is recorded in a portion of an inner or outer circumference beforehand in a form of a prepit string.

In the magneto-optical disk of the present invention, the temperature distribution of the recording medium in reproducing greatly affects the reproducing performance. Therefore, the setting of the reproducing power is extremely important.

As a method for setting a reproducing power, for example, the following method is preferable: as in the case of a recording power, a test area for setting a reproducing power is provided on an inner or outer circumference, and information for optimizing the reproducing power obtained from the test area for each radial position is preferable recorded on a part of an inner or outer circumference in a form of a pit string.

Especially, when a magneto-optical disk drive which adapts a CAV system wherein the rotating speed is constant, since the linear velocity of the magneto-optical disk changes depending on the radial position, the reproducing laser power is preferably adjusted for each radial position. Therefore, information segmented in as many areas in radial direction as possible is preferably recorded in a form of a prepit string.

As a method for setting an optimum reproducing laser power each radial position, the following method is available as well: a recording area is divided into a plurality of zones by a radial position, and the optimum recording power and the reproducing power are set using the test areas provided in the respective zones, thereby permitting the temperature distribution of the recording medium to be accurately controlled in reproducing. As a result, a desirable recording and reproducing operations can be achieved.

The magneto-optical disk of the present embodiment is applicable to a various recording system as explained below.

A method for recording on the initial model of the magneto-optical disk whereon overwriting is not permitted is described first.

The initial model of the magneto-optical disk under IS10089 standard (ISO standard set for 5.25" rewritable optical disk) has been popularly used on the market. In writing new information, first erasing must be carried out from the portion, and then new information can be recorded thereon. Therefore, at least two rotations of the magneto-optical disk are required. Thus, the initial model of the magneto-optical disk presents the problem of low transfer speed.

On the other hand, the initial model of the magneto-optical disk has an advantage that the properties required for the magnetic films are not as high as the magneto-optical disk whereon overwriting is permitted (to be described later).

In order to overcome the defect that overwriting is not permitted, the following method has been adapted in some devices: for example, a plurality of optical heads are provided so as to eliminate the time loss required for waiting, thereby improving a data transfer speed.

More specifically, two optical heads are used: the optical head in front is used for erasing the recorded information; and the other which follows the above optical head is used for recording new information. In reproducing, either one of the optical heads is used.

In the case where three optical heads are used, the optical head in front is used for erasing the recorded information; the optical head which follows next is used for recording new information; and optical head which follows last is used for verifying that new information is recorded accurately.

Alternatively, the overwriting is permitted by means of a single optical head by arranging such that a plurality of light beams are produced using a beam splitter instead of using a plurality of optical heads.

Therefore, without a process for erasing the information already recorded on the disk, new information can be recorded. Thus, the initial model of the magneto-optical disk can be improved with a function similar to the overwriting function.

As described in the experimental results of the above explanation, it has been proved that the magneto-optical disk of the present invention permits recording, reproducing and erasing operations, which can be used when adapting the recording method of the present invention.

Next, the magnetic field modulation overwrite recording system will be explained.

By the magnetic field modulation overwrite recording system, information is recorded by modulating the intensity of the magnetic field in accordance with the information while a laser of a constant power is being projected onto the magneto-optical recording medium. The magnetic field modulation overwrite recording system will be explained in more detail in reference to FIG. 22.

Figure 22:
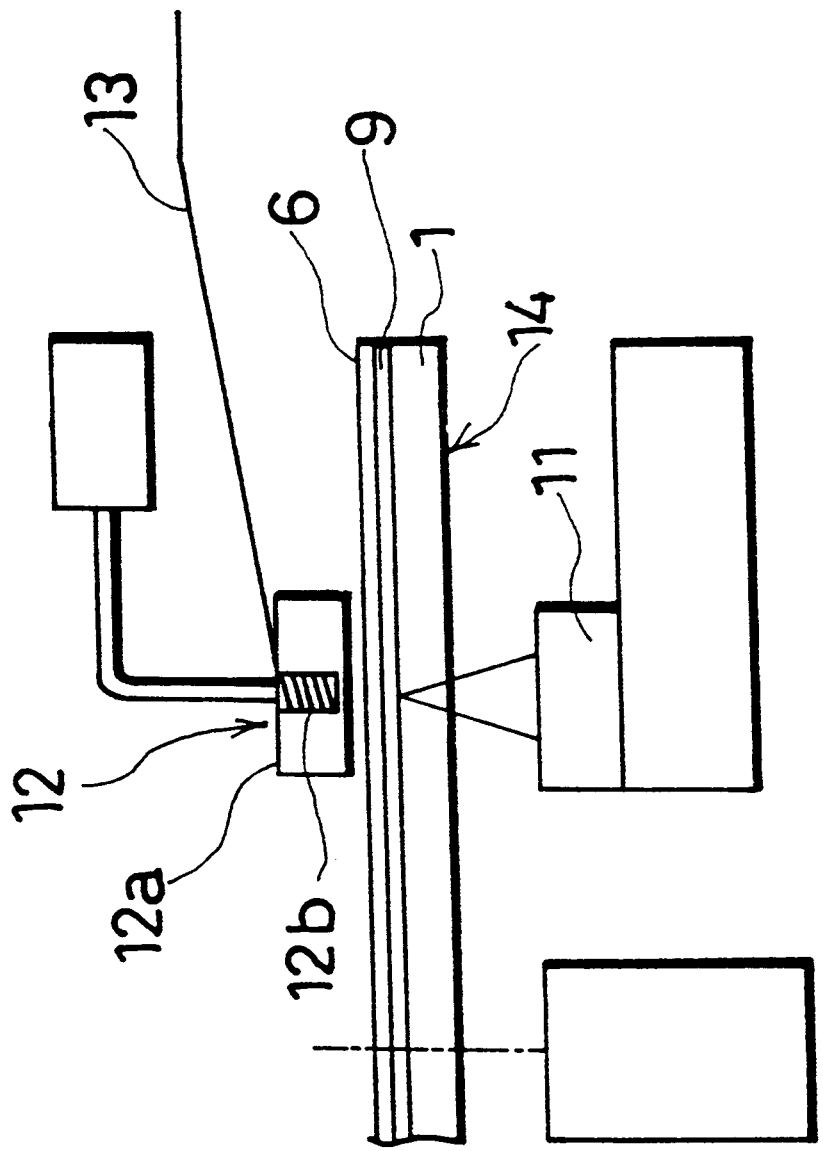

FIG. 22 is a typical depiction which shows one example of the magneto-optical disk device whereon overwriting by the magnetic field modulation is permitted. The device is provided with a light source (not shown) for projecting a laser beam in recording and reproducing, an optical head 11 which stores therein a receiving element (not shown) for receiving a reflected light from the magneto-optical disk when recording and reproducing and a floating-type magnetic head 12 which is electrically or mechanically connected to the optical head 11.

The floating-type magnetic head 12 is composed of a slider 12a and a magnetic head 12b which includes a core made of MnZn ferrite, etc., having a coil wound around thereon. The floating-type magnetic head 12 is pressed down toward the magneto-optical disk 14 so as to maintain a predetermined distance of approximately several $\mu$m-to several tens $\mu$m while the magneto-optical disk 14 is being rotated.

In this state, the floating-type magnetic head 12 and the optical head 11 are moved to a desired radial position in the recording area of the magneto-optical disk 14, and a laser beam with a power of 2–10 mW is projected thereon from the optical head 11 so as to raise the temperature of the recording layer 4 to the vicinity of Curie temperature (or the temperature at which coercive force becomes nearly zero). In this state, in accordance with information to be recorded, magnetic field whose magnetization direction reverses upward and downward is applied from the magnetic head 12b. As a result, information can be recorded by the overwrite recording system without having an erasing process of information already recorded on the disk.

In the present embodiment, the laser power used in overwriting by the magnetic field modulation is set constant. However, when the polarity of the magnetic field changes, if the laser power is reduced to a power at which a recording is not permitted, the shape of the recording bit to be recorded can be improved, thereby improving the quality of a reproduced signal.

When carrying out a high speed recording by the magnetic field modulation overwriting, the modulation of the magnetic field must be carried out at high speed. However, the magnetic head 12b has limits in terms of its electric power consumption and size. Therefore, it is not possible for the magnetic head 12b to generate such a large electric field. This means that the magneto-optical disk 14 must be arranged such that a recording operation can be carried out with a relatively small magnetic field.

In considering the above, the magneto-optical disk of the present embodiment, Curie temperature of the recording layer 4 is set low (in a range of 150–250° C.) so that recoding operation can be easily carried out. Furthermore, by adapting DyFeCo which has small perpendicular magnetic anisotoropy, the magnetic field required for recording can be made smaller. Thus, the magneto-optical disk of the present embodiment has a structure suitable for the magnetic field modulation overwrite system.

Next, a light intensity modulation overwrite recording system will be explained below.

When the light intensity modulation overwrite recording system is adapted, information is recorded in an opposite way to the magnetic field modulation overwrite recording system. Namely, information is recorded by modulating a laser power in accordance with the information to be recorded while a magnetic field of a constant intensity is being applied onto the magneto-optical recording medium. The light intensity modulation recording system will be explained in more detail in reference to FIG. 23 through FIG. 27.

Figure 24:
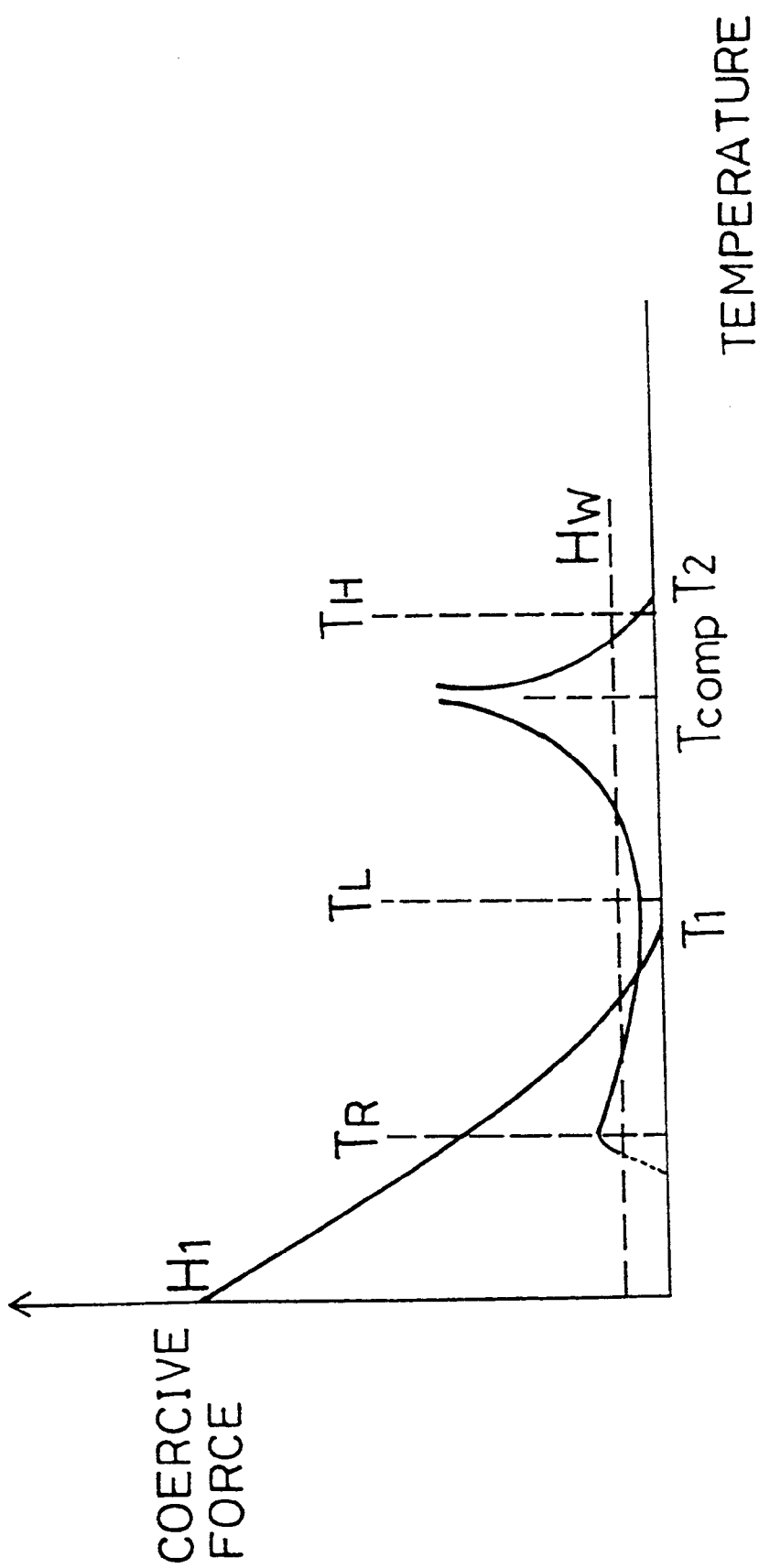

FIG. 24 shows the temperature dependency of coercive force in a direction perpendicular to the film surfaces of the readout layer 3 and the recording layer 4 and the recording magnetic field $H_W$ suitable for the overwrite recording method by the light intensity modulation to be described later.

Figure 25:
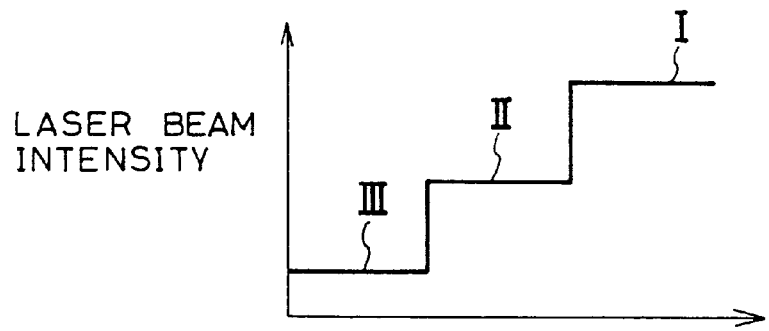

A recording operation is carried out by projecting a laser beam which is modulated into two levels (high and low) while the recording magnetic field Hw is being applied. Namely, as shown in FIG. 25, when a laser beam of high level I is projected, both the temperatures of the readout layer 3 and the recording layer 4 are raised to $T_H$ which is in the vicinity of or above the respective Curie temperatures $Tc_1$ and $Tc_2$. On the other hand, when a laser beam of low level II is projected, only the temperature of the recording layer 4 is raised to $T_L$ which is above Curie temperature $Tc_2$.

Figure 23:
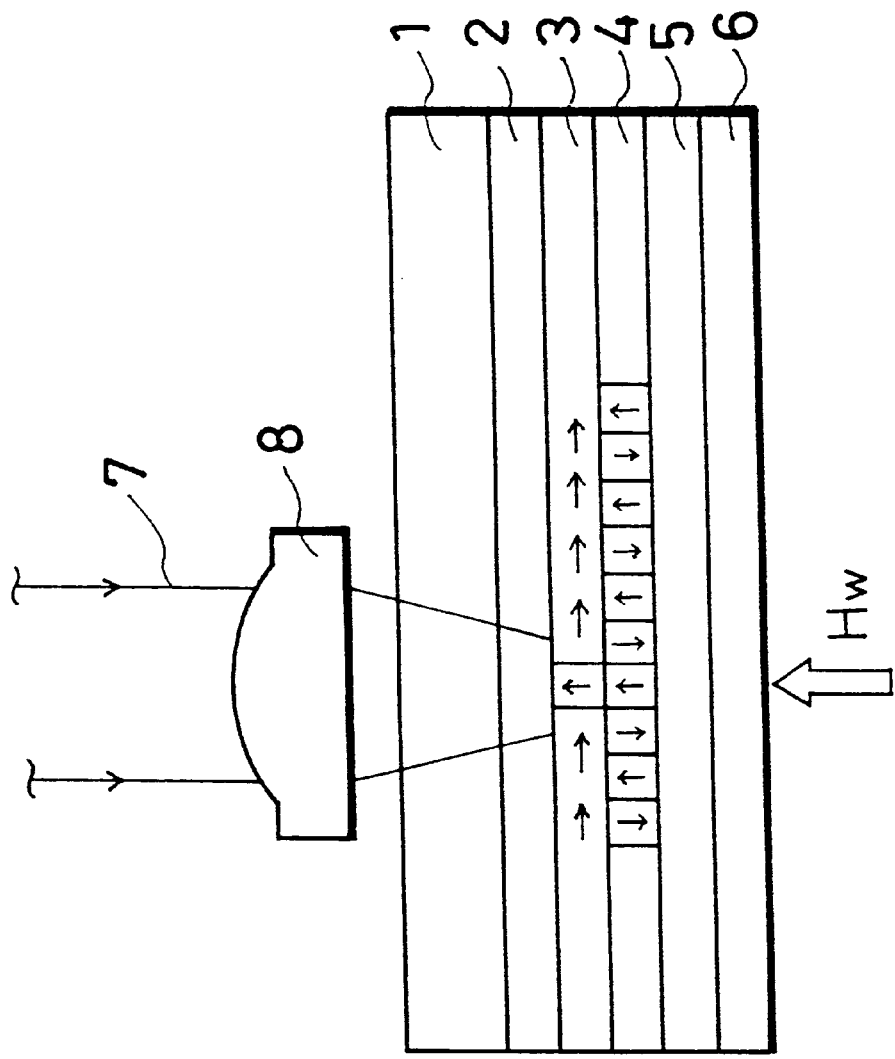

Therefore, when the laser beam of low level II is projected, since the coercive force $H_1$ of the readout layer 3 is sufficiently small, the magnetization in the readout layer is arranged in the magnetization direction of the recording magnetic field Hw. Furthermore, it is copied to the recording layer 4 in the process of cooling off. Namely, the magnetization becomes upward as shown in FIG. 23.

Next, when a laser beam of high level I is projected, since the temperature of the readout layer 3 is raised above its compensation temperature, the magnetization direction of the readout layer 3 is arranged in an opposite direction to the case of projecting a laser beam of low level II by the recording magnetic field Hw. Namely, the magnetization direction of the readout layer 3 is downward. In the process of cooling off, the temperature is dropped to a temperature as low as the case of projecting a laser beam of low level II; however, the cooling process of the readout layer 3 and the cooling process of the recording layer 4 are different (the recording layer 4 is cooled off at faster speed). Therefore, only the recording layer 4 has temperature $T_L$ obtained by projecting the laser beam of low level II, and the magnetization direction of the readout layer 3 is copied to the recording layer 4 (downward). Thereafter, the temperature obtained by projecting the readout layer 3 is cooled off to the temperature of the laser beam of low level II, and the magnetization direction is arranged in the magnetization direction of the recording magnetic field $H_W$ (upward). Here, since the magnetization direction of the recording layer 4 is not arranged in the magnetization direction of the recording magnetic field Hw since its coercive force $H_2$ is sufficiently larger than the recording magnetic field Hw.

In reproducing, with the projection of the laser beam with an intensity level III (FIG. 25), the temperature of the readout layer 3 is raised to $T_R$ (FIG. 24), and a transition occurs in the readout layer 3 from in-plane magnetization to perpendicular magnetization. As a result, both the recording layer 4 and the readout layer 3 exhibit perpendicular magnetic anisotoropy. Here, a recording magnetic field Hw is not applied, or even when it is applied, since the recording magnetic field Hw is significantly smaller than the coercive force $H_2$ of the recording layer 4, in reproducing, the magnetization direction of the readout layer 3 is arranged in the magnetization direction of the recording layer 4 by the exchange coupling force exerted on the interface between the layers.

As described, information can be recorded by the overwrite recording system without a process for erasing information already recorded.

Figure 26:
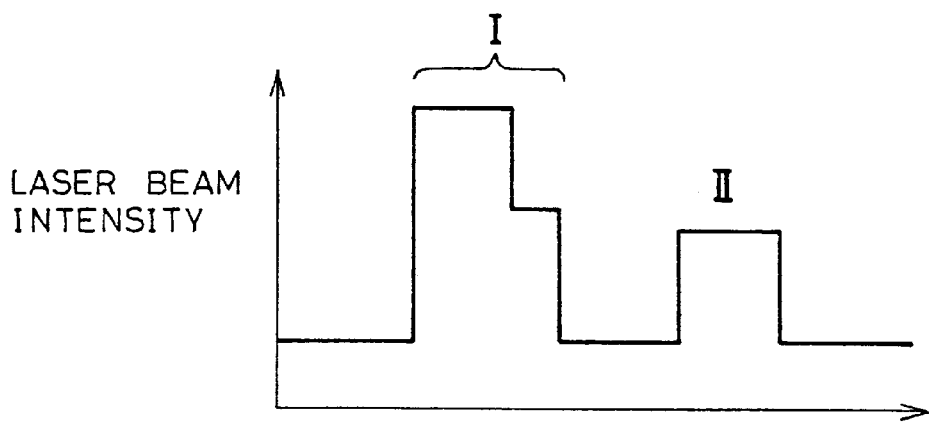
Figure 27:
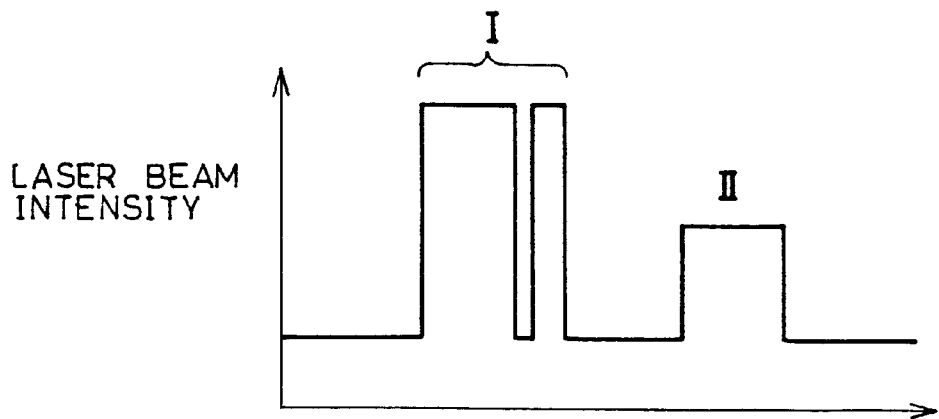

A recording operation may be carried out by projecting modulated light beams of two types shown in FIG. 26 or 27, while recording magnetic field Hw is being applied.

Specifically, when a laser beam of high level (type I) is projected, the respective temperatures of the readout layer 3 and the recording layer 4 are raised to $T_H$ which is the vicinity of or above the respective Curie temperatures $T_{c^1}$ and $T_{c^2}$. On the other hand, when a laser beam of low level (type II) is projected, only the temperature of the recording layer 4 is raised to $T_L$ which is above Curie temperature $T_{c^2}$. In this way, the respective cooling off processes of the readout layer 3 and the recoding layer 4 can be set significantly different, especially when the laser beam of high level (type I) is projected. Specifically, the recording layer 4 is cooled off at higher speed. Thus, the rewriting operation can be easily carried out.

Here, after projecting the laser beam of high level (type I), a laser beam of an intensity not less than high level may be projected for a while as long as the intensity thereof is below high level.

The above recording method has an advantage that when overwriting by the light intensity modulation, an initialization-use magnetic field which is generally required can be eliminated.

Figure 28:
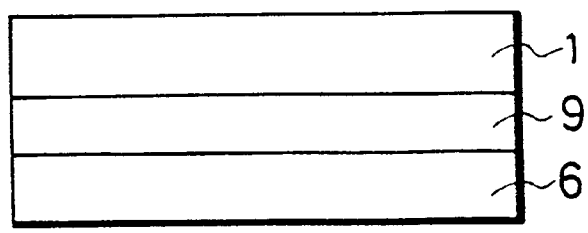

The magneto-optical disk (FIG. 1) is a so-called single sided type. For convenience in the explanation, the thin film of the magneto-optical disk, i.e., the transparent dielectric film 2, the readout layer 3, the recording layer 4 and the protective film 5 is referred to as a recording medium layer. Thus, the magneto optical disk is composed of a substrate 1, recording medium layer 9 and the overcoat film 6 as shown in FIG. 28.

Figure 29:
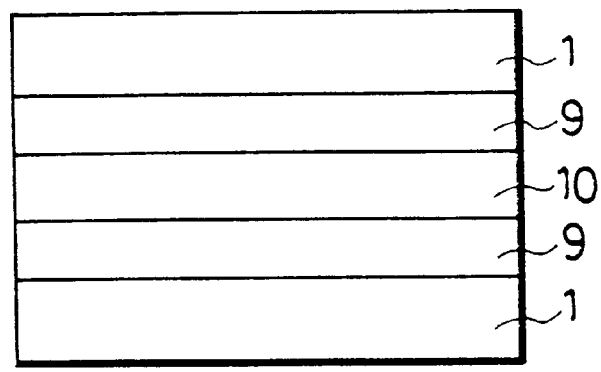

A so-called both sided magneto-optical disk is shown in FIG. 29. In this type of magneto-optical disk, a pair of the substrates 1 whereon the recording medium layers 9 are respectively laminated by adhesive layer 10 so that respective recording magnetic layers 9 confront one another.

As to the material for the adhesive layer 10, especially, polyurethane acrylate adhesive layer is preferable. The above adhesive layer is provided with a combination of the hardening properties obtained by ultraviolet ray, heat and anaerobic. Therefore, this adhesive layer has an advantage that the shadow portion of the recording medium layer 9 through which the ultraviolet ray is not transmitted can be hardened by heat and anaerobic. Moreover, because of its high moisture resistance, a reliable performance of the magneto-optical disk of double-sided type can be ensured for a long period of time.

On the other hand, the magneto-optical disk of a single-sided type is suitable for a compact magneto-optical recording and reproducing device because the required thickness is as thin as ½ of that required for the both-sided magneto-optical disk.

The magneto-optical disk of a double-sided type is suitable for the large capacity magneto-optical recording and reproducing device because both sides can be used for recording and reproducing.

In determining which type of the magneto-optical disk is suitable (both-sided or signal-sided), the thickness and the capacity of the magneto-optical disk should be considered as explained above. Which recording method is adapted is also an important factor to be considered as explained below.

As well known, in recording information on the magneto-optical disk, light beam and magnetic field are used. As shown in FIG. 22, in the magneto-optical disk device, a light beam is emitted from a light source such as a semiconductor laser so as to be converged onto the recording medium layer 9 by the converging lens 8 through the substrate 1. Further, by a magnetic field generation unit (for example, a floating-type magnetic head 12) such as a magnet, an electromagnet, provided so as to confront the light source, magnetic field is applied onto the recording medium layer 9. In recording, by setting the light beam intensity higher than the light beam used in reproducing, the temperature of the portion having converged thereon a light beam of the recording medium layer 9 is raised. As a result, coercive force of the magnetic film at the portion becomes smaller. In this stage, by externally applying a magnetic field with a size larger than the coercive force, the magnetization direction of the magnetic film is arranged in the magnetization direction of the applied magnetic field, thereby completing the recording process.

For example, in the overwrite method by magnetic field modulation wherein the recording-use magnetic field is modulated according to the information to be recorded, the magnetic field generating device (an electromagnet in most cases) is required to set at the closest possible position to the recording medium layer 9. This is because when heat generated from the coil of the electromagnet, in considering electric power consumption of the device, the size of magnetic field generating device, etc., in order to set the magnetic field to be modulated at a frequency required for recording (in general several hundreds kHz to several tens MHz) and the magnetic field required for recording (in general 500 e—several hundreds 0 e), the magnetic field generating device is required to be set to a distance of 0.2 mm or below, more preferably to 50 μm. In the case of the both-sided type magneto-optical disk, the substrate 1 normally has the thickness of 1.2 mm and at least 0.5 mm is required. Thus, when the electromagnet is placed so as to confront the light beam, the magnetic field sufficient for recording cannot be ensured. For this reason, in the device having a recording medium layer 9 designed for overwriting by the magnetic field modulation, the single-sided type magneto-optical disk is often used.

In the case of the overwrite method by the light intensity modulation wherein a light beam is modulated according to information to be recorded, recording can be carried out with a recording-use magnetic field whose magnetization is fixed in one direction, or without a recording-use magnetic field. Therefore, for example, a permanent magnet which has a strong power for generating magnetic field may be used. Thus, the magnetic-field modulation is not required to be set at the closest possible position unlike the case of the magnetic field modulation. The distance of several mm is permitted between the recording medium layer 9 and the magnetic field generating unit. Therefore, not only the single-sided type but also both-sided type magneto-optical disk are applicable as well.

The single-sided type magneto-optical disk of the present embodiment may be varied in the following ways:

As a first example, a magneto-optical disk having a hard coat layer on the overcoat film 6 may be used. The magneto-optical disk is composed of a substrate 1, recording medium layer 9, an overcoat film 6 and a hard coat layer. Here, for example, an acrylate family ultraviolet ray hardening type hard coat resin film (hard coat layer) is formed on the overcoat film 6, for example, made of a polyurethan acrylate family ultraviolet ray hardening type resin with a thickness of substantially 6 μm. The film thickness of the hard coat layer may be set at 3 μm.

In the above arrangement, since the overcoat film 6 is formed, the deterioration in the property of the recording medium layer 9 due to the oxidization can be prevented, thereby ensuring a reliable recording and reproducing operation for a long period of time. Additionally, since the hardcoat film made of a hard material and has large wear resistance is provided, even if the magnet for use in recording is in contact with the disk, the disk is not easily scarred, or even if it is scarred, the scar would not reach the recording medium layer 9.

Alternatively, the overcoat film 6 may be arranged so as to be served also as a hardcoat film.

As a second example of the single-type magneto-optical disk of the present embodiment, the magneto-optical disk having a hardcoat layer formed on the overcoat film 6, and the magneto-optical disk is composed of the hardcoat film, a substrate 1, a recording medium layer 9, an overcoat film 6, and another hardcoat film.

As to the material for the substrate 1 of the magneto-optical disk, a plastic such as PC is generally used. However, since the plastic is a very soft material compared with a glass material, it is easily scarred even with a small rub by nail. If the disk is badly scarred, the problem of servo jump may occur in recording or reproducing using a light beam, and consequently, the recording and reproducing operations may not be performed properly.

When reproducing from the magneto-optical disk of the present embodiment, only the vicinity of the center of the light beam is subjected to reproducing. Thus, compared with the case of the conventional model, an adverse effect of the scar on the surface of the substrate in recording or reproducing becomes greater. In order to counteract this problem, in the arrangement of the present embodiment, the hardcoat film is provided on an opposite side the recording medium layer 9 of the substrate 1. This arrangement of the present embodiment is very effective in preventing the disk from being scarred.

The same effect can be obtained for the both-sided type magneto-optical disk as well by providing a hardcoat film on the surface of each substrate 1.

As a third example, a charge preventing layer (not shown) is formed on the overcoat film 6 or the hard coat layer of the first or the second example. Alternatively, a layer provided with a charge preventing function may be formed in the magneto-optical disk.

As in the case of the problem of the scar, if the dust adheres to the surface of the substrate 1, it may become impossible to perform recording or reproducing operation. In the case of adapting the overwrite method by the magnetic field modulation, if dust adheres onto the overcoat film 6, especially when the floating-type magnetic head 12 (FIG. 22) is placed above the overcoat film 6 with a gap of several $\mu$m, the floating-type magnetic head 12 and the recording medium layer 9 may be damaged due to the dust.

However, in the arrangement of the present embodiment, since a layer provided with a charge preventing function is formed on the substrate 1 or the recording medium layer side surface, the substrate 1 and the overcoat film 6 can be prevented from dust adhering thereon.

When reproducing from the magneto-optical disk of the present embodiment, only the portion corresponding to the vicinity of the center of the light is subjected to reproduction. Therefore, since an adverse effect of the scar on the surface of the substrate in recording or reproducing becomes greater than the conventional case, the above arrangement for preventing dust adhering onto the surface is very effective.

As to the charge preventing film, for example acrylic family hard coat resin may be used whereon an electrically conductive filler is mixed, with a thickness of substantially 2–3 $\mu$m may be used.

The charge preventing film is provided for decreasing the surface resistance so that the surface of the substrate 1 is prevented from adhering to dust irrespectively of the material used in the substrate 1, i.e., plastic or glass.

Needless to say, it may be arranged such that the overcoat film 6 or the hardcoat layer is provided with a charge preventing effect.

As to the magneto-optical disk of both-sided type, the arrangement of the present invention is applicable to the respective surfaces of the substrates 1.

As a fourth example, a lubricant film (not shown) may be formed on the overcoat film 6. The magneto-optical disk is composed of the substrate 1, the recording medium layer and the overcoat film 6 and a lubricant film. As to the material for the lubricant film, for example, a fluorocarbon resin may be used, and the film thickness is substantially 2 $\mu$m.

Since the lubricant film is provided, when overwriting through the magnetic field modulation using the floating-type magnetic head 12, lubricating properties between the floating-type magnetic head 12 and the magneto-optical disk may be improved.

The floating-type magnetic head 12 is positioned above the recording medium layer 9 with a gap of several $\mu$m to several tens $\mu$m. Namely, the pressing force from the suspension 13 exerted onto the floating magnetic head 12 towards the recording medium layer 9 and the floating force generated by the air flow due to the rotations of the disk exerted so as to apart the floating magnetic head 12 from the disk balance with one another, thereby maintaining a predetermined distance between the head 12 and the disk.

Using the floating-type magnetic head 12, in the case of adapting the CSS (contact-Start-Stop) method, the floating-type magnetic head and the magneto optical disk are in contact with one another until the magneto-optical disk reaches a predetermined rotation speed after it starts rotating and until the disk is completely stopped after the switch is turned off. In this method, if an absorption occurs between the floating-type magnetic head 12 and the magneto-optical disk, the floating-type magnetic head 12 may be damaged when the magneto-optical disk starts rotating. However, in the arrangement of the magneto-optical disk of the present embodiment, since a lubricant film is formed on the overcoat film 6, the lubricating properties between the floating-type magnetic head 12 and the magneto-optical disk can be improved, thereby preventing the floating-type magnetic head 12 from being damaged by absorption.

Needless to say, if a moisture resistance and protective material which prevents the deterioration of the recording medium layer 9 is used, it is not necessary to provide the overcoat film 6 and the lubricant film separately.

As a fifth example, the magneto-optical disk of the present embodiment may be arranged such that a moisture-proof layer (not shown) and the second overcoat film (not shown) are laminated on the side opposite to the side of the recording medium layer 9. The magneto-optical disk is composed of the overcoat film, the moisture-proof layer, the substrate 1, the recording medium layer 9 and the overcoat film 6.

As to the material for the moisture-proof layer, a transparent dielectric material such as AlN, AlSiN, SiN, AlTaN, SiO, ZnS, TiO$_2$, may be used, and the suitable thickness for the moisture-proof layer is approximately 5 nm. The second overcoat film is effective especially when a high moisture permeability plastic material such as PC, is used in the substrate 1.

In the case where the moisture-proof layer is not provided, for example, if the environmental moisture is greatly changed, moisture is absorbed or released in or from only the side where the recording medium layer 9 is not provided, i.e., the light incident side of the plastic substrate 1. Due to this moisture absorption and release, a partial change in the volume of the plastic substrate 1 occurs, thereby presenting the problem that the plastic substrate 1 may be warped.

This warpage of the substrate 1 occurs when the substrate 1 is tilted with respect to the optical axis of the light beam used in reproducing or recording information. Therefore, servo may be displaced, and thus the problem is presented in that the signal quality is lowered. If the servo is greatly displaced, a servo skip may occur.

Additionally, when the substrate 1 is tilted, a laser beam from the optical head 11 (see FIG. 22) is converged on the tilted surface of the recording medium layer 9, and thus the converged state changes according to the degree of the tilt, thereby adversely affecting the recording and reproducing operations.

Furthermore, when the substrate 1 is moved up and down with respect to the optical head 11, the optical head 11 is activated so as to compensate this movement of the substrate 1 and to converge the laser beam onto the surface of the recording medium layer 9. However, when the substrate 1 is greatly moved up and down, the optical head 11 cannot compensate this movement, and thus the laser beam cannot be converged onto the recording medium layer 9 sufficiently, and this presents the problem that the temperature distribution of the recording medium layer 9 changes, thereby adversely affecting the recording and reproducing operation. Especially, in the arrangement of the present application, the temperature distribution of the recording medium layer 9 when reproducing is important. Therefore, it is necessary to prevent the warpage of the substrate 1 and a change in the warpage due to an environmental change as much as possible.

In the arrangement of the magneto-optical disk, since the moisture-proof layer is provided, the moisture absorption and release on the surface side of the substrate 1 can be prevented, the restitution of the substrate 1 can be significantly suppressed. Thus, the above magneto-optical disk has an arrangement suitable especially for the present invention as explained above.

The second overcoat film on the moisture-proof layer prevents the moisture-proof layer from being scarred and for protecting the surface of the substrate 1, and the same material as the material used in the overcoat film 6 on the recording medium layer 9 may be used.

Additionally, the hardcoat layer or the charge prevent layer may be provided in lieu of the second overcoat film, or may be provided on the second overcoat film.

In the present embodiment, a groove with a pitch of 1.6 $\mu$m is formed on the substrate 1. However, it has been confirmed that even if the pitch of the groove is set at 1.2 $\mu$m, recording and reproducing operations can be performed without any problems in practice.

Therefore, when the laser beam with a wavelength shorter than 780 nm and the converge lens 8 with an N.A. larger than 0.55 are used, and the light spot diameter of the reproduction-use light beam 7 is made smaller, recording and reproducing operations can be performed with respect to the pitch of 1.2 $\mu$m or below (for example 0.8 $\mu$m) without any problems in practice.

As to the respective width of the land and the groove, an error of ±0.05 $\mu$m should be considered in manufacturing.

The ratio of the land width to the groove width is preferably set such that the C/N of the land approximately equals the C/N of the groove. In considering the groove depth, the ratio may be slightly displaced from 1:1.

In the magneto-optical device which carries out recording and reproducing operations using a single light beam, the polarity of the tracking servo must be switched in order to switch the position of the servo from the track on the land to the track on the groove.

As a recording method, first a recording operation is carried out with respect to a track formed on the land, and after the recording operation has been performed with respect to all the track formed on the land, the polarity of the tracking servo is switched so as to perform recording on a track formed on the groove. Additionally, it may be arranged such that the track formed on the land is divided into logical divisional regions in a radial direction of the disk, and first a recording operation is carried out with respect to a track formed on the land in a logical divisional region, and after the recording operation has been performed with respect to all the tracks formed on the land in the logical divisional region, the polarity of the tracking servo is switched so as to perform recording on a track formed on a groove in the logical divisional region. In this arrangement, an access speed can be improved.

In the case of the magneto-optical disk device, using two light beams respectively used in the tracking servo for the track on the land and for the tracks on the groove, the polarity of the tracking servo is not necessary to be switched, and a high speed data transfer is enabled. Here, in order to prevent the thermal interference which disturbs the shape of the recording bit, a predetermined distance between the light beams is required to maintain.

The second embodiment of the present invention will be explained below with reference to FIG. 39. For convenience in the explanation, members having the same functions as those of the previous embodiments will be designated by the same code, and the descriptions thereof shall be omitted here.

Figure 39:
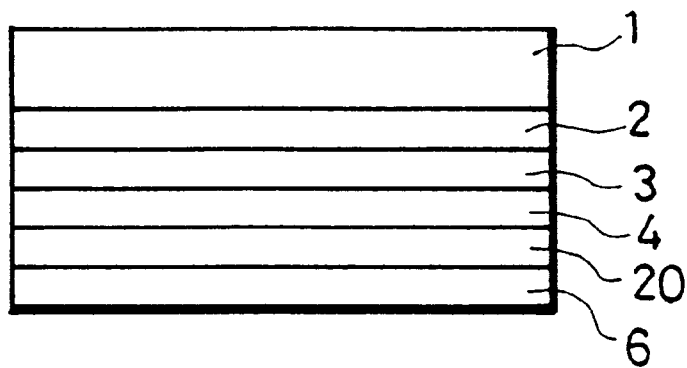
FIG. 39 is a view showing a schematic configuration of the magneto-optical disk used in the second embodiment.

As shown in FIG. 39, the magneto-optical disk of the present embodiment is composed of a substrate 1 whereon a transparent dielectric film 2, a readout layer 3, a recording layer 4, a radiating film 20, an overcoat film 6 are laminated in this order.

As to a material for the radiating film 20, Al may be used, and the thickness of the film is preferably set in the vicinity of 100 nm. As to the material for the substrate 1, the transparent dielectric film 2, the readout layer 3, the recording layer 4 and the overcoat film 6, the materials used in the previous embodiment may be used.

In the present embodiment, the radiating film 20 is formed on the recording layer 4, and thus the shape of the recording bit can be sharpened for the following reasons:

Most of the light beam incident from the light incident side is absorbed by the readout layer 3 and the recording layer 4 and is changed into heat. In this case, the heat is conducted in a vertical direction of the readout layer 3 and the recording layer 4, and is conducted in a horizontal direction of the layers as well. Here, if the amount of heat transferred in the horizontal direction is large, and the heat is transferred at low speed, in the case of high speed high density recording, the problem of an adverse thermal effect on the recording bit to be recorded next. If this occurs, the length of the recording bit becomes longer than a predetermined length. Moreover, a recording bit extended in the horizontal direction may be formed. If the recording bit is extended in the horizontal direction, the amount of crosstalk may increases, thereby presenting the problem that a desirable recording and reproducing operation cannot be performed.

In the arrangement of the present embodiment, the radiating film 20 made of Al having the high thermal conductivity is formed on the recording layer 4. The heat conducted in a lengthwise direction can be released to the side of the radiating film 20, i.e., in a height direction, thereby reducing the amount of heat conducted in the horizontal direction. Therefore, recording can be carried out without having a thermal interference under the high density and high speed recording conditions.

By providing the radiating film 20, in the case of recording by the light intensity modulation, the following advantages can be obtained.

Since the radiating film 20 is provided, in the process of recording, when the area having a temperature rise by the projection of the light beam is cooled off, the difference of a change in the temperature of the readout layer 3 and the recording layer 4 can be made more significant. Especially in the case of projecting a laser beam of high level, the respective cooling off processes of the readout layer 3 and the recording layer 4 can be set greatly different (the recording layer 4 is cooled off at faster speed), thereby making easier the rewriting process.

Al used in the radiating film 20 has a higher thermal conductivity compared with the rare-earth transition metal alloy used in the readout layer 3 and the recording layer 4. Thus, Al is a suitable material for the radiating film 20. Additionally, in the case of using AlN for the transparent dielectric film 2, the following advantages can be achieved. AlN is formed by reactively sputtering an Al target by Ar and $N_2$ gas, and the radiating film 20 can be easily formed by sputtering the same Al target by Ar gas. Additionally, Al can be obtained at a reasonable price.

However, the suitable material for the radiating film 20 is not limited to Al. Other material may be used as long as it has a larger thermal conductivity than the readout layer 3 and the recording layer 4. For example, Au, Ag, Cu SUS, Ta or Cr may be used as well.

When adapting Au, Ag or Cu for the radiating film 20, by being superior in terms of oxidization resistance, humidity resistance and corrosion resistance, a reliable performance of the film can be ensured for a long period of time.

When adapting SUS, Ta or Cr for the radiating film 20, by being superbly superior in terms of oxidization resistance, humidity resistance and corrosion resistance, a reliable performance of the film can be ensured for a long period of time.

In the present embodiment, the thickness of the radiating film 20 is set at 100 nm. However, a long-run reliability can be improved by making thicker the film. However, in considering the recording sensitivity of the magneto-optical disk as described earlier, the film thickness in accordance with the thermal conductivity and the specific heat is required, and thus it is preferably set in a range of 5–200 nm, more preferably set in a range of 10–100 nm. By adapting the material having a relatively high heat conductivity and a superior corrosion resistance, the film thickness can be set in a range of 10–100 nm, and thus the time required for forming the film can be reduced in the manufacturing process.

Alternatively, a dielectric film (not shown) may be provided between the recording layer 4 and the radiating film 20. As to the material for the dielectric film, the same material used in the transparent dielectric film 2 may be used such as AlN, SiN, AlSiN, used in the first embodiment. Especially when a nitride film which does not include oxygen in AlN, SiN, AlSiN, TiN, AlTaN, ZnS, BN, etc., a reliable performance of the magneto-optical disk can be ensured for a long period of time. Here, the thickness of the dielectric film is preferably set in a range of 10–100 nm.

The third embodiment of the present invention will be explained below with reference to FIG. 40. For convenience in the explanation, members having the same functions as those of the previous embodiments will be designated by the same code, and the descriptions thereof shall be omitted here.

Figure 40:
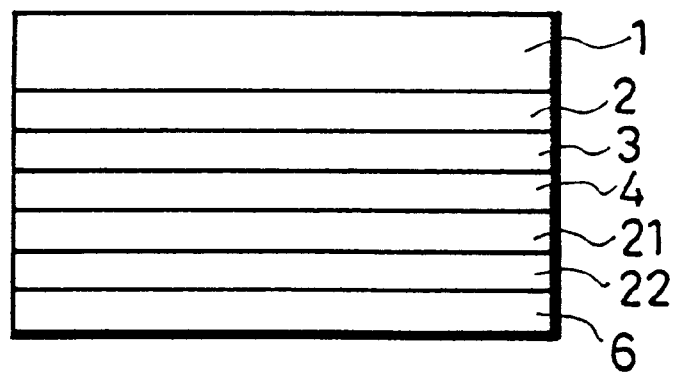
FIG. 40 is a view showing a schematic configuration of the magneto-optical disk used in the third embodiment.

As shown in FIG. 40, the magneto-optical disk of the present embodiment is composed of a substrate 1 whereon a transparent dielectric film 2, a readout layer 3, a recording layer 4, a transparent dielectric film 21, a reflective film 22 and an overcoat film 6 are laminated in this order.

As to the material for the transparent dielectric film 21, for example AlN may be used, and the thickness thereof is preferably set approximately at 30 nm. As to the material for the substrate 1, the transparent dielectric film 2, the readout layer 3, the recording layer 4 and the overcoat film 6, the same material used as in the previous embodiment. However, the thickness of the readout layer 3 is set at 15 nm which is the half of the readout layer 3 used in the first embodiment. The thickness of the recording layer 4 is also set at 15 nm which is the half of the recording layer 4 of the first embodiment. Thus, the respective film thicknesses of the readout layer 3 and the recording layer 4 are set very thin (30 nm for both).

Namely, in the case of the magneto-optical disk of the present embodiment, a portion of a light beam incident therefrom is transmitted through the readout layer 3 and the recording layer 4, and further transmitted through the transparent dielectric film 21, and then it is reflected from the reflective film 22.

In the above arrangement, a reflected light from the surface of the readout layer 3 and a reflected light from the reflective film 22 and transmitted through the recording layer 4 and the readout layer 3 interferes with one another. Thus, the polar Kerr rotation angle becomes larger by enhancing the magneto-optical Kerr effect. As a result, information can be reproduced with higher accuracy, thereby improving the quality of the reproduced signal.

In the arrangement of the present embodiment, in order to increase the enhance effect, the thickness of the transparent dielectric film 2 is preferably set at 70–100 nm, and the film thickness of the transparent dielectric film 21 is preferably set at 15–50 nm.

The transparent dielectric film 2 is preferably set in a range of 70–100 nm because when the film 2 is set in this range, the enhance effect of the polar Kerr rotation angle is maximized as explained in the first embodiments.

The greater polar Kerr rotation angle can be achieved by making thicker the film thickness of the transparent dielectric film 21. However, the reflective index becomes smaller on the contrary, and if the reflective index becomes too small, a stable servo cannot be carried out. Therefore, the film thickness of the transparent dielectric film 21 is preferably set in a range of 15–50 nm.

The enhance effect can be increased by setting the reflective index of the transparent dielectric film 21 greater than that of the transparent dielectric film 2.

The readout layer 3 and the recording layer 4 are both made of rear earth transition metal alloy, and has high light absorptance. Therefore, if the total thickness of the readout layer 3 and the recording layer 4 is set above 50 nm, a light beam is hardly transmitted therethrough, and thus enhance effect cannot be obtained. Thus, the total film thickness of the readout layer 3 and the recording layer 4 is preferably set in a range of 10–50 nm.

If the film thickness of the reflective film 22 becomes too thin, a light is transmitted through the reflective film 22, and the enhance effect is reduced. Thus, the film thickness of at least 20 nm is required. On the other hand, if the film thickness of the reflective film 22 becomes too thick, a large power is required for recording and reproducing, and thus the recording sensitivity of the magneto-optical disk is reduced. Thus, the film thickness is preferably set below 100 nm. Accordingly, the film thickness of the reflective film 22 is preferably set in a range of 20–100 nm.

As to the material for the reflective film 22, Al is preferably adapted because of its large reflectance (substantially 80%) in a wavelength range of semiconductor laser. Moreover, when forming AlN by sputtering, the same Al target can be used as when forming AlN of the transparent dielectric film 2. As described, when forming AlN, a reactive sputtering is carried out by introducing mixed gas of Ar and $N_2$ or $N_2$ gas, and when forming Al of the reflective film 22, sputtering is carried out by introducing Ar gas.

The suitable material for the reflective film is not limited to Al, and other materials may be used as long as it has a reflectance of above 50% in a wavelength range of the light beam, such as Au, Pt, Co, Ni, Ag, Cu, SUS, Ta or Cr.

When adapting Au, Pt, Cu or Co to the reflective film 22, because of its high oxidization resistance, humidity resistance, corrosion resistance, etc., reliable performance of the film is improved for a long period of time.

When adapting Ni to the reflective film 22, because of its small heat conductivity, the magneto-optical disk has high recording sensitivity. Moreover, the disk has high oxidization resistance, humidity resistance, corrosion resistance, etc., thereby ensuring a reliable performance of the disk for a long period of time.

When adapting Ag to the reflective film 22, because of its high oxidization resistance, humidity resistance and corrosion resistance, the reliable performance of the film 22 can be ensured for a long period of time. Moreover, Ag target can be obtained at reasonable price.

When adapting SUS, Ta, or Cr, because of its high oxidization resistance, humidity resistance and corrosion resistance, a reliable performance of the magneto-optical disk can be ensured for a long period of time.

Figure 41:
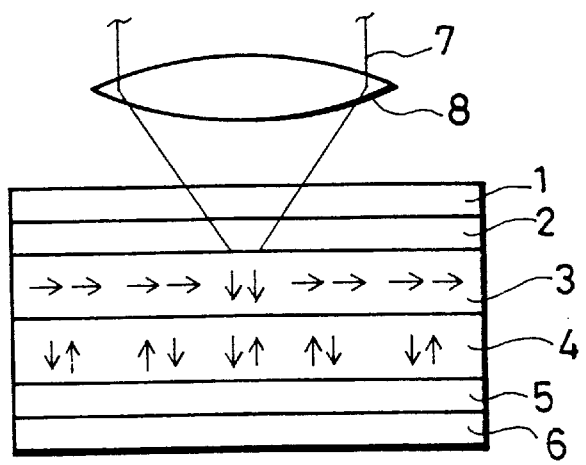
FIG. 41 is a view showing a schematic configuration of the magneto-optical disk used in the fourth embodiment.
Figure 42:
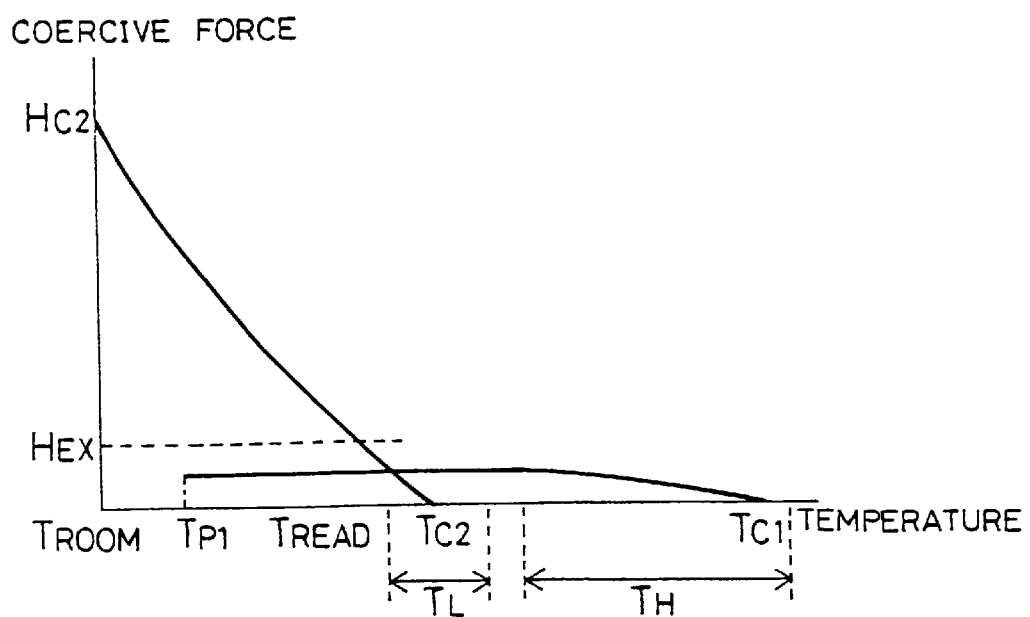
FIG. 42 is an explanatory view showing a temperature dependency of respective coercive of the readout layer and the recording layer of FIG. 41.

The following description will discuss the fourth embodiment of the present invention with reference to FIG. 41 and FIG. 42. For convenience in the explanation, members having the same function as those in the aforementioned embodiments will be designated by the same codes, and thus the descriptions thereof shall be omitted here.

As shown in FIG. 41, the magneto-optical disk of the present embodiment is composed of a substrate 1 whereon a transparent dielectric film 2, a readout layer 3, a recording layer 4, a protective film 5, and an overcoat film 6 are laminated in this order. The magneto-optical disk of the present embodiment has a structure similar to that of the first embodiment. However, the magnetic property of the readout layer 3 is different from that of the first embodiment as will be described later.

The readout layer 3 made of rare-earth transition metal alloy is a ferrimagnetic substance where the sub-lattice magnetic moment of the rare-earth metal has a direction opposite to the sub-lattice magnetic moment of the transition metal. Furthermore, the respective magnetic moments of the rare-earth metal and the transition metal have mutually different temperature dependency. At high temperature, the magnetic moment of the transition metal becomes greater than that of the rare-earth metal.

The content of the rare-earth metal is set greater than that in the compensating composition at room temperature so that the readout layer 3 has in-plane magnetization at room temperature. With the projection of the light beam, the temperature of the portion irradiated with the light beam is raised, and thus the sub-lattice magnetic moment of the transition metal becomes relatively large. As a whole, the magnetization becomes small, thereby having perpendicular magnetization.

As shown in FIG. 42 which shows the temperature dependency of coercive force, the readout layer 3 has in-plane magnetization at room temperature ($T_{ROOM}$) and has perpendicular magnetization component at temperature above $Tp_1$. The readout layer 3 has perpendicular magnetization at readout temperature ($T_{READ}$).

The readout layer 3 of the present embodiment is RE-rich where the content of the rare-earth metal is greater than the compensating composition at room temperature. Furthermore, the readout layer 3 is RE-rich in range from room temperature to Curie temperature. Here, RE-rich is defined such that the content of the rare-earth metal is greater than in the compensating composition; on the other hand, TM-rich (to be described later) is defined such that the content of the transition metal is greater than that in the compensating composition.

The recording layer 4 is made of rare-earth transition metal alloy composed of a magnetic thin film with perpendicular magnetization. In order to store information recorded using the magnetic direction in a stable condition at room temperature, sufficiently high coercive force $Hc_2$ (see FIG. 42) is required. In considering a disturbing factor such as external magnetic field, etc., coercive force of 100 kA/m is sufficient. However, more desirably, the coercive force is set above 400 kA/m.

The overwriting operation on the magneto-optical disk by the light intensity modulation will be explained below.

With the projection of the light beam, when the temperature of the recording layer 4 is raised to the vicinity of Curie temperature $Tc_2$ at which recording is carried out, the magnetization direction of the recording layer 4 is determined by the balance between the static exchange coupling force exerted used in arranging the magnetization direction of the recording layer 4 in the magnetization direction of the recording magnetic field and exchange coupling force exerted used in arranging the respective sub-lattice magnetic moments of the readout layer 3 and the recording layer 4 in the same direction. For this reason, in the vicinity of Curie temperature $Tc_2$ at which recording is carried out, it is required to set such that the static magnetic coupling force and the exchange coupling force are exerted onto the recording layer 4 in mutually opposite direction. Specifically, since the readout layer 3 is RE-rich in the vicinity of Curie temperature $Tc_2$ of the recording layer 4, the recording layer 4 is required to be set TM-rich.

By projecting a light beam having a relatively low power (first power) onto the magneto-optical disk, when the temperature of the recording layer 4 is raised to the vicinity of the Curie temperature ($T_L$ in FIG. 42), the magnetization of the recording layer 4 becomes extremely small or disappears. Thus, the magnetization direction of the readout layer 3 is arranged in the direction of the recording-use magnetic field. The respective film thicknesses of the readout layer 3 and the recording layer 4 are set such that the temperature of the readout layer 3 on the light incident side is higher than the temperature of the recording layer 4, i.e., $T_{11}$ (average temperature of the readout layer 3) >$T_{22}$ (average temperature of the recording layer 4). When comparing the exchange coupling force exerted from the readout layer 3 onto the recording layer 4 and the static magnetic coupling force exerted from the recording magnetic field toward the recording layer 4, static magnetic coupling force exerted from the recording magnetic field to the recording layer 4 becomes stronger. As a result, the magnetization direction of the recording layer 4 can be arranged in the magnetization direction determined by the static magnetic coupling force exerted from the recording magnetic field onto the recording layer 4.

Next, a light beam having relatively high power (the second power) is projected onto the magneto-optical disk, and when the temperature of the recording layer 4 is raised above Curie temperature $Tc_2$ ($T_H$ in FIG. 42) as in the above process, the temperature of the readout layer 3 is raised in the above process. However, in the process of cooling off, the difference in the temperature in a vertical direction no longer exists, and when the temperature of the recording layer 4 drops to the vicinity of Curie temperature, the condition $T_{11}=T_{22}$ can be achieved. Here, since the magnetization of the recording layer 4 becomes extremely small or disappears, the magnetization direction of the readout layer 3 is arranged in the direction of the recording-use magnetic field.

Compared with the case where the light beam having relatively low power (the first power) is applied, the exchange coupling force exerted from the readout layer 3 to the recording layer 4 becomes relatively greater. Thus, it becomes possible to arrange the magnetization direction of the recording layer 4 in the direction determined by the exchange coupling force from the readout layer 3.

As in the described manner, the magnetization direction of the recording layer 4 can be changed between when a light beam having relatively low power (the first power) is projected and when a light beam having relatively high power (the second power) is projected. Namely, an overwriting operation by the light beam intensity modulation method is enabled.

When reading out the magnetization direction recorded on the recording layer 4, a light beam having a still lower power than the first power is projected thereon. Since the intensity of the light beam to be projected generally shows Gaussian distribution, the temperature distribution of the readout layer 3 also shows Gaussian distribution. Thus, only the central portion of the readout layer 3, smaller than the diameter of the light beam can be arranged in the perpendicular direction.

The magnetization direction of the readout layer 3 is set so that the respective directions of sub-lattice magnetic moments of the readout layer 3 and the recording layer 4 are arranged by the exchange coupling force exerted between the readout layer 3 and the recording layer 4.

In the case where the recording layer 4 is RE-rich in the vicinity of Curie temperature $Tc_2$, an overwriting cannot be carried out by the light beam intensity modulation method. However, information recorded for example by the overwrite method by the magnetic field modulation can be readout.

As in the above explanation, it is necessary to prepare the readout layer 3 such that it has in-plane magnetization at room temperature ($T_{ROOM}$) and as the temperature thereof is raised above $T_{p^1}$, a transition occurs from in-plane magnetization to perpendicular magnetization at readout temperature ($T_{READ}$). However, since the reproducing output in reading out is determined by the tilt angle of the magnetization of the readout layer 3, it is not necessary to set the readout layer 3 so as to completely exhibit in-plane magnetization at room temperature and to completely exhibit perpendicular magnetization at readout temperature.

More specifically, if the tilt angle of the magnetization of the readout layer 3 differs between at room temperature and at readout temperature, when reading out, only the magnetization direction of the recording layer 4 in a portion smaller than the light beam diameter of the central portion of the light beam can be read out.

An example of the magneto-optical disk, the manufacturing method thereof, an overwrite operation by the light intensity modulation, and the reproducing test will be explained below:

In the sputtering device provided with five targets of Al, Gd, Dy, Fe and Co, the substrate 1 made of polycarbonate having formed thereon pregroove and prepit was placed so as to confront the target, and air was exhausted from the sputtering device to $1\times10^{-6}$ Torr, and mixed gas of argon and nitrogen was introduced therein, and an electric power was supplied to the Al target, and under the gas pressure of $4\times10^{-3}$ Torr and a sputtering speed of 12 nm/min, the transparent dielectric film 2 made of AlN with a thickness of 80 nm was formed.

Next, again, air was exhausted from the sputtering device to $1\times10^{-6}$ Torr, and argon gas was introduced therein, and an electric power was supplied to the Gd, Fe and Co targets, and under the gas pressure of $4\times10^{-3}$ Torr and a sputtering speed of 15 nm/min, the readout layer 3 made of GdFeCo with a thickness of 50 nm was formed. The readout layer 3 is RE rich, and it does not have compensation temperature, and the Curie temperature $T_{c^1}$ thereof is at 300° C. The composition of GdFeCo is $Gd_{0.26}(Fe_{0.82}Co_{0.18})_{0.74}$.

Then, power supply to Gd is stopped, and then power is supplied to the Dy target. As a result, the recording layer 4 made of DyFeCo with a thickness of 50 nm was formed in the described manner. The recording layer 4 is TM-rich at room temperature, and the coercive force $Hc_2$ thereof is set 800 kA/m. The recording layer 4 does not have compensation temperature, and the Curie temperature thereof $T_{C^2}$ is set at 150° C. The composition of DyFeCo is set at $Dy_{0.23}(Fe_{0.82}Co_{0.18})_{0.77}$.

Next, mixed gas of argon and nitrogen is introduced in the sputtering device, and an electric power is supplied to the Al target. Under the gas pressure of $4\times10^{-3}$ Torr and at sputtering speed of 12 nm/min, the protective film 5 made of AlN with a thickness of 20 nm is formed. The film thickness of the protective film 5 is set so that it enables the readout layer 3 and the recording layer 4 to be protected from being corroded by oxidization, etc.

An ultraviolet ray hardening resin is applied by spincoating, and the ultraviolet ray is projected thereon, thereby forming a overcoat film 6.

Here, the thickness of the readout layer 3 and the recording layer 4 are both set to 50 nm. However, by making the readout layer 3 and the recording layer 4 thicker (100 nm), the difference in the temperature in the film thickness direction could be more effectively used.

The magneto-optical disk thus manufactured is loaded into the magneto-optical disk device, and it is rotated at linear velocity of 10 m/s at the laser beam projecting position, and a recording magnetic field of 25 kA/m is applied. Here, the first laser power is set at 6 mW, and the second laser power is set at 10 mW. By modulating the laser power at a frequency of 5 MHz, a recording operation is carried out, and a reversal magnetic domain with a length of 1 μm is formed on the recording layer 4 at a period of 2 μm.

Next, the laser power is set at 2 mW, and the reproduction of information was carried out. As a result, a magneto-optical signal of 5 MHz was obtained from the readout layer 3 according to the reversal magnetic domain formed on the readout layer 3.

On the reversal magnetic domain formed at a period of 5 MHz, an overwriting operation was carried out by modulating the laser power at a frequency of 10 MHz. As a result, the reversal magnetic domain formed at a period of 5 MHz disappeared, and the reversal magnetic domain with a length of 0.5 μm was formed on the recording layer 4 at a period of 1 μm.

Again, the laser power is set at 2 mW, and a reproduction of information is carried out. As a result, only a magneto-optical signal of 10 MHz with a size substantially the same as the magneto-optical signal of 5 MHz was obtained from the readout layer 3, which means that in the readout layer 3, only the magnetization state of the portion having a temperature rise and thus has perpendicular magnetization is reproduced.

Figure 43:
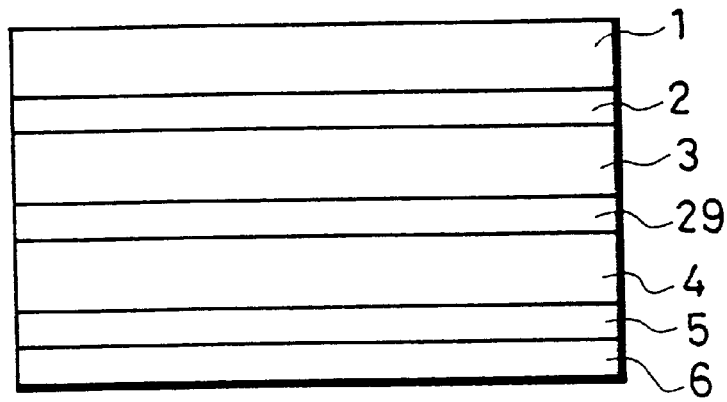
FIG. 43 is a view showing a schematic configuration of the magneto-optical disk used in the fifth embodiment.

The following description will discuss the fifth embodiment of the present invention in reference to FIG. 43. For convenience in the explanation, members having the same functions as those of the aforementioned embodiments are designated by the same codes, and the descriptions thereof shall be omitted here.

As shown in FIG. 43, the magneto-optical disk of the fifth embodiment of the present invention is composed of a substrate 1 whereon a transparent dielectric film 2, the readout layer 3, an intermediate layer 29 made of an in-plane magnetization film, a recording layer 4, a protective film 5 and an overcoat film 6 are laminated in this order. Namely, the magneto-optical disk of the present embodiment has the same configuration as that of the fourth embodiment except that the intermediate layer 29 composed of the in-plane magnetization is formed between the readout layer 3 and the recording layer 4.

An overwriting or reproducing operation by the light intensity modulation is carried out as in the same manner as the fourth embodiment. However, since an intermediate layer 29 composed of in-plane magnetization film is provided, exchange coupling force between the readout layer 3 and the recording layer 4 is controlled, and thus the layers can be more freely designed.

It is only necessary to set the intermediate layer 29 such that in-plane magnetization is maintained until at Curie temperature of the intermediate layer 29. However, when the temperature thereof is raised above its Curie temperature, the exchange coupling force exerted between the readout layer 3 and the recording layer 4 is cancelled. Thus, in order to obtain a still reliable overwriting operation by the light intensity modulation, the Curie temperature of the intermediate layer 29 is set at substantially the same as the Curie temperature $Tc_2$ of the recording layer 4, i.e., in a range of 150–250° C.

More concretely, the in-plane magnetization film made of DyFeCo is used in the intermediate layer 29. Other than DyFeCo, TbFeCo, GdTbFe or NdDyFeCo is preferable. Additionally, by adding at least one element selected from the group consisting of Cr, V, Nb, Mn, Be and Ni to the above material, a reliable performance of the intermediate layer 29 can be ensured for a longer period of time. The suitable thickness of the intermediate layer 29 is determined by the combination of the material, composition and the film thickness of the readout layer 3. However, the film thickness is preferably set in a range of 1–50 nm. The intermediate layer 29 is successively formed in the same sputtering device used in forming the readout layer 3 and the recording layer 4.

In the same sputtering device as the aforementioned embodiment, the magneto-optical disk having the intermediate layer 29 made of DyFeCo was manufactured. Other than the above, the configuration of the magneto-optical disk of the present embodiment is the same as the that of the aforementioned embodiment. Here, the Curie temperature of the intermediate layer 29 is set at 150° C. which is the same as the recording layer 4.

The magneto-optical disk thus manufactured was loaded into the magneto-optical disk device, and the same recording and reproducing tests as the aforementioned embodiment were conducted, and a desirable overwriting and reproducing properties could be obtained.

However, in the present embodiment, the intermediate layer 29 affects the exchange coupling force exerted between the readout layer 3 and the recording layer 4, and thus the exchange coupling force becomes weaker. Therefore, an appropriate size for the recording magnetic field was 22 kA/m which is different form that of the aforementioned embodiment.

Figure 44:
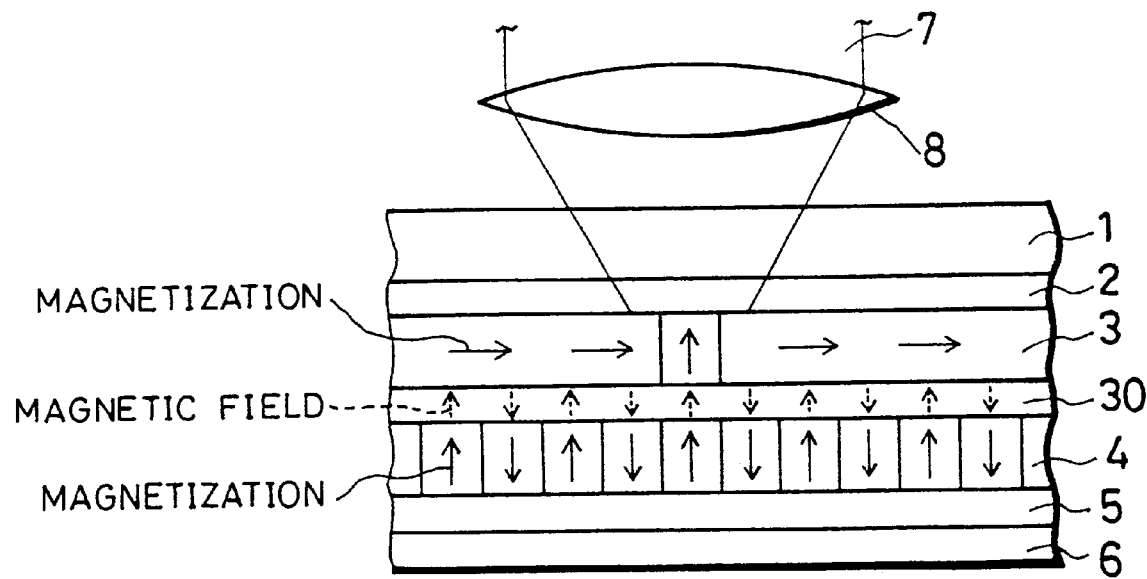
FIG. 44 is a view showing a schematic configuration of the magneto-optical disk used in the sixth embodiment.
Figure 45:
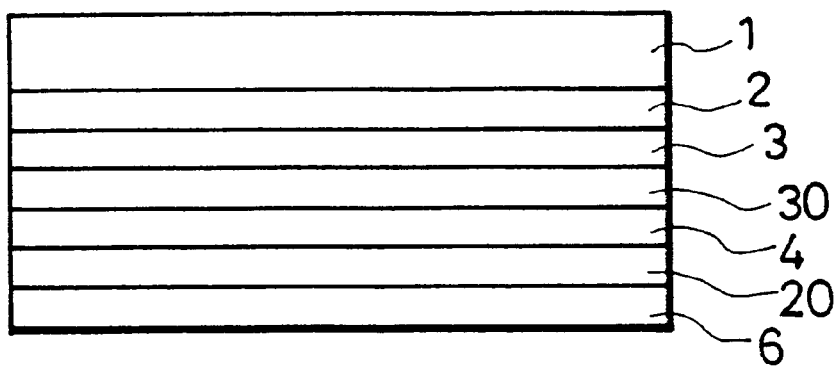
FIG. 45 which shows a variation of the magneto-optical disk of FIG. 44 is a view showing a schematic configuration of the magneto-optical disk having a radiating layer.
Figure 46:
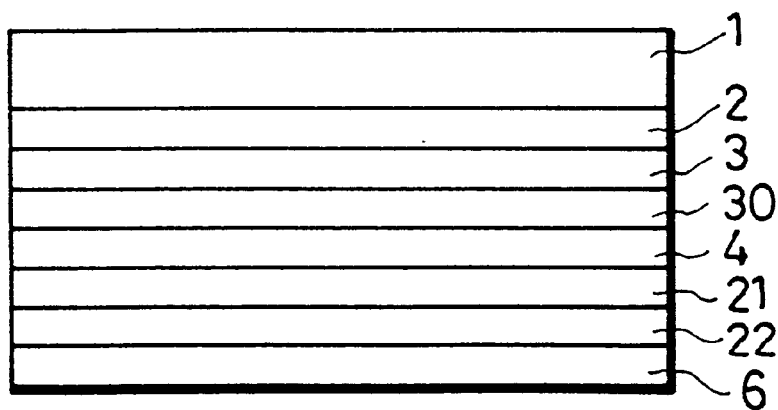
FIG. 46 which shows a variation of the magneto-optical disk of FIG. 44 is a view showing a schematic configuration of the magneto-optical disk having a reflective layer.

The following description will discuss the sixth embodiment in reference to FIGS. 44 through 46. For convenience in the explanation, members having the same functions as those of the aforementioned embodiment are designated by the same codes, and thus the descriptions thereof shall be omitted here.

As shown in FIG. 44, the magneto-optical disk of the present embodiment is composed of a substrate 1 whereon a transparent dielectric film 2, a readout layer 3, an intermediate layer 30 composed of a non-magnetic film, a recording layer 4, a protective film 5 and an overcoat film 6 are laminated in this order.

In recording, if the intermediate layer 30 composed of non-magnetic film is not provided, a strong exchange coupling force is exerted from the readout layer 3 to the recording layer 4, and thus the recording property is degraded. In order to avoid this, the intermediate layer 30 composed of a non-magnetic film is provided so as to cancel the exchange-coupling force, thereby ensuring a stable recording operation.

For the intermediate layer 30, for example, AlN with a thickness of 5 nm is used. The intermediate layer 30 is provided so that the exchange coupling force is not exerted between the recording layer 4 and the readout layer 3. Thus, the AlN is provided between the recording layer 4 and the readout layer 3, so as to be thicker than a monolayer. However, if the thickness of the intermediate layer 30 becomes too thick, the magnetic field generated from the recording layer 4, for arranging the magnetization direction of the readout layer 3 becomes too small. Therefore, the film thickness of the intermediate layer 30 is preferably set not more than 50 nm.

In the magneto-optical disk of the present embodiment, the substrate 1 is composed of a disk-shaped glass with a diameter of 86 mm, inner diameter of 15 mm and the thickness of 1.2 mm. On one surface of the substrate 1, concavo-convex guide truck (not shown) for guiding a light beam is formed with a pitch of 1.6 μm, a groove of 0.8 μm and the land width of 0.8 μm. Namely, the groove and the land are formed so that the ratio of respective widths are set 1:1.

On the side where the guide truck is formed of the substrate 1, AlN with a thickness of 80 nm is formed as a transparent dielectric film 2.

For the readout layer 3, the rare-earth transition metal alloy thin film made of GdFeCo with a thickness of 50 nm is formed as the readout layer 3. The composition of GdFeCo is set $Gd_{0.26}(Fe_{0.82}Co_{0.18})_{0.74}$, and the Curie temperature thereof is set at substantially 300° C.

With the combination of the readout layer 3 and the recording layer 4, the magnetization direction of the readout layer 3 is substantially in-plane magnetization at room temperature, (i.e, the magnetization direction of the readout layer), and a transition occurs from in-plane magnetization to perpendicular magnetization at a temperature in a range of 100–125° C.

On the readout layer 3, AlN with a thickness of 5 nm is formed as the intermediate layer 30.

On the intermediate layer 30, the rare-earth transition metal alloy thin film made of DyFeCo with a thickness of 50 nm is formed as a recording layer 4. The composition of DyFeCo is $Dy_{0.23}(Fe_{0.78}Co_{0.22})_{0.77}$, and the Curie temperature thereof is set substantially at 200° C.

On the recording layer 4, AlN with a thickness of 20 nm is formed as a protective film 5.

On the protective film 5, ultraviolet ray hardening resin of polyuretanacrylate family with a thickness of 5 μm is formed.

The magneto-optical disk of the present embodiment has the same configuration as that of the first embodiment except that the intermediate layer 30 is provided between the readout layer 3 and the recording layer 4. Using the magneto-optical disk, the same performance test as that of the first embodiment was conducted, and the substantially the same results were obtained. Other than AlN, the following dielectric material may be used such as SiN, AlSiN, AlTaN, SiAlON, TiN, TiON, BN, ZnS, $TiO_2$, $BaTiO_3$, $SrTiO_3$, etc.

Alternatively, non-magnetic metal material such as Al, Si, Ta, Ti, Cu, Au, Ag or Pt or the alloy thereof may be used.

As another example of the magneto-optical disk, the magneto-optical disk having a substrate 1 whereon the transparent dielectric film 2, the readout layer 3, the intermediate layer 30 made of non-magnetic film, the recording layer 4, the radiating film 20 and the overcoat film 6 are laminated in this order may be used as shown in FIG. 45. The explanation of the radiating layer 20 has been described in the second embodiment.

As shown in FIG. 46, a magneto-optical disk having a substrate 1 whereon the transparent dielectric film 2, the readout layer 3, the intermediate layer 30 made of non-magnetic film, the recording layer 4, the second transparent dielectric film 21, the reflective film 22, the overcoat film 6 are laminated in this order may be used. In this magneto-optical disk, the second transparent dielectric film 21 and the reflective film 22 are provided between the recording layer 4 and the overcoat film 6. The second transparent dielectric film 21 and the reflective film 22 are as described in the first embodiment.

In the above embodiments 1–6, explanations have been given through the case of the magneto-optical disk as a magneto-optical recording medium. However, magneto-optical card, magneto-optical tape, etc. may be equally adapted. Additionally, in the case of the magneto-optical tape, in lieu of the rigid substrate 1, a flexible tape base, for example, a base made of polyethlene terephtalate may be used.

While this invention has been disclosed in conjunction with specific embodiments thereof, it is evident that many alternatives, modifications and variations will be apparent to those skilled in the art in light of the foregoing description. Accordingly, it is intended to embrace all such alternatives, modifications, and variations as fall within the spirit and broad scope of the appended claims.

What is claimed is:

1. A recording and reproducing method of a magneto-optical recording medium, comprising the step of:

projecting a light beam onto a magneto-optical recording medium including: a recording layer, made of TbFeCo, for recording thereon information magneto-optically; and a readout layer, made of GdFeCo, which has in-plane magnetization at room temperature, whereas, a transition occurs from in-plane magnetization to perpendicular magnetization as temperature raises, so as to form a perpendicularly magnetized area in said readout layer by duplication of the magnetization of said recording layer to the area.

2. A recording and reproducing method of a magneto-optical recording medium, comprising the step of:

projecting a light beam onto a magneto-optical recording medium including: a recording layer for recording thereon information magneto-optically; and a readout layer which has in-plane magnetization at room temperature, whereas, a transition occurs from in-plane magnetization to perpendicular magnetization as temperature raises, said readout layer being made of rare-earth transition metal alloy and having a compensation temperature set outside a range between room temperature and Curie temperature, so as to form a perpendicularly magnetized area in said readout layer by duplication of the magnetization of said recording layer to the area.

3. A recording and reproducing method of a magneto-optical recording medium, comprising the step of:

projecting a light beam onto a magneto-optical recording medium including: a recording layer for recording thereon information magneto-optically; a readout layer which has in-plane magnetization at room temperature, whereas, a transition occurs from in-plane magnetization to perpendicular magnetization as temperature raises; and an intermediate layer made of non-magnetic film formed between said readout layer and said recording layer, so as to form a perpendicularly magnetized area in said readout layer by duplication of the magnetization of said recording layer to the area through said intermediate layer.

4. The recording and reproducing method of a magneto-optical recording medium as set forth in claim 3, wherein said intermediate layer is formed so as to have a thickness of 50 nm or less.

5. The recording and reproducing method of a magneto-optical recording medium as set forth in claim 3, wherein said intermediate layer is made of a dielectric.

6. The recording and reproducing method of a magneto-optical recording medium as set forth in claim 3, wherein said intermediate layer is made of a non-magnetic metal.

* * * * *